United States Patent [19]
Taniguchi et al.

[11] Patent Number: 6,067,383
[45] Date of Patent: *May 23, 2000

[54] CODING METHOD, CODING APPARATUS, WAVELET TRANSFORM APPARATUS, AND WAVELET REVERSE TRANSFORM APPARATUS

[75] Inventors: Shuuhei Taniguchi, Moriguchishi; Norio Aoki; Hirotoshi Uehara, both of Hirakatashi; Shouichi Gotoh, Katanosi, all of Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/713,072

[22] Filed: Sep. 12, 1996

[30] Foreign Application Priority Data

Sep. 12, 1995 [JP] Japan ..................................... 7-233704
Sep. 12, 1995 [JP] Japan ..................................... 7-233706

[51] Int. Cl.$^7$ ........................................................ G06K 9/46
[52] U.S. Cl. ........................... 382/240; 382/239; 348/438; 348/390
[58] Field of Search ................................... 382/239, 240; 348/438, 390

[56] References Cited

U.S. PATENT DOCUMENTS 5,122,875  6/1992  Raychaudhuri et al. ............... 358/133
5,148,271  9/1992  Kato et al. ............................. 358/133
5,410,355  4/1995  Kolczynski ............................. 348/438

FOREIGN PATENT DOCUMENTS 0 501 755 A2   9/1992  European Pat. Off. ......... H04N 9/80
0 557 736 A2   9/1993  European Pat. Off. ...... G06F 15/413
0 570 818 A2  11/1993  European Pat. Off. ......... H04N 7/13
0 732 855 A2   9/1996  European Pat. Off. ......... H04N 7/50

Primary Examiner—Jose L. Couso
Assistant Examiner—Anh Hong Do
Attorney, Agent, or Firm—Parkhurst & Wendel, L.L.P.

[57] ABSTRACT

A coding method comprises a hierarchical coding step of performing hierarchical coding for data to be coded to generate first and second code sequences, each comprising a plurality of code layers; a storage control step of storing the first and second code sequences in a storage region of a code storage means having successive addresses, respectively from opposed ends of the storage region, according to priority given to the code layers; and a priority judge step of storing a code layer in either of the first and second code sequences, which code layer has the highest priority at present, prior to the other code sequence, when an overlap occurs in the storage control step. Therefore, the code layers are stored in the storage element having limited capacity with high efficiency, whereby the utilization efficiency of the storage capacity is improved.

16 Claims, 51 Drawing Sheets

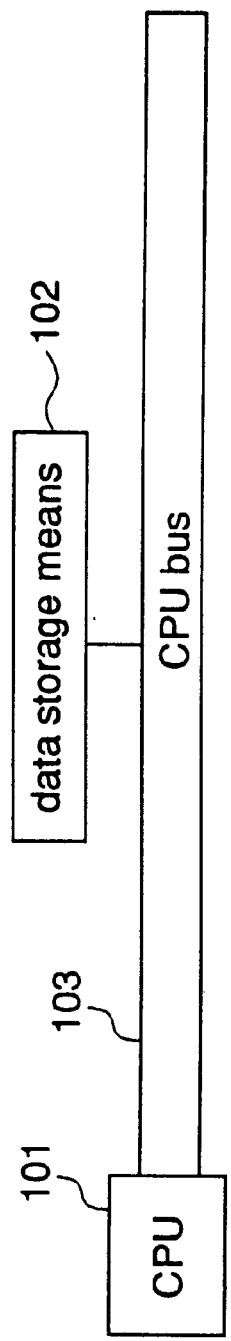
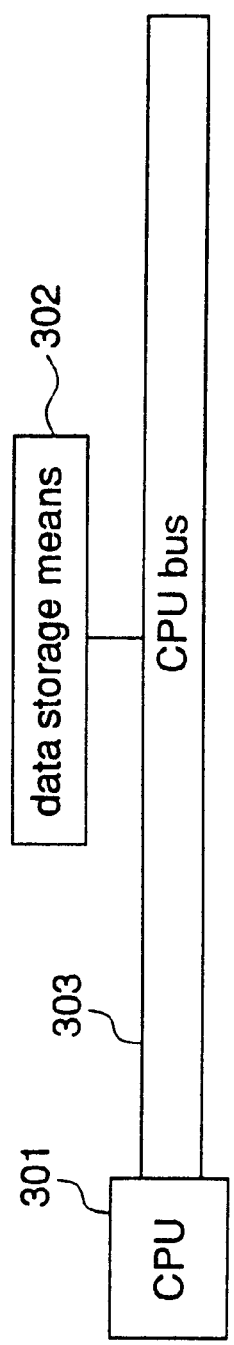
Fig.3 (a)  Fig.3 (b)

Fig.11 (a)  Fig.11 (b)  Fig.11 (c)
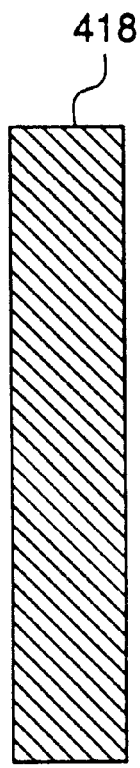
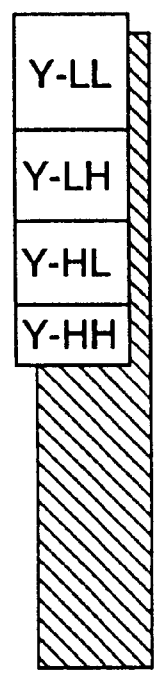
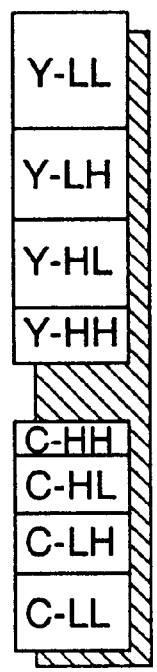

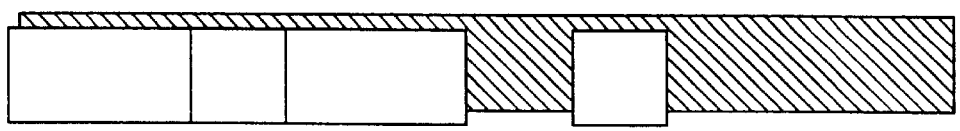
Fig.12 (e)
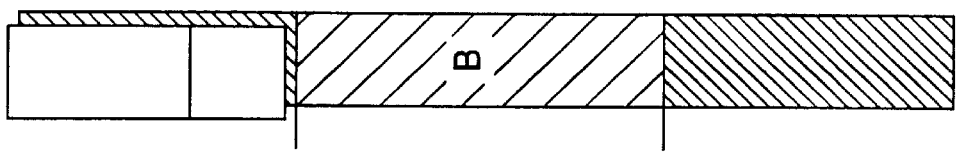
Fig.12 (d)
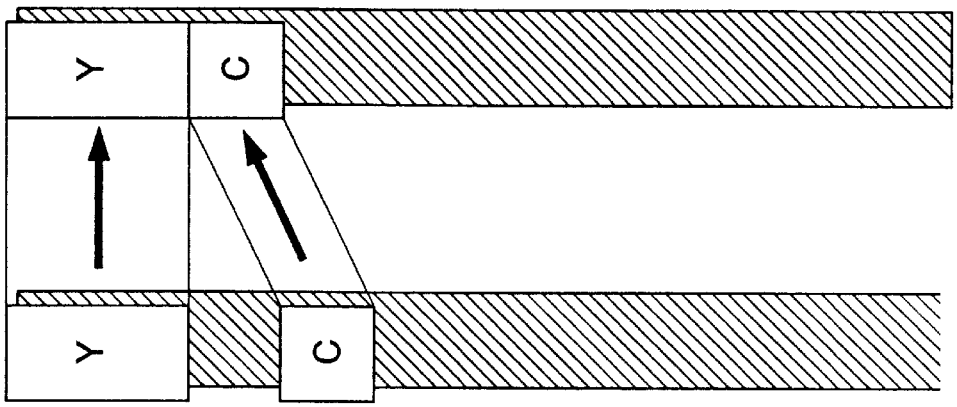
Fig.12 (c)
Fig.12 (b)
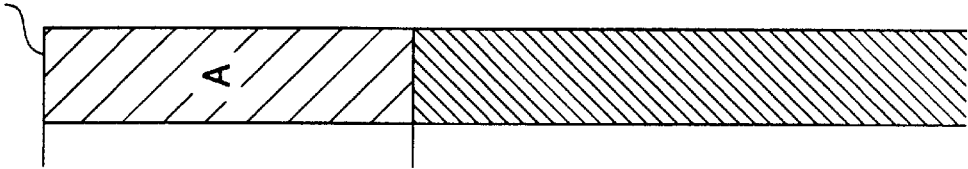
Fig.12 (a)

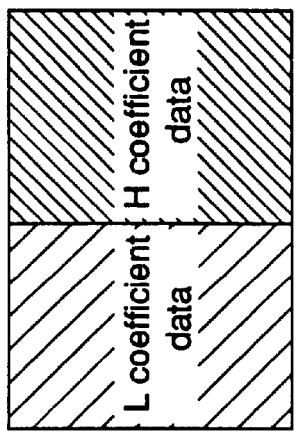
Fig.21 (a)
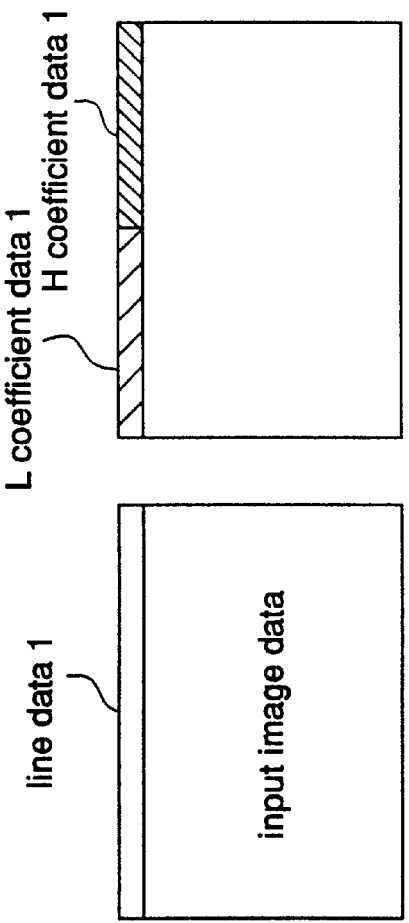
Fig.21 (b)
Fig.21 (c)
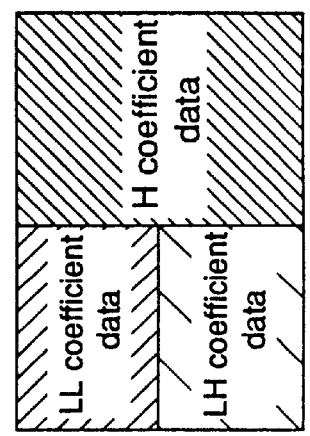
Fig.21 (d)
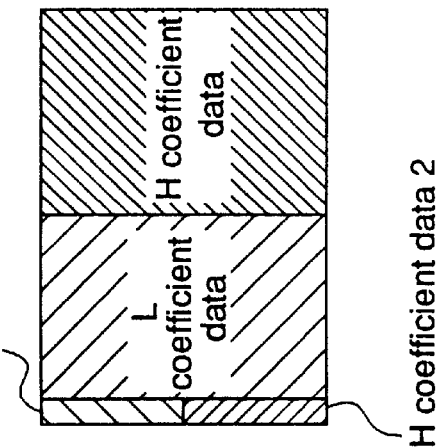
Fig.21 (e)
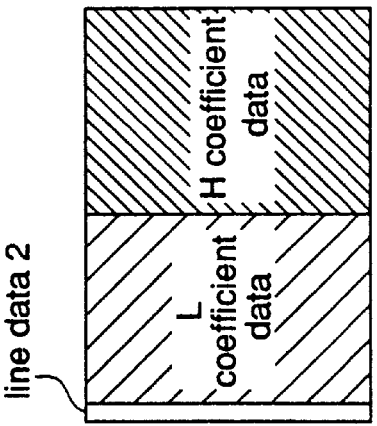
Fig.21 (f)

Y coefficient reverse offset process (b11,b10)=(0,0)→b9~b2 are output
(b11,b10)=(0,1)→255(FFH) is output
(b11,b10)=(1,0)→0 is output
(b11,b10)=(1,1)→0 is output UV coefficient offset process (b11,b10,b9)=(0,0,0)→b9~b2 are output
(b11,b10,b9)=(0,0,1)→127(7FH) is output
(b11,b10,b9)=(0,1,0)→127(7FH) is output
(b11,b10,b9)=(0,1,1)→127(7FH) is output
(b11,b10,b9)=(1,0,0)→-128(8OH) is output
(b11,b10,b9)=(1,0,1)→-128(8OH) is output
(b11,b10,b9)=(1,1,0)→-128(8OH) is output
(b11,b10,b9)=(1,1,1)→b9~b2 are output

CODING METHOD, CODING APPARATUS, WAVELET TRANSFORM APPARATUS, AND WAVELET REVERSE TRANSFORM APPARATUS

FIELD OF THE INVENTION

The present invention relates to a coding method and a coding apparatus for coding a still picture or an image signal with high efficiency and, more particularly, to a coding method and a coding apparatus that can facilitate control of the amount of codes and reduce hardware employed for the coding. The invention also relates to a wavelet transform apparatus for high-performance coding of digital data of an image or a voice and, more particularly, to a high-speed wavelet transform apparatus realized with reduced hardware. Furthermore, the invention relates to a wavelet reverse transform apparatus for restoring the wavelet-transformed data to the original image data.

BACKGROUND OF THE INVENTION

Generally, since an image signal has an enormous amount of information, a various methods for compressing the amount of information for storage or transmission have been proposed.

As high-performance coding techniques for coding a still picture or an image signal, JPEG and MPEG, based on DCT (Discrete Cosine Transform), are widely employed (refer to "ISO/IEC CD 10918-1, Digital Compression and Coding of Continuous-tone Still Images, Part 1: Requirements and Guidelines" for JPEG and refer to "ISO/ICE 11172-2:1993, Information Technology—Coding of Moving Pictures and Associated Audio for Digital Storage Media at up to about 1.5 Mbit/s—Part 2 Video" for MPEG). In recent years, a subband coding method wherein a signal is repeatedly divided into frequency bands (subbands) and coded has been proposed and examined for practical use.

Generally, these coding methods employ variable-length coding, such as Huffman coding, and the amount of codes for an image or a unit time is not fixed.

Since codes, produced by these coding methods, are stored in external memory devices utilizing magnetic media or transmitted through a various kinds of communication lines, it is necessary to reduce the codes to a prescribed amount for storage or transmission.

For example, in MPEG, a system for controlling the average amount of codes per a unit time by dynamically changing quantized factors according to the amount of generated codes is put to practical use.

Further, in a coding system called JPEG (baseline system Of JPEG), the amount of codes for each image is decided using a quantization table and a Huffman table, which are determined before coding.

Furthermore, for JPEG, as hierarchical coding systems, progressive coding and hierarchical progression for DCT coefficients are defined. When these systems are employed, hierarchically reproducible codes are obtained while maintaining an image quality at reproduction as high as that provided by the baseline system, with an amount of codes as much as that obtained by the base line system.

Furthermore, in the subband coding, a hierarchically reproducible code sequence is obtained by successively generating codes from a low-frequency component.

A conventional subband coding system will be explained using FIG. 46. In FIG. 46, reference numeral 201 designates a horizontal high-pass filter (hereinafter referred to as HPF), numeral 202 designates a horizontal low-pass filter (hereinafter referred to as LPF), numerals 203 and 204 designate down-sample filters (hereinafter referred to as DSFs) for ½ down sampling in the horizontal direction, numerals 205 and 207 designates vertical HPFs, numeral 206 and 208 designate vertical LPFs, numerals 209, 210, 211, and 212 designate DSFs for ½ down sampling in the vertical direction, numeral 213 designates a selector for selecting an input signal, numeral 214 designates a quantizer, and numeral 215 designates a variable-length coder (hereinafter referred to as VLC).

A description is given of the operation of the subband coding system.

An original image is input from an input node 200, and a high-frequency component and a low-frequency component in the horizontal direction are extracted by the HPF 201 and the LPF 202, followed by ½ down sampling by the DSFs 203 and 204, respectively. Thereafter, from the signal down-sampled by the DSF 203, a high-frequency component and a low-frequency component in the vertical direction are extracted by the HPF 205 and the LPF 206, followed by ½ down sampling by the DSFs 209 and 210, respectively. Further, from the signal down-sampled by the DSF 204, a high-frequency component and a low-frequency component in the vertical direction are extracted by the HPF 207 and the LPF 208, followed by ½ down sampling by the DSFs 211 and 212, respectively. As a result, four subband HH, HL, LH, and LL are generated.

The characters showing each subband are the first letters of the filters, HPF and LPF, arranged in the order of the filters from the left. For example, LH is a subband obtained by the horizontal direction LPF filtering and the ½ down sampling and the subsequent vertical direction HPF filtering and the ½ down sampling. Since these four subbands HH, HL, LH, and LL are generated by the vertical and horizontal ½ down sampling, the pixel number in each subband is ¼ of the pixel number in the original image. So, when these subbands are combined, the size is equal to the size of the original image. The selector 213 receives the subbands from the DSFs 212, 211, 210, and 209 and outputs the subbands in the order of LL, LH, HL, and HH. The quantized 214 quantizes each subband with a quantization factor for the subband. The VLC 215 encodes each quantized subband and outputs a variable-length code.

In the above-mentioned quantization step, a higher-frequency subband is subjected to a larger quantization. Therefore, in the variable-length codes generated by the VLC 215, the LL component has the highest percentage and the HH component has the lowest percentage.

Since the subband LL is obtained by subjecting the original image to the vertical and horizontal LPF filtering and the ½ down sampling, it becomes a reduced image of the original image.

When the image coded by the above-described subband system is decoded, initially, the subband-coded image is coded on the assumption that only the LL component exists in the image and the coefficients of the LH, HL, and HH components are all 0. Next, the subband-coded image is decoded, assuming that only the LL and LH components exist and the coefficients of the HL and HH components are all 0. By repeating this processing, hierarchical reproduction is realized in the subband coding method.

The above-mentioned subband coding method is called "Wavelet Transform", wherein an image signal is divided into two frequency subbands, i.e., low and high frequency subbands, and, further, the low-frequency band is recursively divided into frequency subbands. The wavelet transform utilizes the property of image data that the low-frequency component thereof has a large amount of information.

Hereinafter, a conventional wavelet transform apparatus will be described in reference to FIGS. 47 and 48 for a case where frequency division into more subbands is performed. FIG. 47 is a block diagram for explaining the frequency division in the wavelet transform. FIG. 48 shows an example of frequency division of an image signal after the wavelet transform.

As shown in FIG. 48, an image signal is divided into ten frequency subbands. In FIG. 47, reference numerals 131, 135, 139, 143, 147, 151, 155, 159, and 163 designate one-dimensional HPFs, numerals 132, 136, 140, 144, 148, 152, 156, 160, and 164 designate one-dimensional LPFs, numerals 133, 137, 141, 145, 149, 153, 157, 161, 165 designate subsamplers for 2:1 subsampling of signals frequency-divided by the LPFs, ana numerals 134, 138, 142, 146, 150, 154, 158, 162, and 166 designate subsamplers for 2:1 subsampling of signals frequency-divided by the HPFs.

A description is given of the operation. Initially, horizontal line data L1 of an input image I1 is frequency-divided by the HPF 131 and the LPF 132 and band-divided by the subsampler 133 and the subsampler 134 to produce a high-frequency component L1' and a low-frequency component L1". Thereafter, similar processing is performed for the entire input image I1 to divide the input image I1 into high-frequency band data I2 and low-frequency band data I3.

Next, vertical line data of the band data I2 is frequency-divided by the HPF 135 and the LPF 136 and band-divided by the subsampler 137 and the subsampler 138 to produce a high-frequency component HH (F1) and a low-frequency component HL (F2). Thereafter, similar processing is performed for the input image I3 to band-divide the input image I3 into a high-frequency component LH (F3) and a low-frequency component LL (F4).

Next, the band data LL (=I4) is subjected to band-division in the horizontal and vertical directions, producing a high-frequency component LLHH (F4) and a low-frequency component LLHL (F5) of band data I5, and a high-frequency component LHLH (F6) and a low-frequency component LHLL of band data I6.

Thereafter, similar processing is performed for the band data LHLL (=I7), producing a high-frequency component LLLLHH (F7) and a low-frequency component LLLLHL (F8) of band data I8, and a high-frequency component LLLLLH (F9) and a low-frequency component LLLLLL (=I10) of band data I9.

According to the successive band division processing mentioned above, the input image is transformed to data divided into ten frequency subbands as shown in FIG. 48, completing the wavelet transform.

In this wavelet transform apparatus, among the four subbands HH, HL, LH, and LL obtained by the apparatus shown in FIG. 46, the LL subband is further subjected to frequency division to obtain ten subbands.

The prior art coding methods mentioned above have the following drawbacks.

That is, the dynamic change of quantized factors used in MPEG needs complicated process steps when real-timing coding is performed. Further, when the code amount per a unit time is fixed, control of the code amount becomes difficult with a reduction in the unit time.

Further, in the progressive coding in JPEG, it is necessary to transform all blocks by DCT. When the hierarchical progression is employed, back-up memories for storing low resolution image and DSFs are required, and the number of times of DCT operation increases.

Generally, a color image is divided into a plurality of color components, and coding is performed for each color component. Therefore, in order to realize hierarchical reproduction, a plurality of color components must be coded at the same time, or the codes produced for each color component must be rearranged, so that a considerable memory is required.

Furthermore, the wavelet transform apparatus employed for the prior art coding method and apparatus has two problem mentioned hereinafter, because it is realized according to the basis system.

That is, in the process of storing the transformed data after the frequency-band division using the HPFs and LPFs, since the amounts of data I1 to I10 are different from each other, the sequence control is complicated when the entire apparatus is realized by a hardware, and the scale of the hardware is increased.

Another problem resides in the processing speed required for converting the wavelet-transformed data F1 to F9 and I10 into an image signal as shown in FIG. 48. When real-time wavelet transform is performed, to transform the dispersed subband data, F1 to F9, hampers the processing speed.

Furthermore, it is supposed from the problems mentioned above that conventional wavelet reverse transform has similar problems.

SUMMARY OF THE INVENTION

An object of the present invention is to provide a coding method for coding data at high efficiency with less memory capacity.

Another object of the present invention is to provide a coding apparatus for coding data at high efficiency with less memory capacity.

Still another object of the present invention is to provide a wavelet transform apparatus that is realized by small-scale hardware and that increases the transform speed.

Yet another object of the present invention is to provide a wavelet reverse transform apparatus that is realized by small-scale hardware and that increases the transform speed.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a coding method comprising a hierarchical coding step of performing hierarchical coding of data to be coded to generate first and second code sequences, each comprising a plurality of code layers; a storage control step of storing the first and second code sequences in a storage region of a code storage means having successive addresses, respectively from opposed ends of the storage region, according to priority given to the code layers; and a priority judge step of storing a code layer in either of the first and second code sequences, which code layer has the highest priority at present, prior to the other code sequence, when an overlap occurs in the storage control step.

According to a second aspect of the present invention, in the above-mentioned coding method, in the storage control step, the first code sequence is stored in the code storage means prior to the second code sequence, and in the priority judge step, a code layer in the first code sequence, which is lower in priority than a code layer in the second code sequence, is judged, and when the storage region does not have a sufficient capacity for the code layer in the second code sequence, a code layer in the second code sequence is written over the judged code layer in the first code sequence.

According to a third aspect of the present invention, a coding method comprises a hierarchical coding step of performing hierarchical coding for data to be coded to generate at least two code sequences, each comprising a plurality of code layers; a storage control step of storing a code layer having the highest priority among the code layers in the respective code sequences in a code storage means, and storing other code layers in a temporary storage means; and a transfer judge step of transferring, according to priority, the code layers in the respective code sequences stored in the temporary storage means, from the temporary storage means to the code storage means.

According to a fourth aspect of the present invention, the above-mentioned coding method further comprises a region control step of assigning a storage region of a prescribed size from the successive storage regions in the code storage means; the storage step of storing the plural code sequences in the assigned memory region; a code transfer step of filling a vacancy in the storage region between the stored code sequences, by transferring one of the code sequences to the vacancy; and a step of recovering a region in the assigned storage region, which region is not used for the storage.

According to a fifth embodiment of the present invention, a coding method comprises a sampling step of sampling fields of an image signal with a designated time interval; a hierarchical coding step of performing hierarchical coding for the image signal data sampled in the sampling step, a memory capacity calculating step of calculating a memory capacity used in the hierarchical coding step; a memory capacity raising step of raising the memory capacity to a prescribed lowest limit value when the calculated memory capacity is lower than the lowest limit value; a field interval calculating step of calculating a field interval in proportion to the calculated memory capacity; and a step of designating the calculated field interval for the sampling step.

According to a sixth aspect of the present invention, the above-mentioned coding method further comprises a raising detection step of detecting that the memory capacity is raised in the memory capacity raising step; and a step of controlling the hierarchical coding so that the code amount is increased, when the raising detection step detects the raising of the memory capacity.

According to a seventh aspect of the present invention, a coding apparatus comprises a hierarchical coding means for performing hierarchical coding for data to be coded to generate first and second code sequences, each comprising a plurality of code layers; a storage control means for storing the first and second code sequences in a storage region of a code storage means having successive addresses, respectively from opposed ends of the storage region, according to priority given to the code layers; and a priority judge means for storing a code layer in either of the first and second code sequences, which code layer has the highest priority at present, prior to the other code sequence, when an overlap occurs in the storage control step.

According to an eighth aspect of the present invention, in the above-mentioned coding apparatus, the storage control means stores the first code sequence in the code storage means prior to the second code sequence; and the priority judge means judges a code layer in the first code sequence, which is lower in priority than a code layer in the second code sequence, and when the storage region does not have a sufficient capacity for storing the code layer in the second code sequence, a code layer in the second code sequence is written over the judged code layer in the first code sequence.

According to a ninth aspect of the present invention, a coding apparatus comprises a hierarchical coding means for performing hierarchical coding for data to be coded to generate at least two code sequences, each comprising a plurality of code layers; a storage control means for storing a code layer, which has the highest priority among the code layers in the respective code sequences, in a code storage means, and storing other code layers in a temporary storage means; and a transfer judge means for transferring, according to priority, the code layers in the respective code sequences stored in the temporary storage means, from the temporary storage means to the code storage means.

According to a tenth aspect of the present invention, the above-mentioned coding apparatus further comprises a region control means for assigning a storage region of a prescribed size from the successive storage regions in the code storage means; the storage means for storing a plurality of code sequences in the assigned memory region; a code transfer means for filling a vacancy in the storage region between the stored code sequences, by transferring one of the code sequences to the vacancy; and a region recover means for recovering a region in the assigned storage region, which region is not used for the storage.

According to an eleventh aspect of the present invention, a coding apparatus comprises a sampling means for sampling fields of an image signal with a designated time interval; a hierarchical coding means for performing hierarchical coding for the image signal data sampled in the sampling step; a memory capacity calculating means for calculating a memory capacity used in the hierarchical coding step; a memory capacity raising means for raising the memory capacity to a prescribed lowest limit value when the calculated memory capacity is lower than the lowest limit value; a field interval calculating means for calculating a field interval in proportion to the calculated memory capacity; and means for designating the calculated field interval for the sampling step.

According to a twelfth aspect of the present invention, the above-mentioned coding apparatus further comprises a raising detection means for detecting that the memory capacity is raised in the memory capacity raising step; and means for controlling the hierarchical coding so that the code amount is increased, when the raising detection step detects the raising of the memory capacity.

According to a thirteenth aspect of the present invention, a wavelet transfer apparatus comprises a shift register for successively shifting input data by two pixels, and storing data for at least two pixels; a low-pass filter for taking out a low frequency component from an output of the shift register, and outputting the low frequency component; a high-pass filter for taking out a high frequency component from the output of the shift register, and outputting the high frequency component; a data storage means for storing coefficient data which are obtained by the frequency division by the low-pass filter and the high-pass filter; and a main control means for controlling a sequence for wavelet transform. The shift register performs ½ subsampling of data stored in the data storage means. The main control means controls the ½ subsampling and the storage of the coefficient data in the data storage means, while controlling the address and the processing size in the data storage means for each frequency band, whereby the input data is frequency-divided.

According to a fourteenth aspect of the present invention, the above-mentioned wavelet transform apparatus further comprises coefficient line memories capable of high-speed burst transfer, for storing low-frequency coefficient data output from the low-pass filter and high-frequency coefficient data output from the high-pass filter, respectively; and a direct memory access means for transferring data output from the coefficient line memories, for each line, to the data storage means, and transferring data stored in the data storage means to the shift register. In this structure, the main control means outputs a control instruction to the direct memory access means so that the shift register performs ½ subsampling for the data stored in the data storage means and the coefficient data output from the low-pass filter and the high-pass filter are stored in the data storage means, while controlling the address and the processing size in the data storage means for each frequency band, whereby the input data is frequency-divided.

According to a fifteenth aspect of the present invention, the above-mentioned wavelet transform apparatus further comprises a coefficient storage means capable of high-speed burst transfer of data on a memory array in the horizontal direction and the vertical direction; and a switching means for selecting, as a receiver of data output from the coefficient line memory, one of the data storage means and the coefficient storage means. In this structure, the main control means outputs a control instruction to the direct memory access means so that one of the low-frequency coefficient data and the high-frequency coefficient data is stored in the coefficient line memory while the other is directly burst-transferred to the coefficient storage means and, thereafter, the coefficient data stored in the coefficient line memory is transferred to the coefficient storage means by the direct memory access means, while controlling the address and the processing size in the coefficient storage means for each frequency band, whereby the input data is frequency-divided.

According to a sixteenth aspect of the present invention, the above-mentioned wavelet transform apparatus further comprises a selector for selecting data to be input to the low pass filter and the high pass filter, from the data storage means and the coefficient storage means. In this structure, the main control means outputs a control instruction to the direct memory access means so that the coefficient data in the coefficient storage means in the horizontal direction or the vertical direction is frequency-divided and transferred to the coefficient line memory and, thereafter, the coefficient data stored in the coefficient line memory is successively burst-transferred to the coefficient storage means by the direct memory access means.

According to a seventeenth aspect of the present invention, in the above-mentioned wavelet transform apparatus, the low-pass filter and the high-pass filter are SSKFs (Symmetric Short Kernel Filter).

According to an eighteenth aspect of the present invention, the above-mentioned wavelet transform apparatus further comprises code extension means for giving an upper extension bit, by one bit, to data input to the low-pass filter and the high-pass filter, and the low-pass filter and the high-pass filter perform filter operation with upper extension of precision, by one bit, compared with the input data.

According to a nineteenth aspect of the present invention, a wavelet reverse transfer apparatus comprises a shift register for successively shifting input data by two pixels, and storing data for at least two pixels; a first decoding filter for decoding output data from the shift register, and outputting odd-number decoded coefficient data; a second decoding filter for decoding output data from the shift register, and outputting even-number decoded coefficient data; a data storage means for storing the decoded coefficient data output from the first decoding filter and the second decoding filter; and a main control means for controlling a sequence of wavelet reverse transform. The main control means controls a process of buffering the data stored in the data stored means by the shift register and a process of storing the coefficient data, which are decoded and up-sampled by the decoding filters, while controlling the address and the processing size in the data storage mons for each frequency band, whereby the input data is subjected to wavelet reverse transform.

According to a twentieth aspect of the present invention, the above-mentioned wavelet reverse transform apparatus further comprises coefficient line memories capable of high-speed burst transfer, for storing decoded coefficient data output from the first and second decoding filters; and a direct memory access means for transferring data output from the coefficient line memories, for each line, to the data storage means, and transferring data stored in the data storage means to the shift register. The main control means outputs a control instruction to the direct memory access means so that the data stored in the data storage means is buffered by the shift register and the coefficient data, which are decoded and up-sampled by the decoding filters, are stored in the data storage means, while controlling the address and the processing size in the data storage means for each frequency band, whereby the input data is frequency-divided.

According to a twenty-first aspect of the present invention, the above-mentioned wavelet reverse transform apparatus further comprises a coefficient storage means capable of high-speed burst transfer of data on a memory array in the horizontal direction and the vertical direction; and a switching means for selecting, as a receiver of data output from the coefficient line memory, one of the data storage means and the coefficient storage means. The main control means outputs a control instruction to the direct memory access means so that one of the odd-number decoded coefficient data or the even-number decoded coefficient data is stored in the coefficient line memory while the other is directly burst-transferred to the coefficient storage means by the direct memory access means and, thereafter, the coefficient data stored in the coefficient line memory is transferred to the coefficient storage means by the direct memory access means, while controlling the address and the processing size in the coefficient storage means for each frequency band, whereby the input data is subjected to wavelet reverse transform.

According to a twenty-second aspect of the present invention, the above-mentioned wavelet reverse transform apparatus further comprises a selector for selecting data to be input to the first and second decoding filters, from the data storage means and the coefficient storage means. The main control means outputs a control instruction to the direct memory access means so that the coefficient data in the coefficient storage means in the horizontal direction or the vertical direction is decoded and transferred to the coefficient line memory and, thereafter, the decoded data stored in the coefficient line memory is successively burst-transferred to the coefficient storage means by the direct memory access means.

According to a twenty-third aspect of the present invention, in the above-mentioned wavelet reverse transform apparatus, the input data to the first and second coding filters are given one bit upper extension, compared with the input data to be subjected to wavelet reverse transform and stored in the coefficient storage means.

According to a twenty-fourth aspect of the present invention, the above-mentioned wavelet transform apparatus further comprises decoding filter for decoding wavelet-transformed data; and a decoded coefficient line memory for storing coefficient data decoded by the decoding filter. In this structure, one of low-frequency coefficient data and high-frequency coefficient data stored in the data storage means is transferred to the decoded coefficient line memory. The other coefficient data is transferred to the decoding filter and, simultaneously, the coefficient data stored in the decoded coefficient line memory is transferred to the decoding filter and decoded and, thereafter, the decoded data is stored in the coefficient line memory. After the decoding for each line, the decoded data stored in the coefficient line memory is transferred to one of the coefficient storage means and the data storage means. The main control means conducts the above-mentioned processing repeatedly, for each frequency band, while controlling the address and the processing size in the coefficient storage means.

According to a twenty-fifth aspect of the present invention, the above-mentioned wavelet transform apparatus further comprises a decoding filter for decoding wavelet-transformed data; and decoded coefficient line memory. In this structure, one of low-frequency coefficient data and high-frequency coefficient data stored in the data storage means is transferred to the decoded coefficient line memory. The other coefficient data is transferred to the decoding filter and, simultaneously, the coefficient data stored in the decoded coefficient line memory is transferred to the decoding filter and decoded end, thereafter, the decoded data is stored in the coefficient line memory. After the decoding for each line, the decoded data stored in the coefficient line memory is transferred to the data storage means. The main control means conducts the above-mentioned processing repeatedly, for each frequency band, while controlling the address and the processing size in the coefficient storage means.

BRIEF DESCRIPTION OF THE INVENTION

FIGS. 3($a$) and 3($b$) are diagrams illustrating a priority judge means and a coding means, respectively, according to the first embodiment of the invention.

Figure 4:
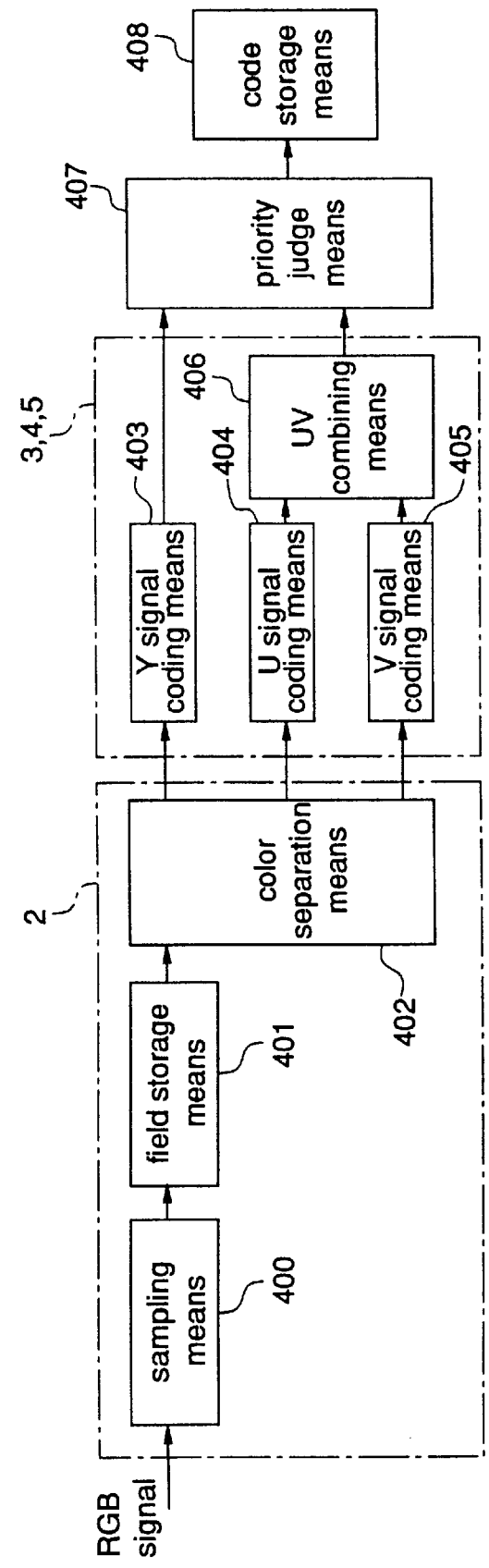

FIG. 4 is a block diagram illustrating a coding apparatus according to the first embodiment of the invention.

Figure 5:
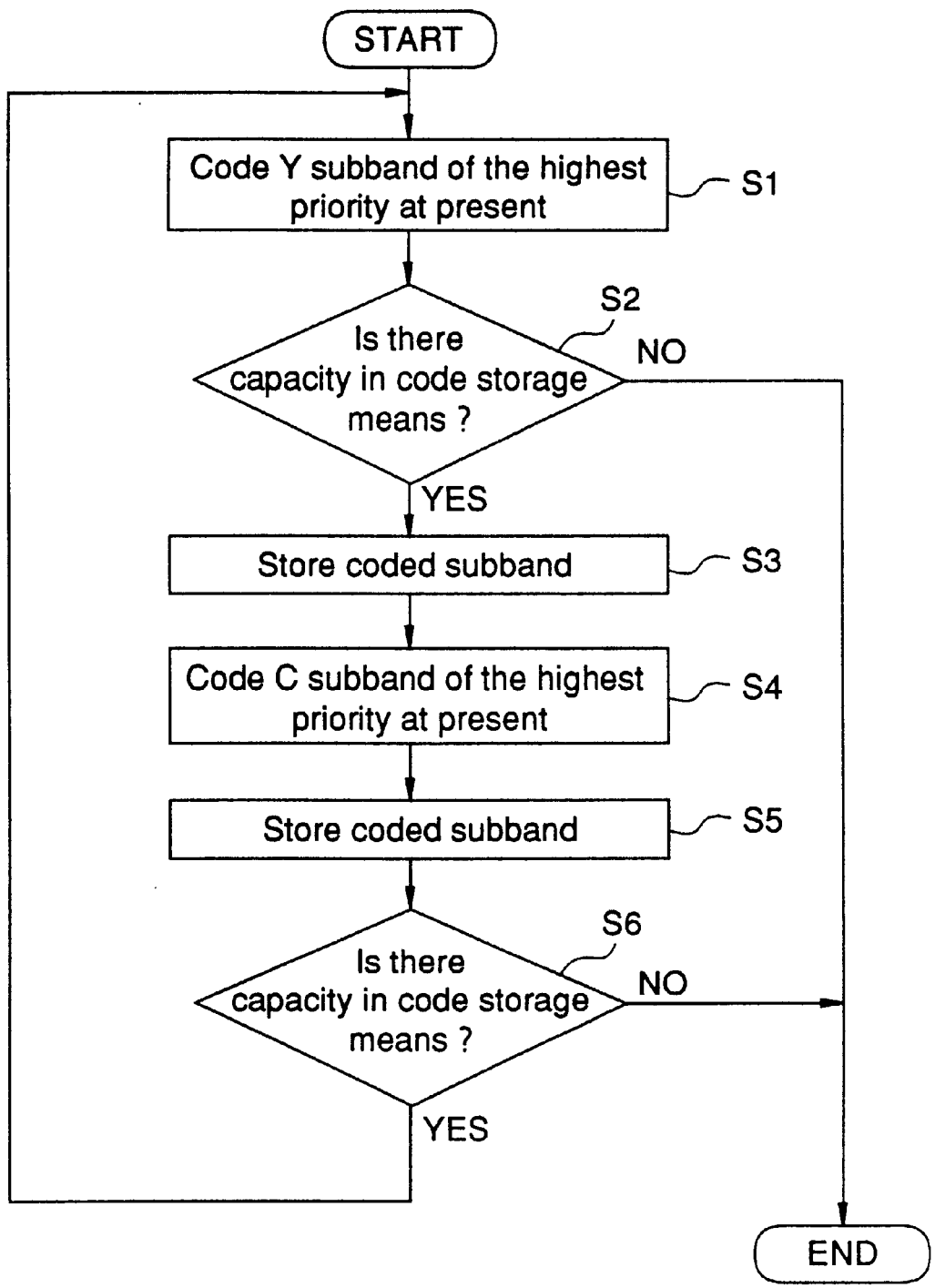

FIG. 5 is a flowchart showing a coding method according to the first embodiment of the invention.

Figure 6:
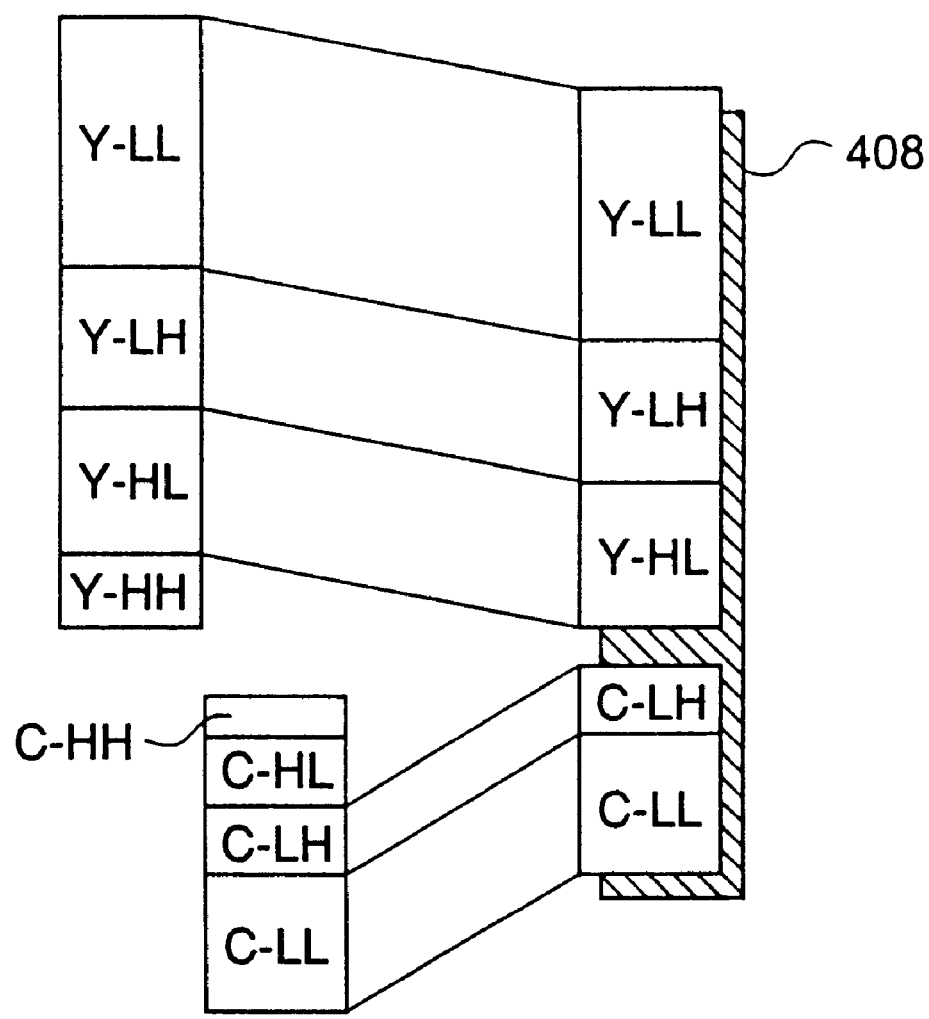

FIG. 6 is a diagram illustrating a process of storing data in a code storage means according to the first embodiment of the invention.

Figure 7:
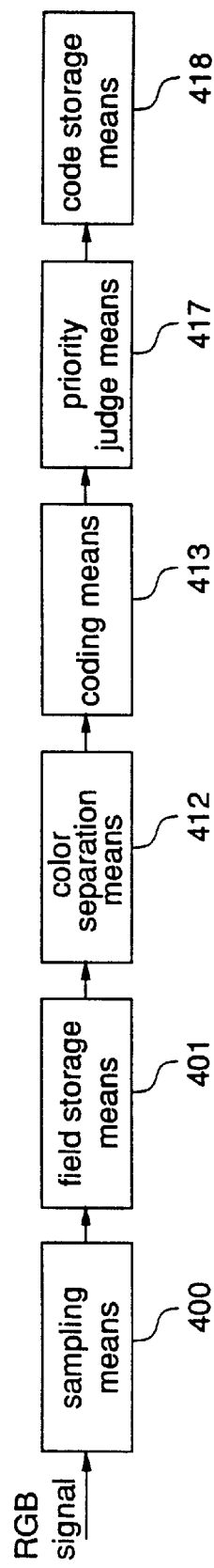

FIG. 7 is a block diagram obtained by simplifying the block diagram shown in FIG. 4.

Figure 8:
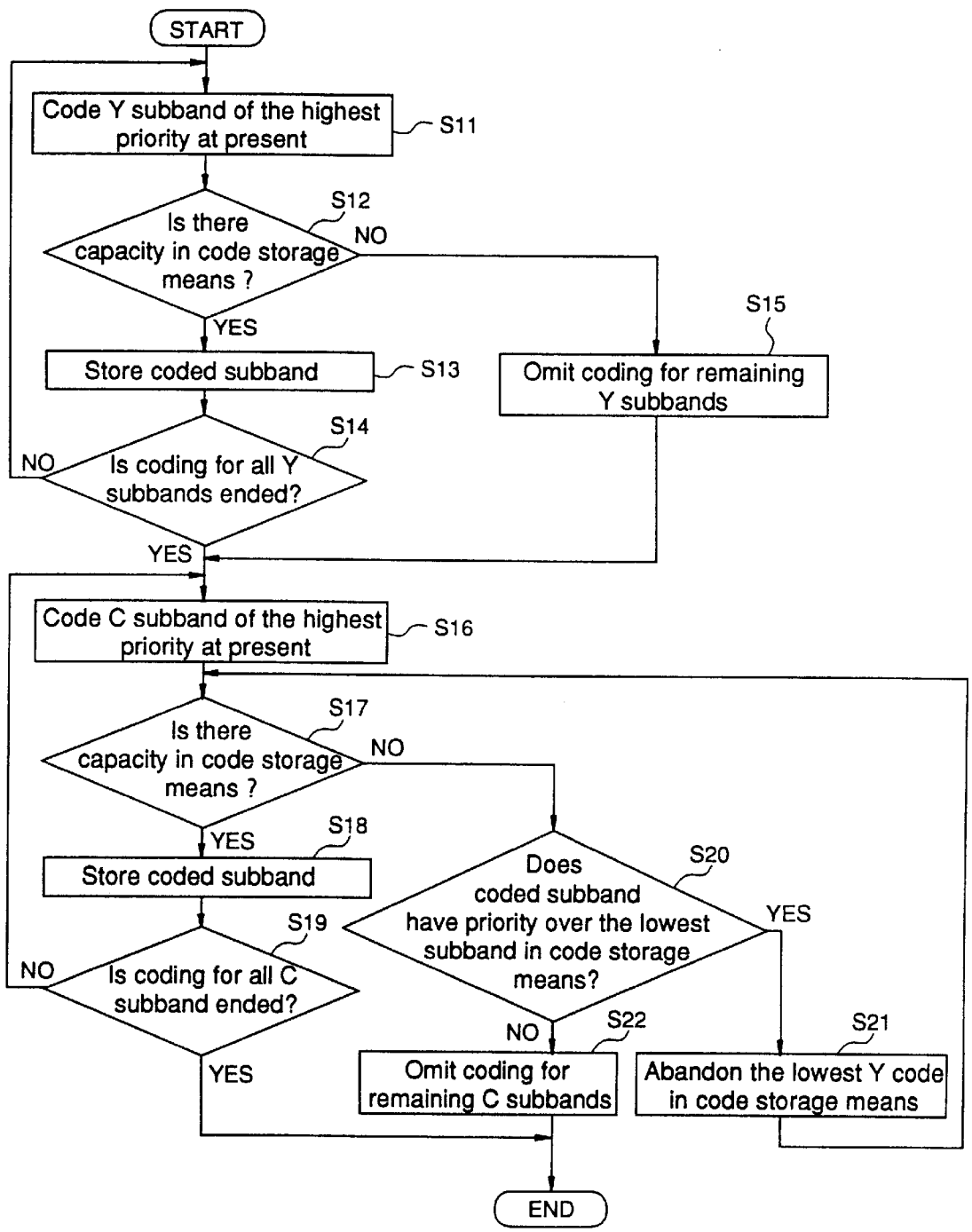

FIG. 8 is a flowchart showing a coding method according to a second embodiment of the invention.

Figure 9:
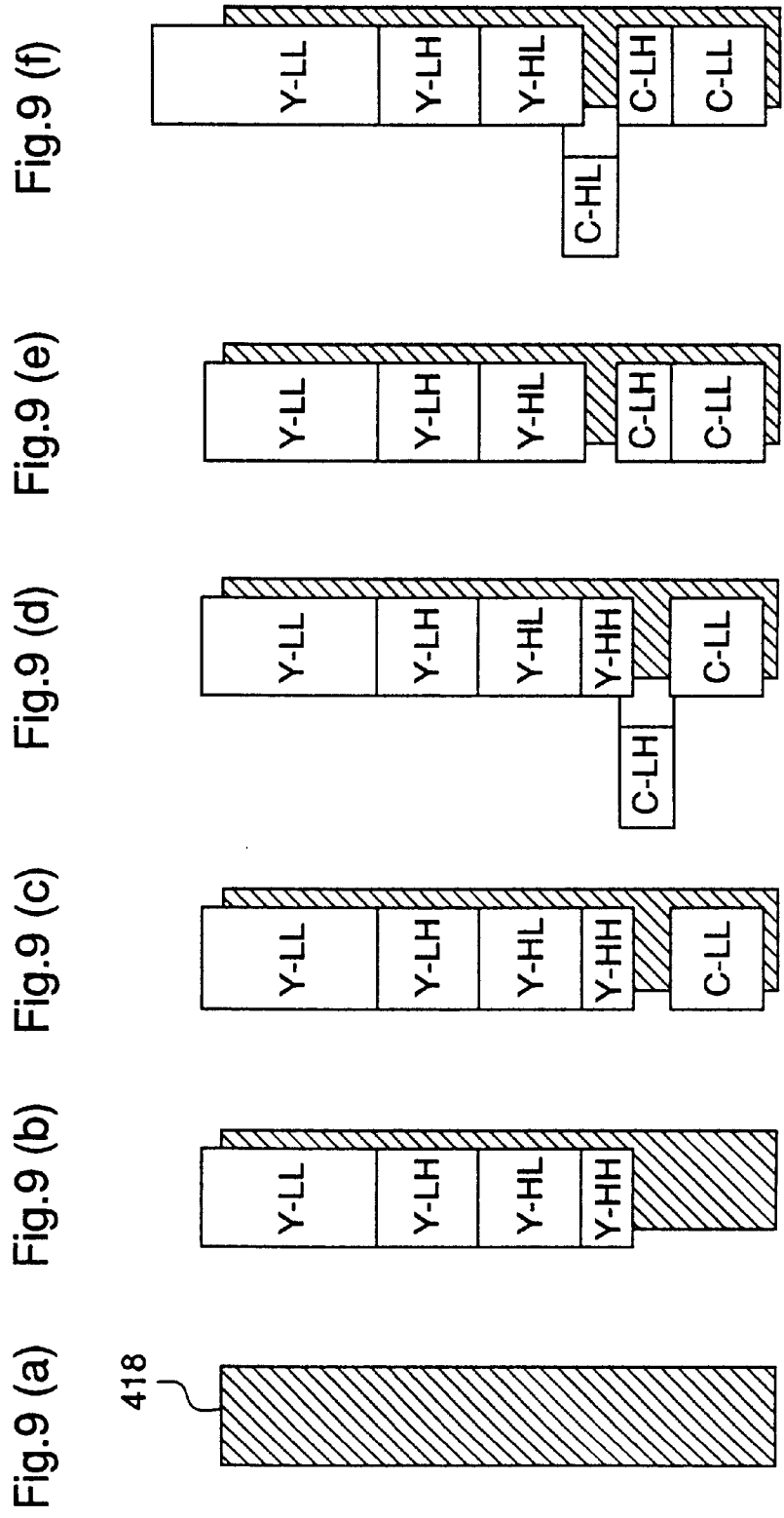

FIGS. 9($a$)–9($f$) are diagrams illustrating an example of a manner of storing codes in a code storage means according to the second embodiment of the invention.

Figure 10:
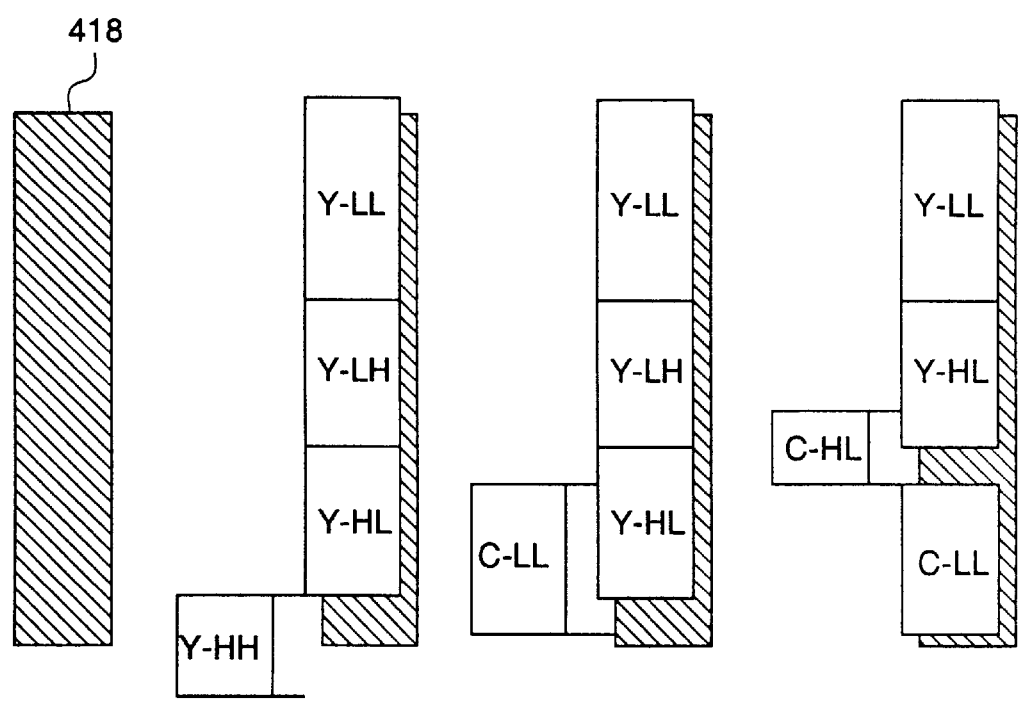

FIGS. 10($a$)–10($d$) are diagrams illustrating another example of a manner of storing codes in a code storage means according to the second embodiment of the invention.

FIGS. 11($a$)–11($c$) are diagrams illustrating still another example of a manner of storing codes in a code storage area according to the second embodiment of the invention.

FIGS. 12($a$)–12($e$) are diagrams illustrating an example of a manner of storing codes in a code storage means according to a third embodiment of the invention.

Figure 13:
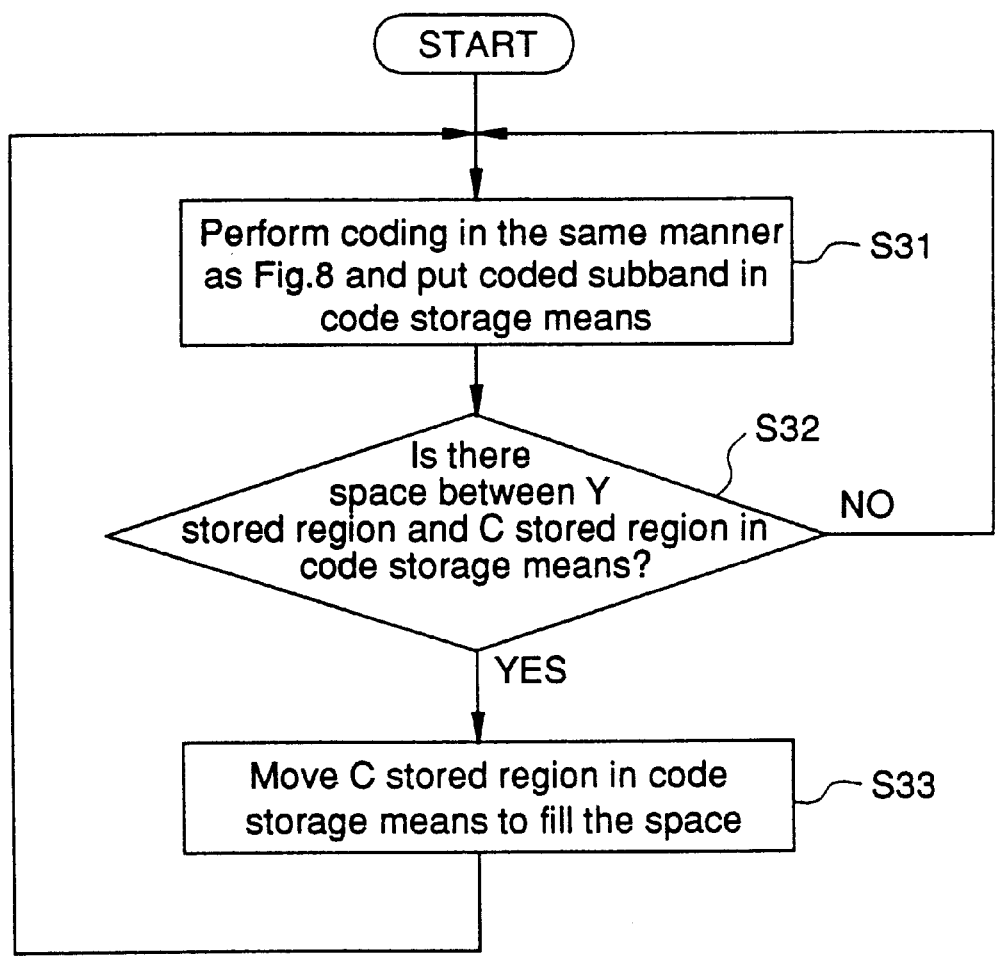

FIG. 13 is a flowchart showing the operation according to the third embodiment of the invention.

Figure 14:
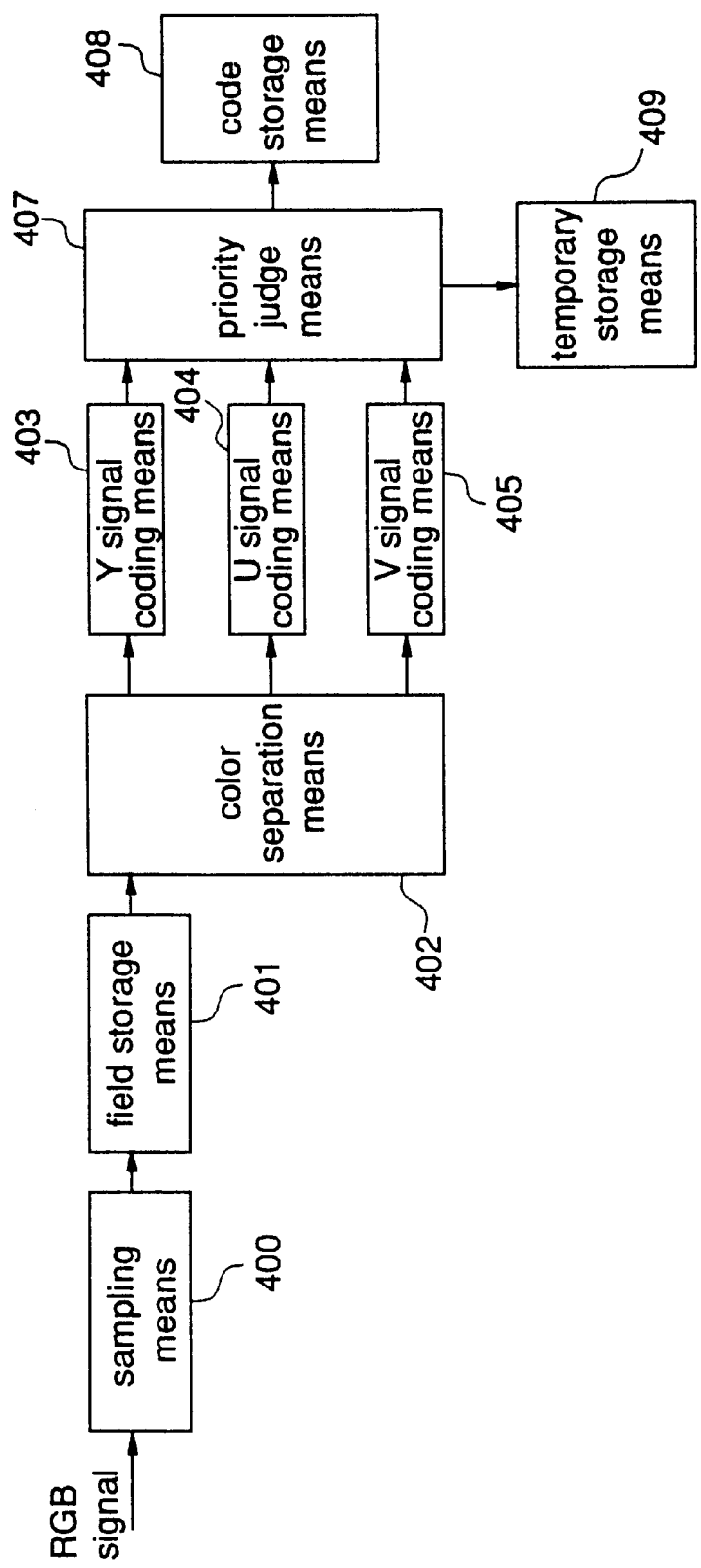

FIG. 14 is a block diagram illustrating a coding apparatus according to a fourth embodiment of the invention.

Figure 15:
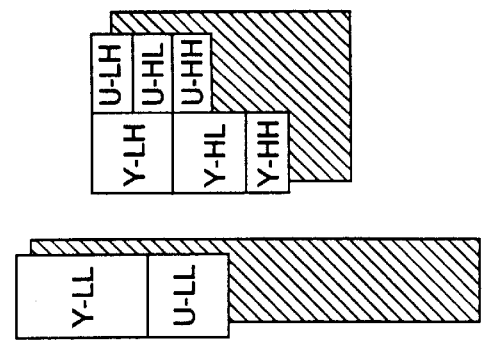
Figure 15:
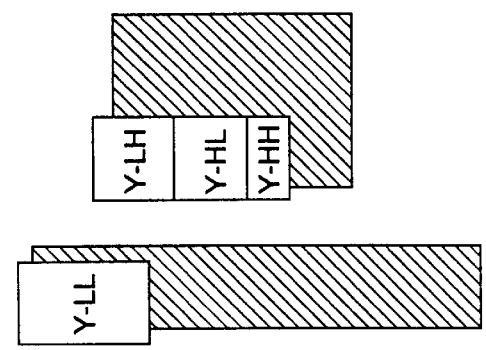
Figure 15:
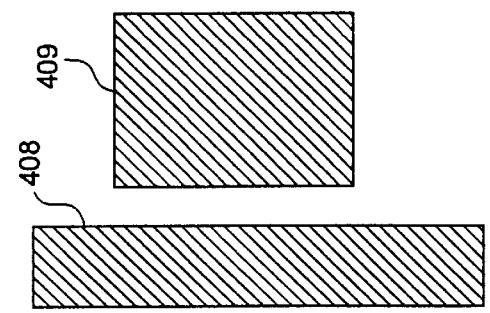
Figure 15:
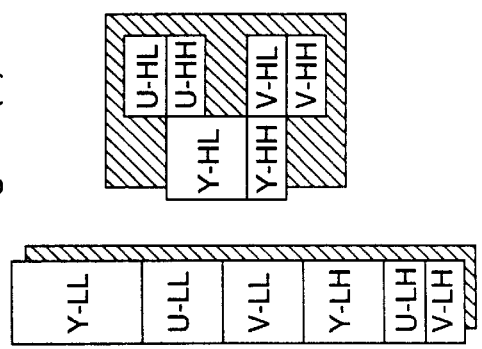
Figure 15:
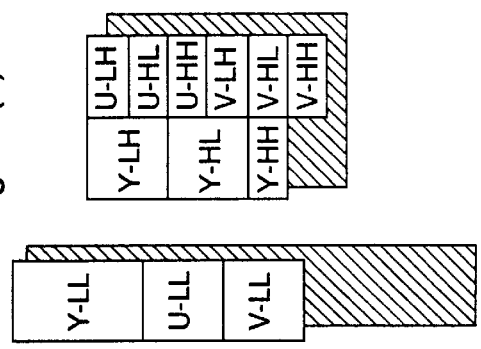

FIGS. 15($a$)–15($e$) are diagrams illustrating an example of a manner of storing codes in a code storage means and a temporary storage means according to the fourth embodiment of the invention.

Figure 16:
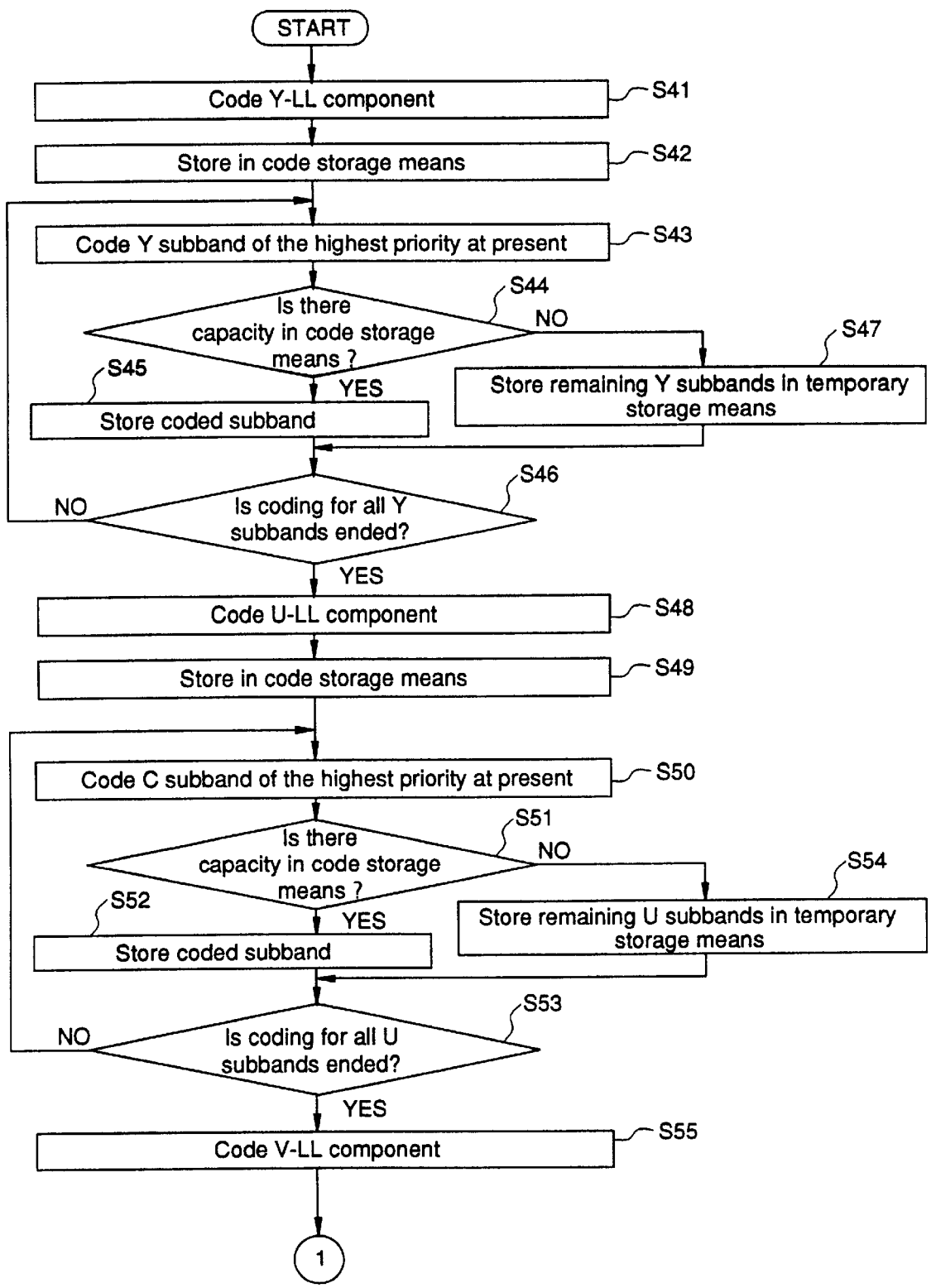
Figure 16:
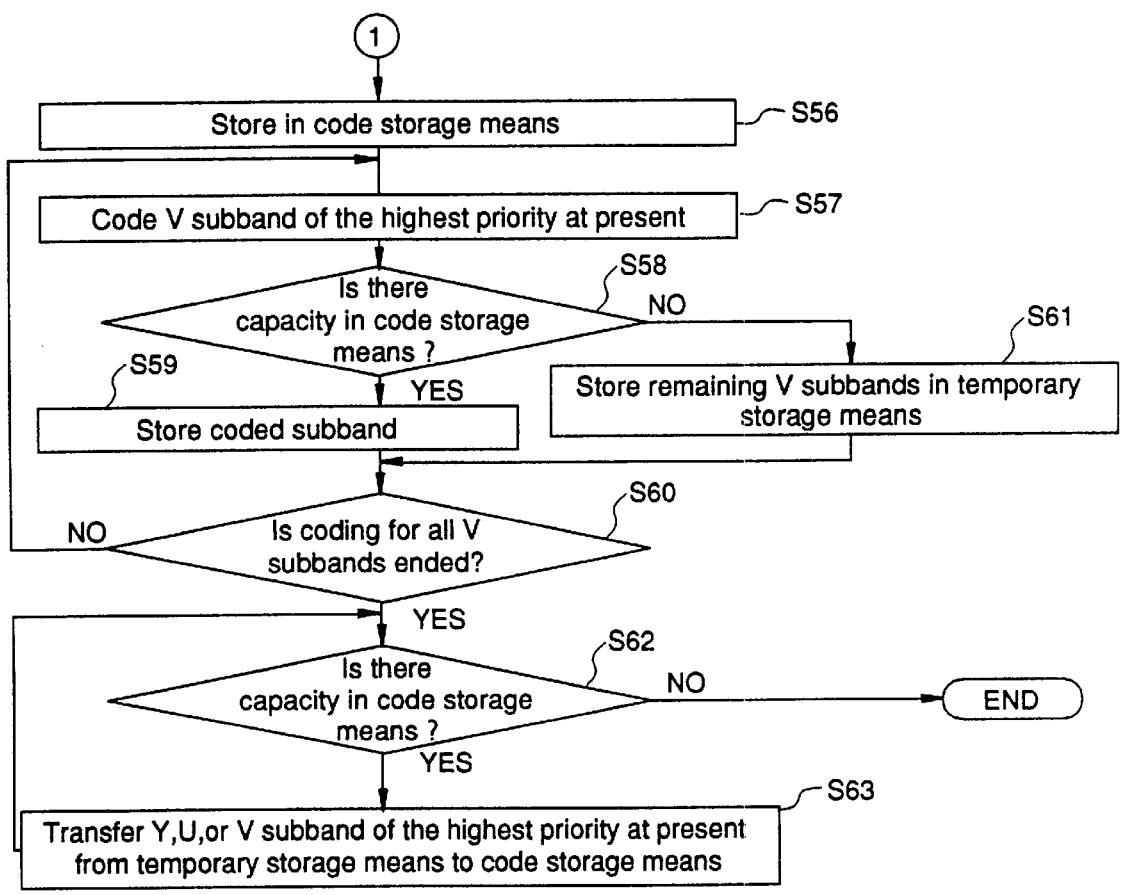

FIGS. 16($a$)–16($b$) is a flowchart illustrating the operation according to the fourth embodiment of the invention.

Figure 17:
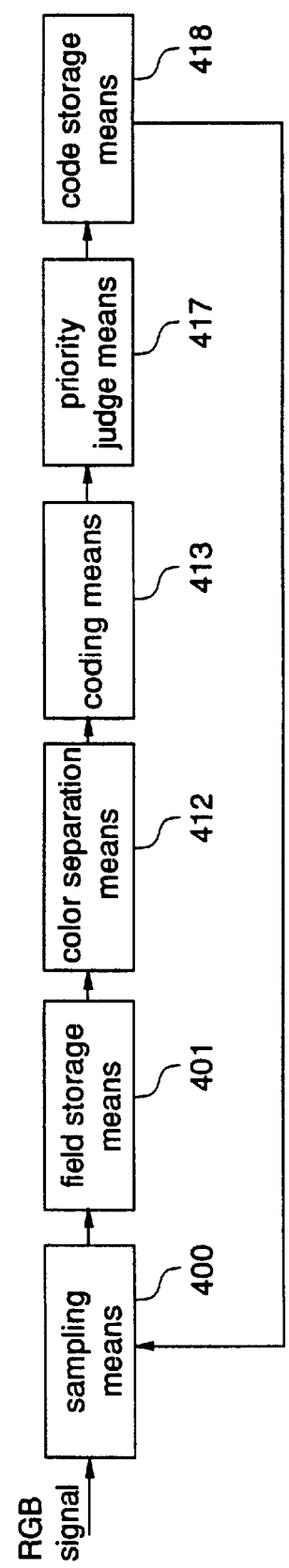

FIG. 17 is a block diagram illustrating a coding apparatus according to a fifth embodiment of the invention.

Figure 18:
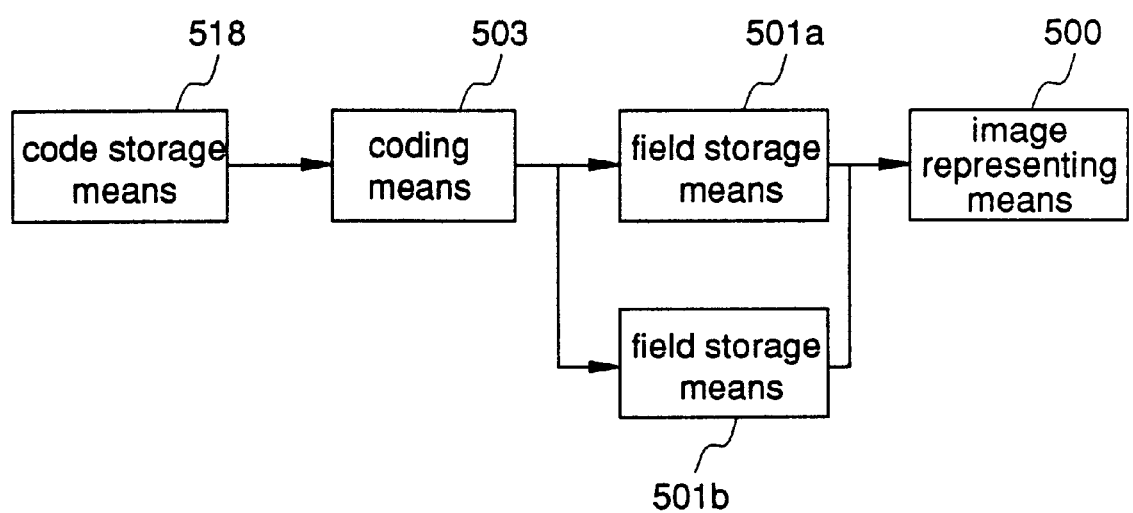

FIG. 18 is a block diagram illustrating a decoding apparatus according to a sixth embodiment of the invention.

Figure 19:
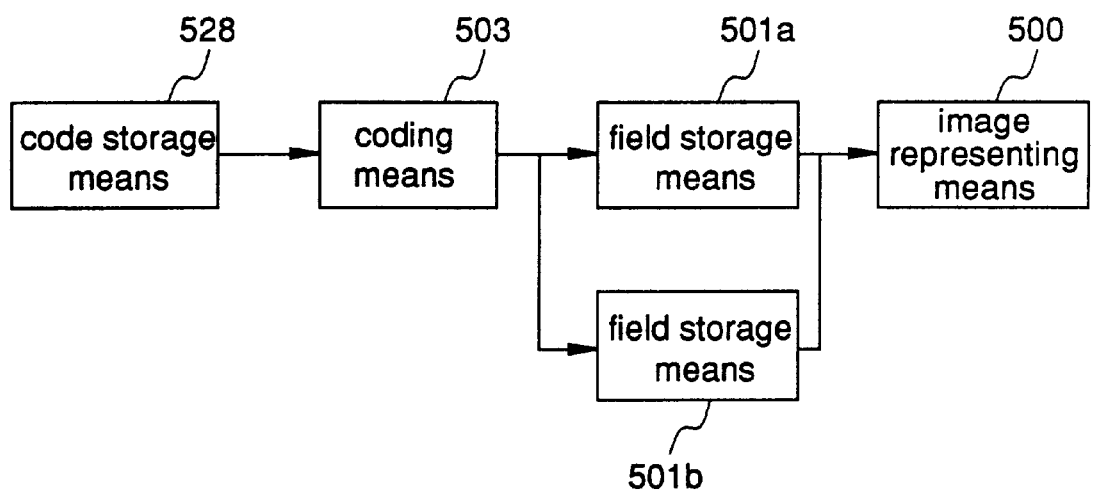

FIG. 19 is a block diagram illustrating a decoding apparatus according to a seventh embodiment of the invention.

Figure 20:
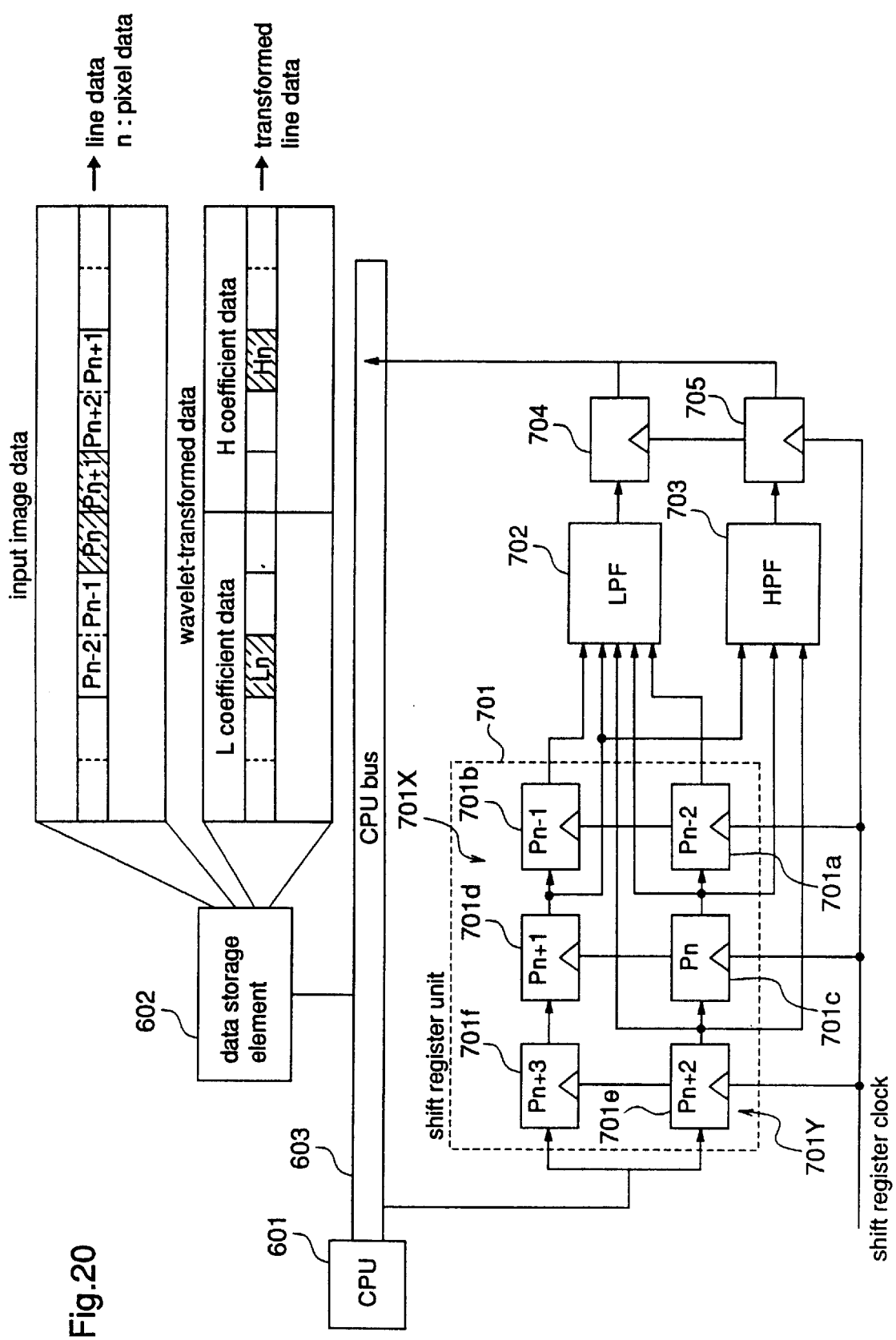

FIG. 20 is a block diagram illustrating a wavelet transform apparatus according to an eighth embodiment of the invention.

FIGS. 21($a$)–21($f$) are diagrams showing process steps of dividing an input image into a plurality of frequency sub-bands using the apparatus shown in FIG. 20.

Figure 22:
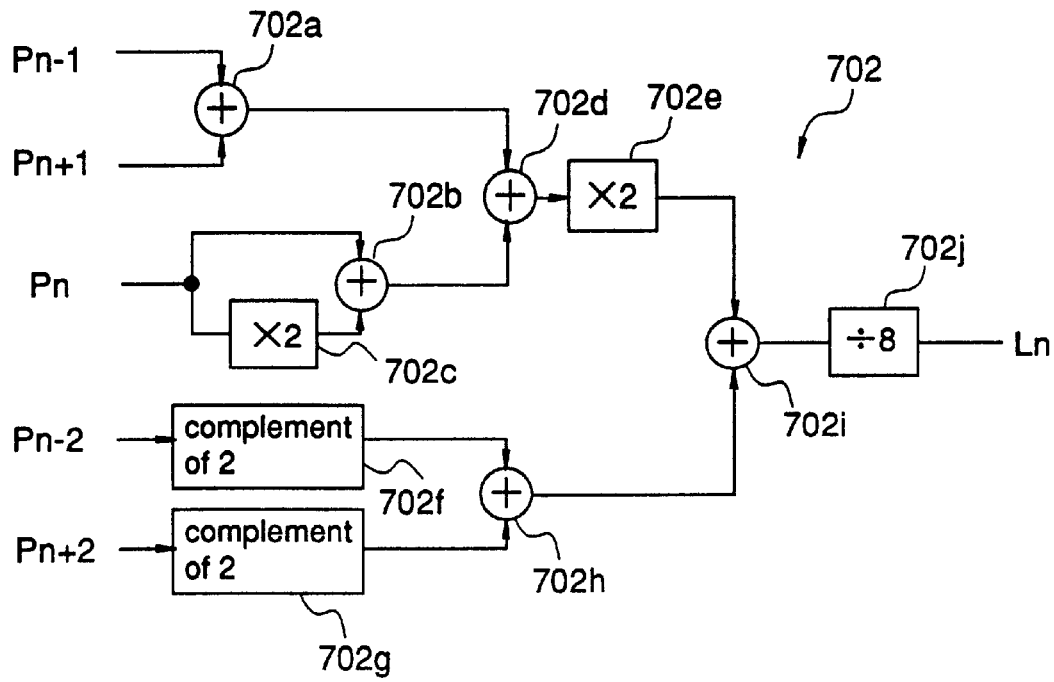
Figure 22:
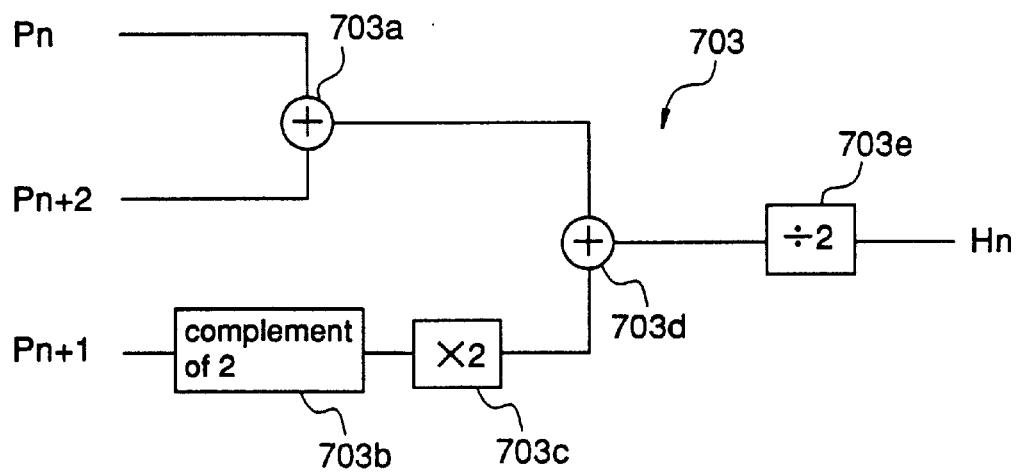

FIGS. 22($a$) and 22($b$) are diagrams illustrating an LPF and an HPF, respectively, included in the apparatus shown in FIG. 20.

Figure 23:
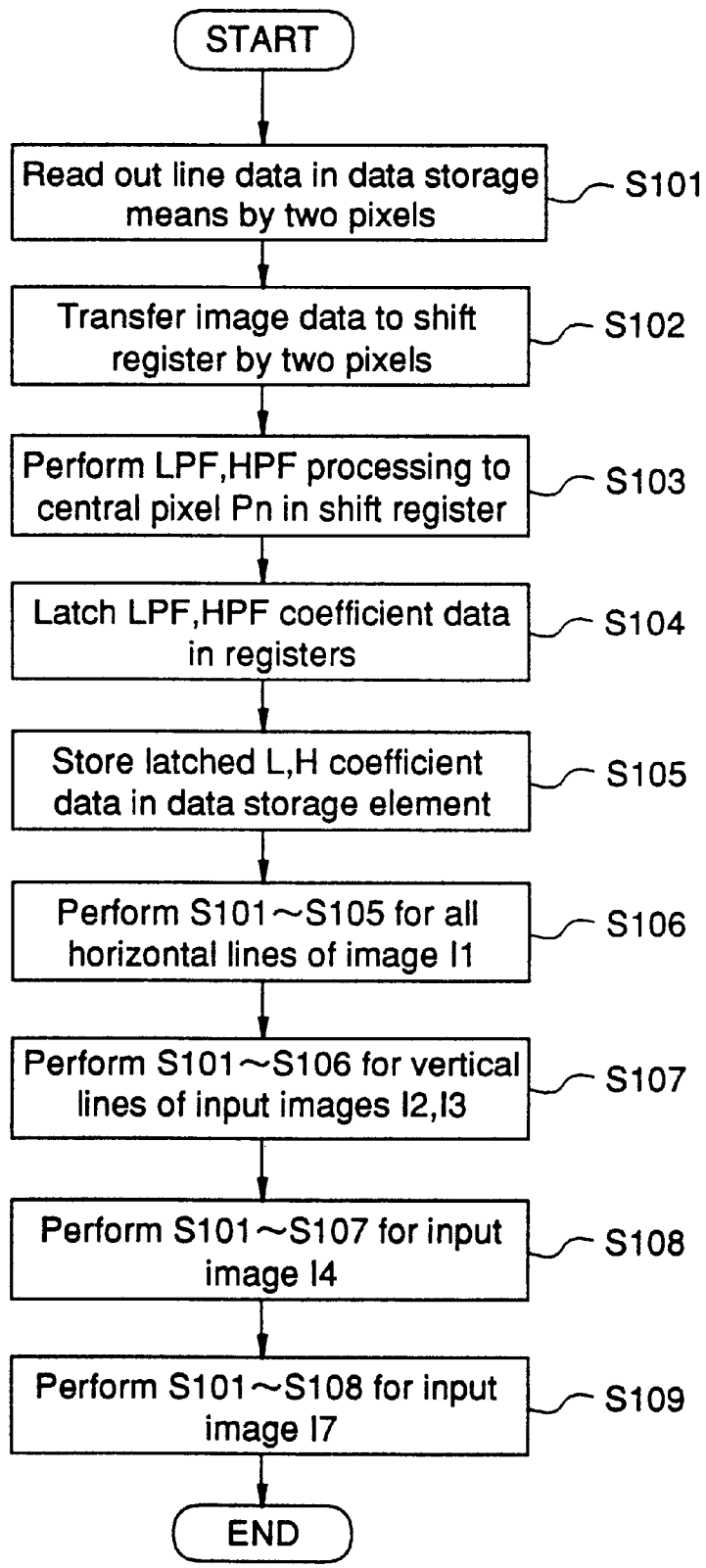

FIG. 23 is a flowchart illustrating the operation of the wavelet transform apparatus according to the eighth embodiment of the invention.

Figure 24:
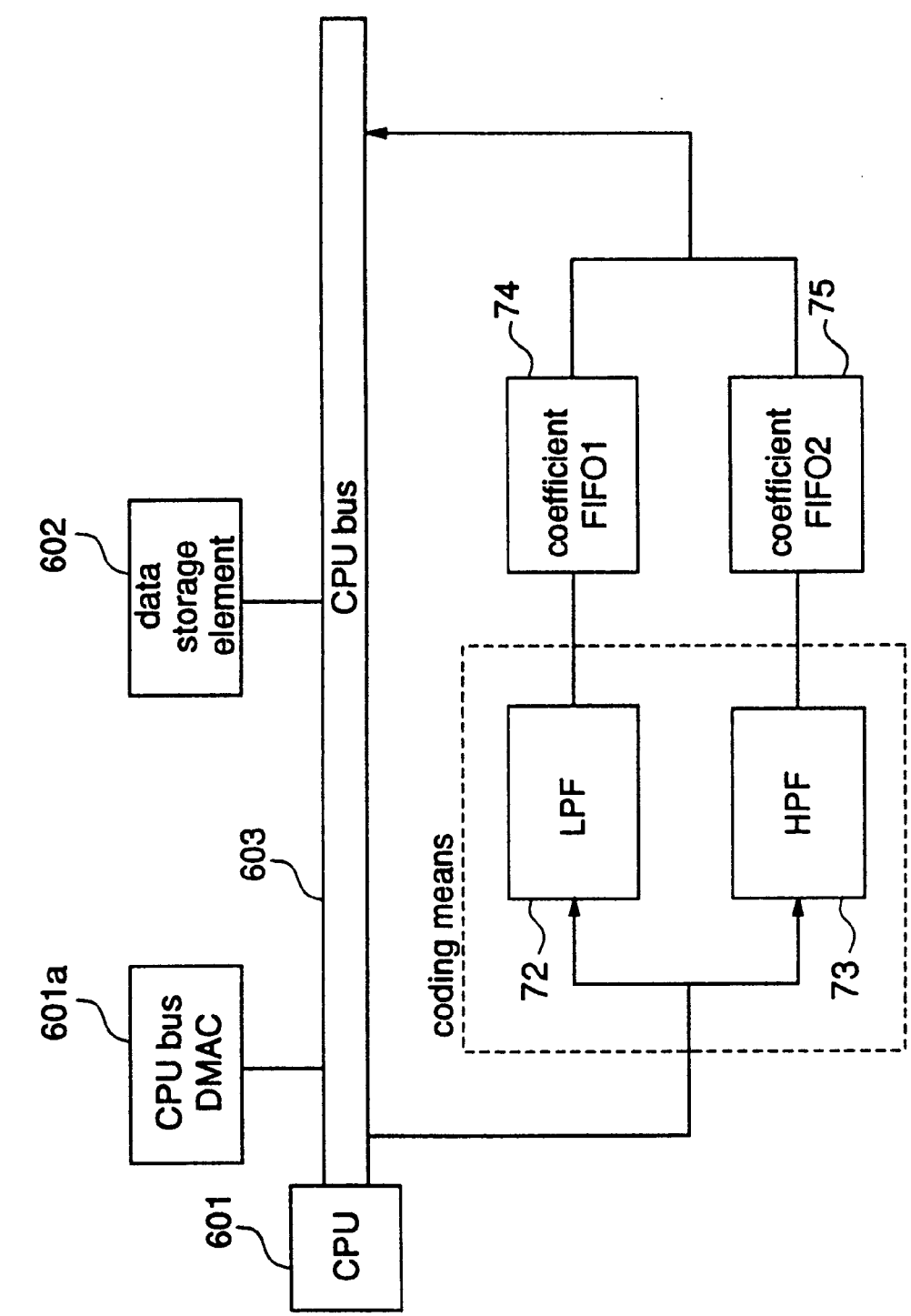

FIG. 24 is a block diagram illustrating a wavelet transform apparatus according to a ninth embodiment of the invention.

Figure 25:
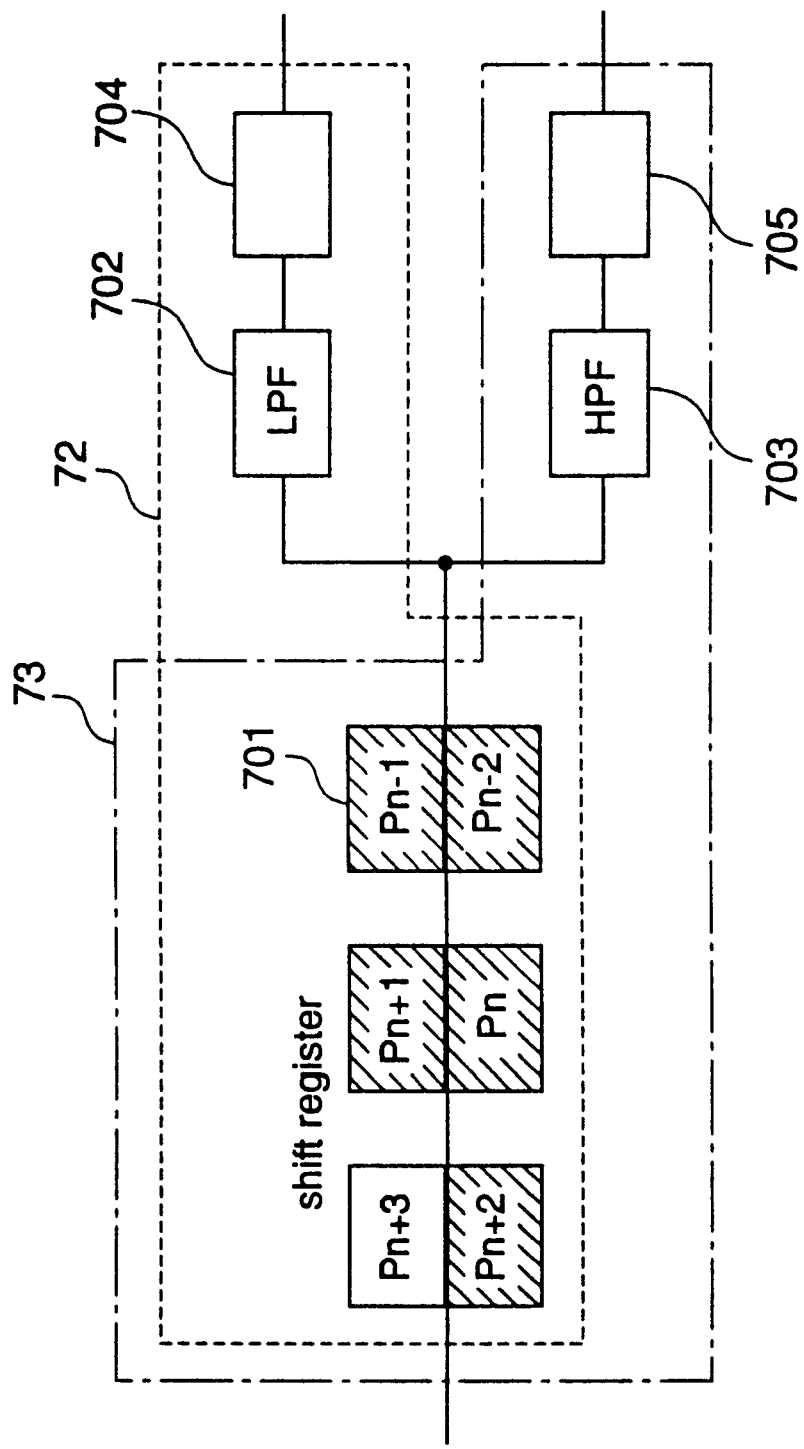

FIG. 25 is a block diagram illustrating an LPF and an HPF included in the apparatus shown in FIG. 24.

Figure 26:
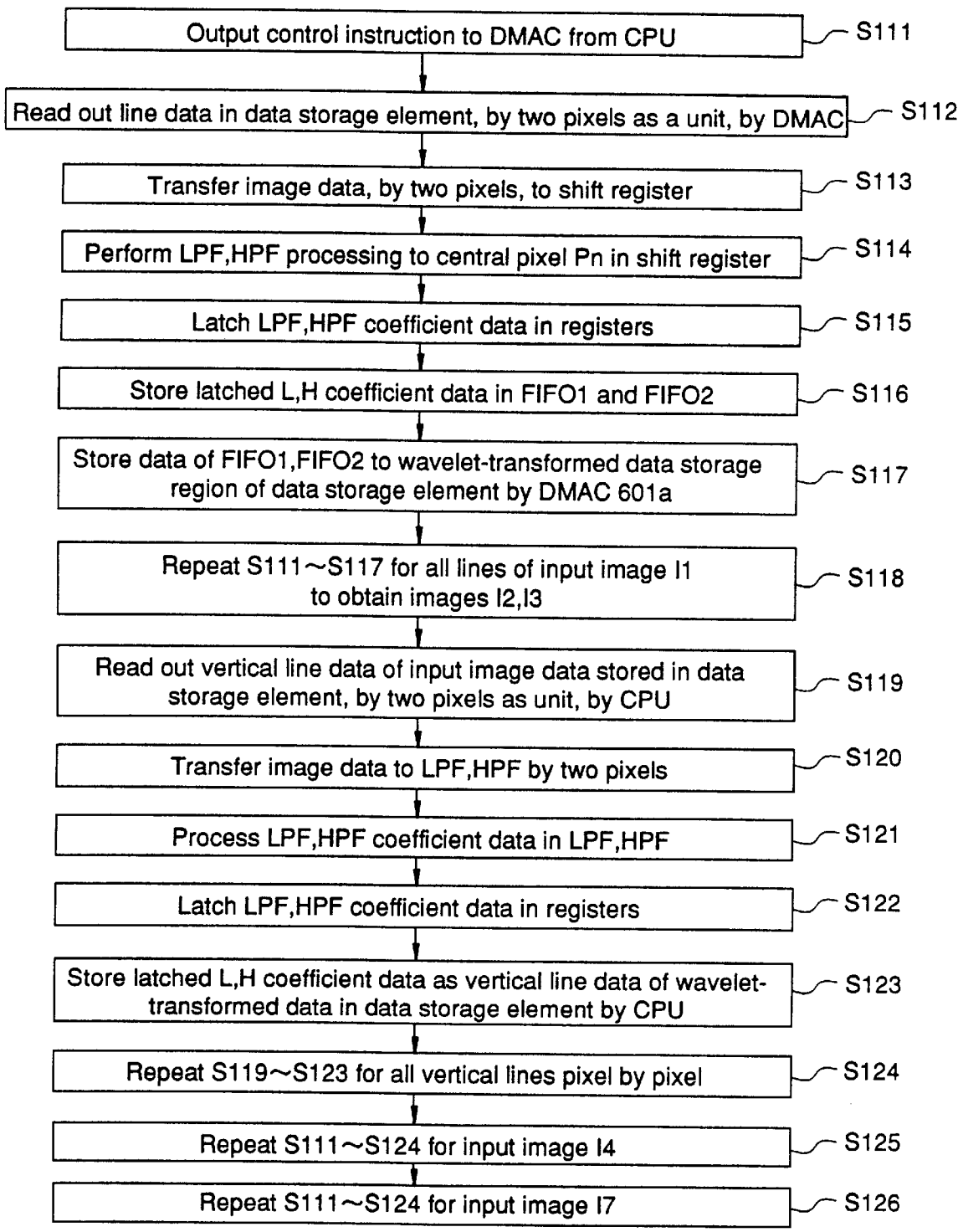

FIG. 26 is a flowchart illustrating the operation of the wavelet transform apparatus according to the ninth embodiment of the invention.

Figure 27:
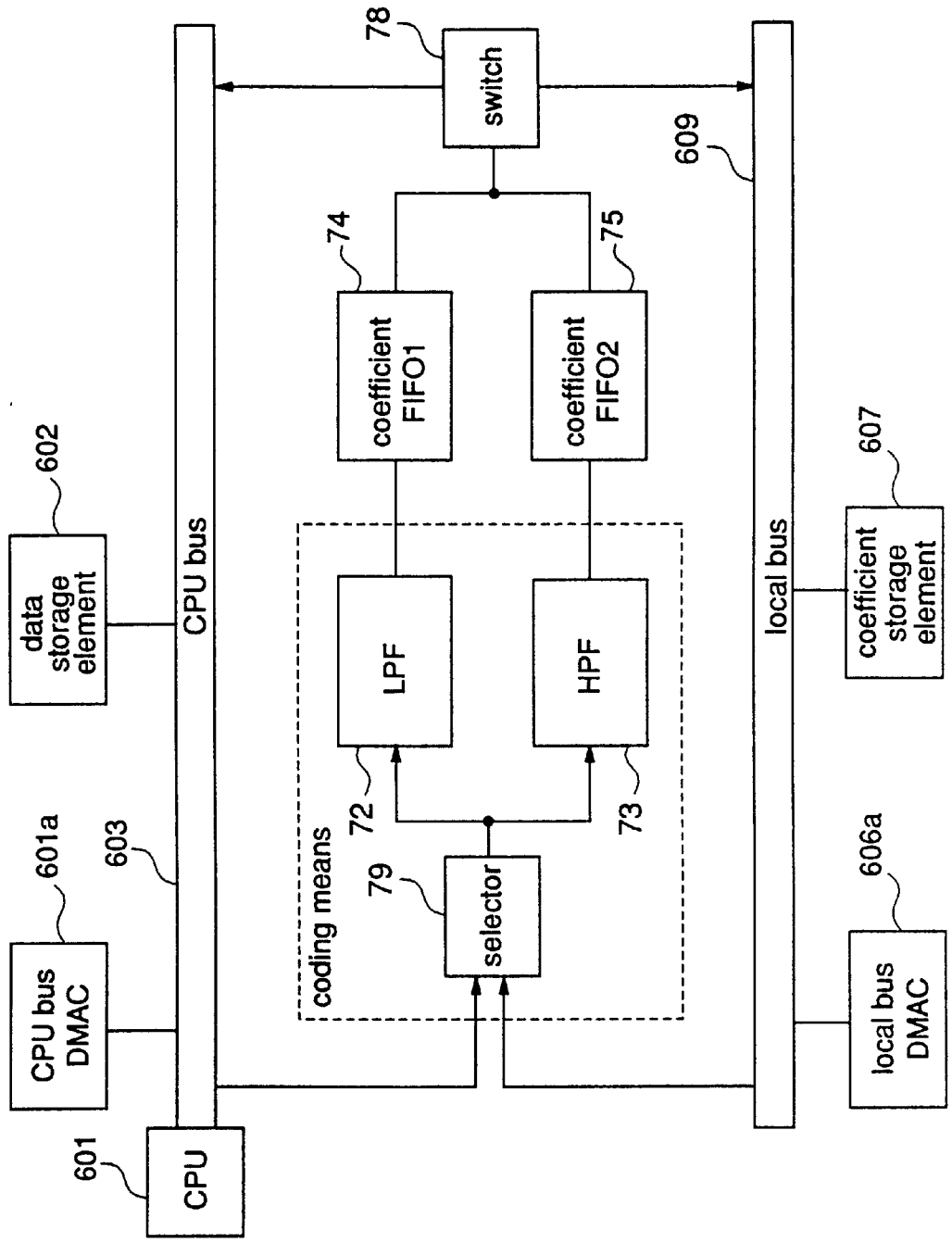

FIG. 27 is a block diagram illustrating a wavelet transform apparatus according to a tenth embodiment of the invention.

Figure 28:
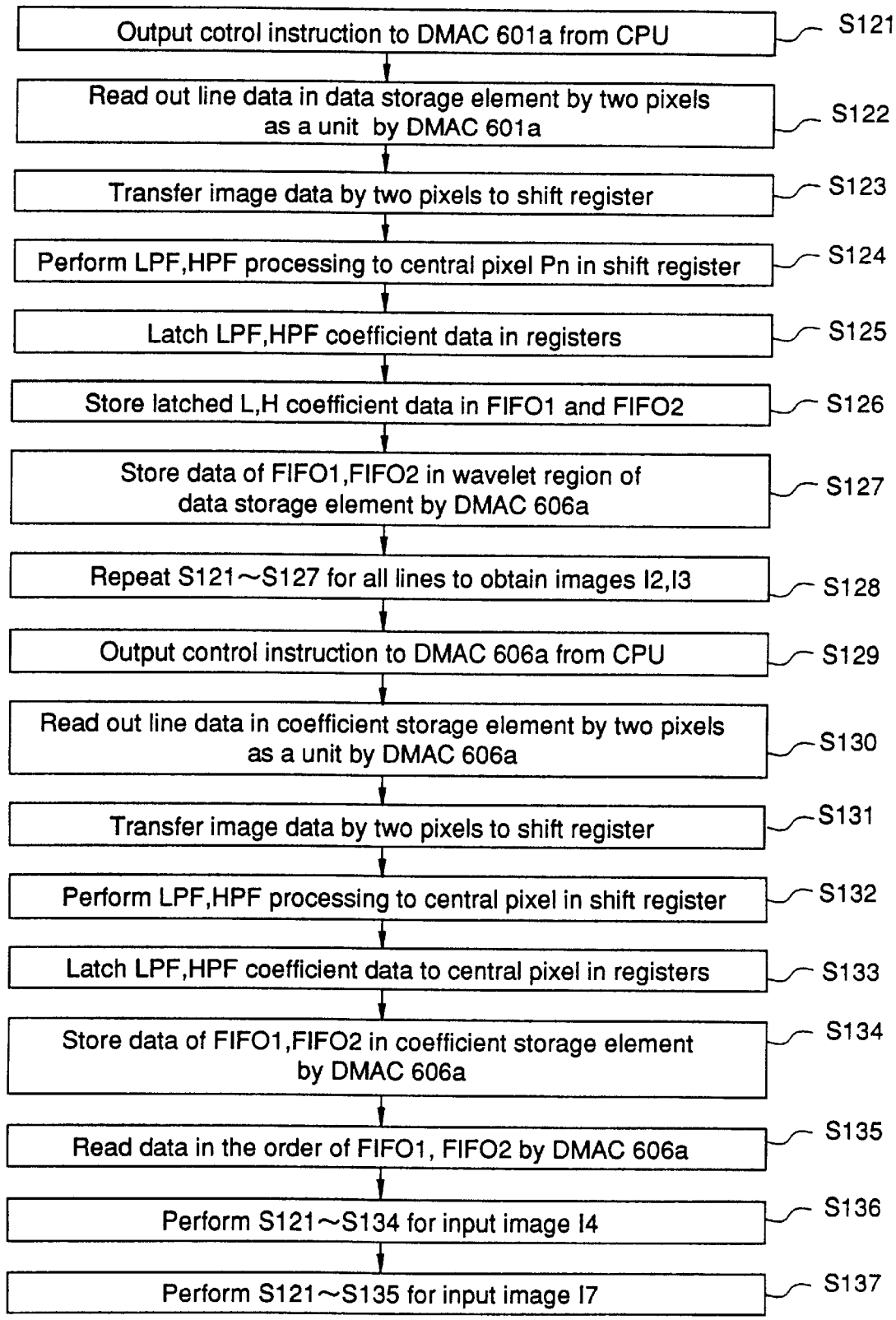

FIG. 28 is a flowchart illustrating the operation of the apparatus shown in FIG. 27.

Figure 29:
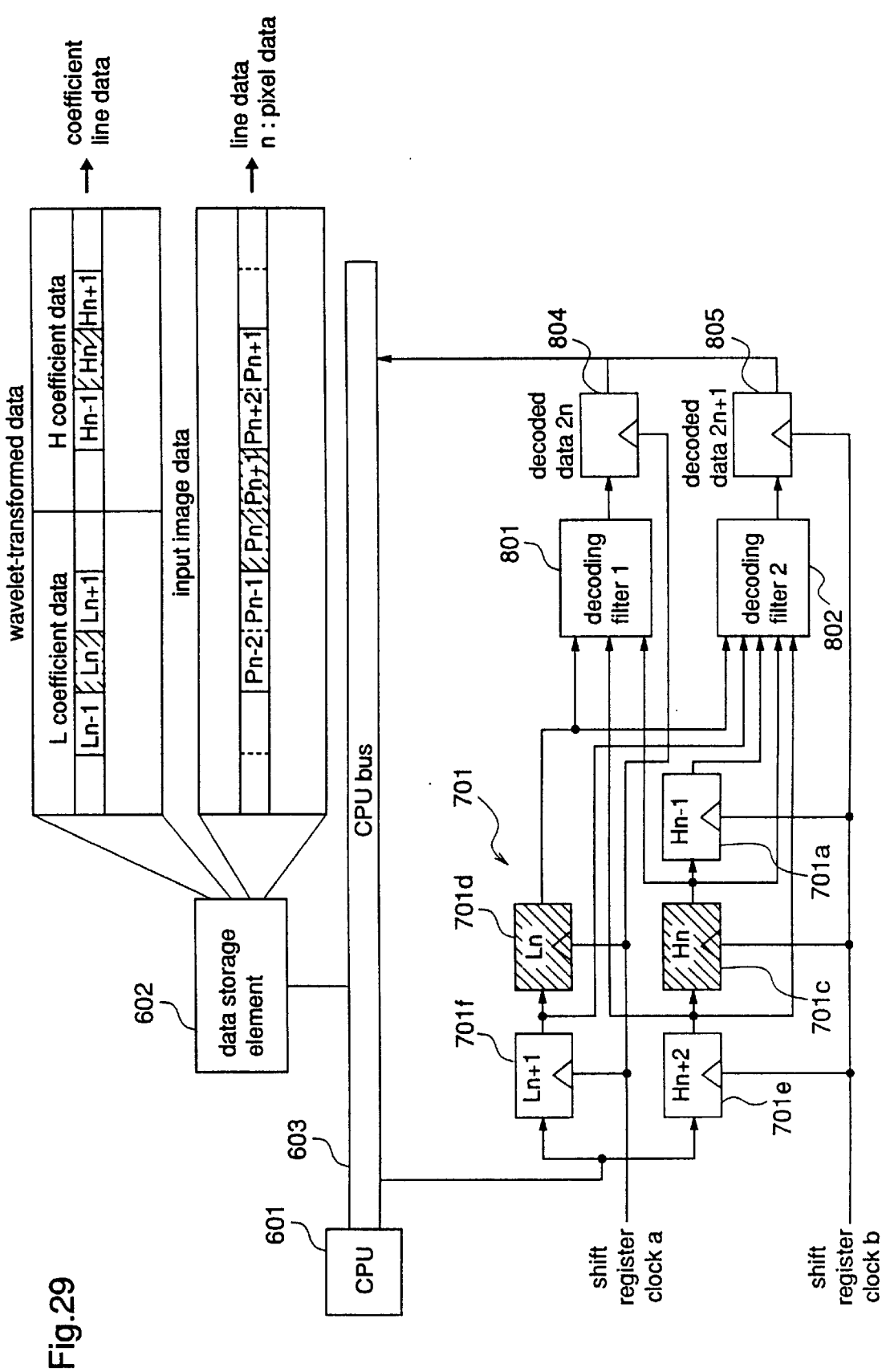

FIG. 29 is a block diagram illustrating a wavelet reverse apparatus according to an eleventh embodiment of the invention.

Figure 30:
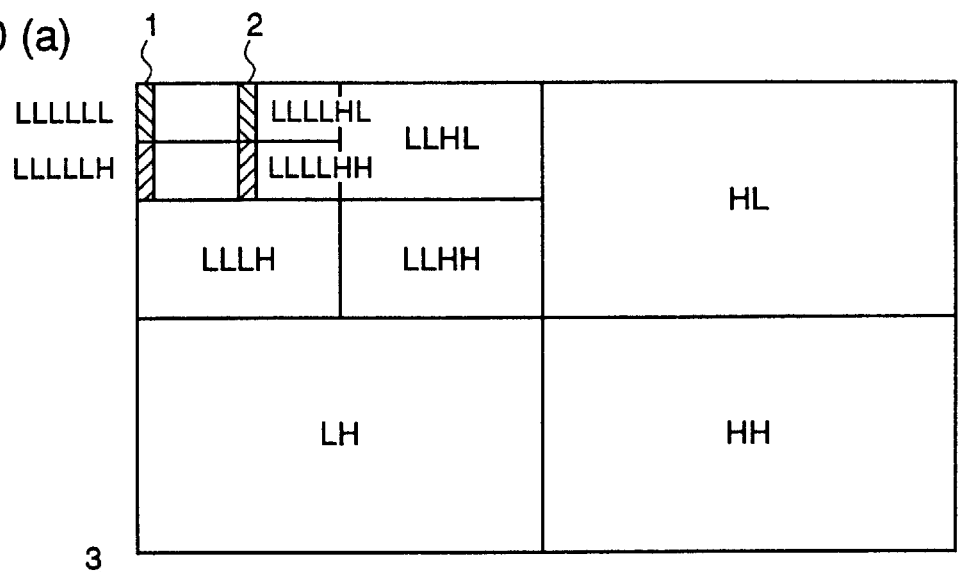
Figure 30:
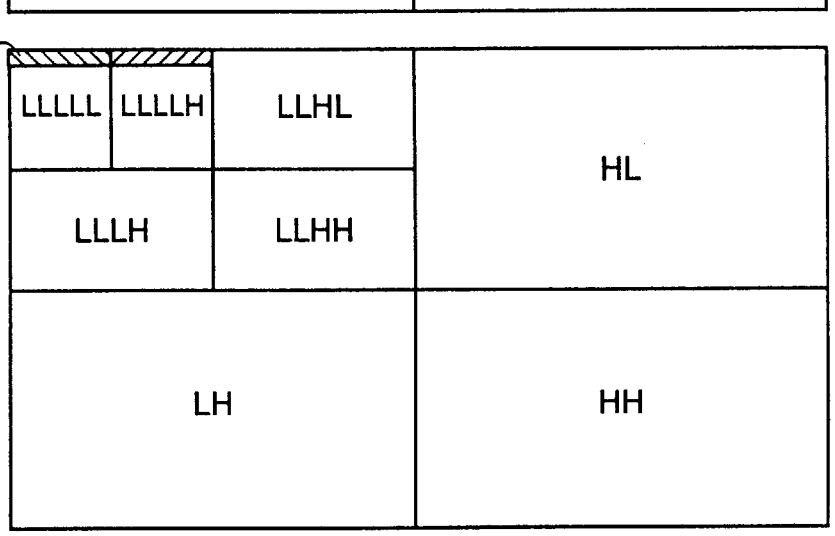
Figure 30:
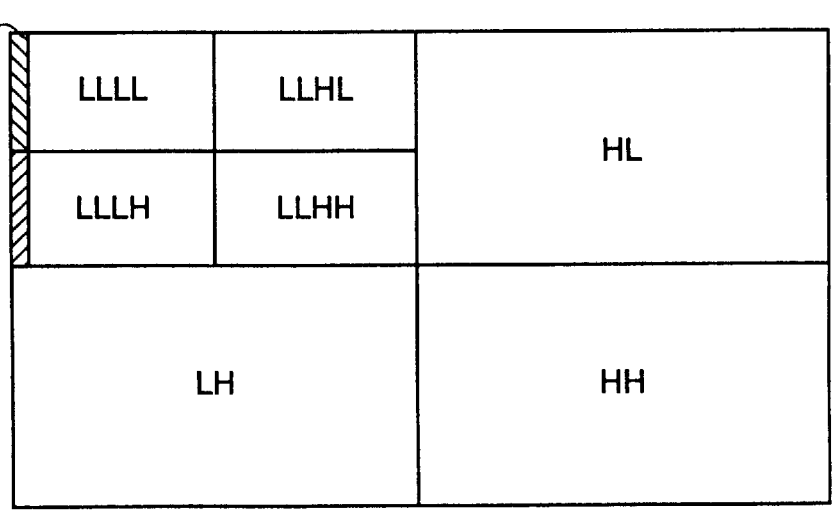

FIGS. 30($a$)–30($c$) are diagrams illustrating process steps of decoding a wavelet-transformed image.

Figure 31:
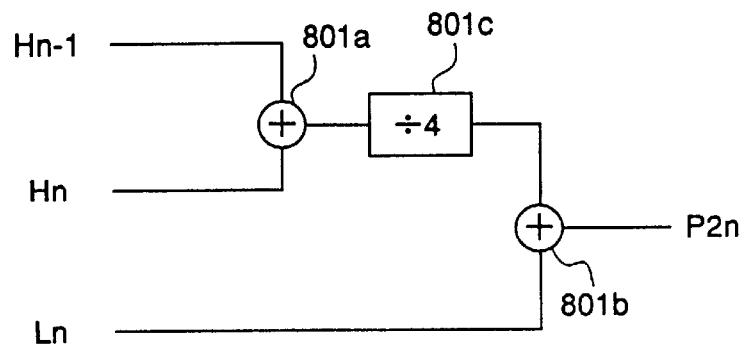
Figure 31:
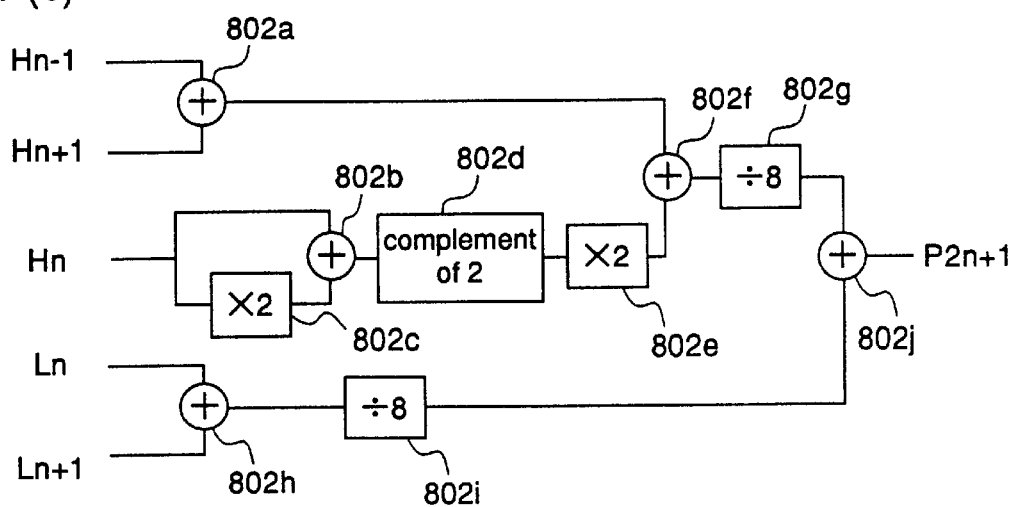

FIGS. 31($a$) and 31($b$) are diagrams illustrating decoding filters included in the apparatus shown in FIG. 29.

Figure 32:
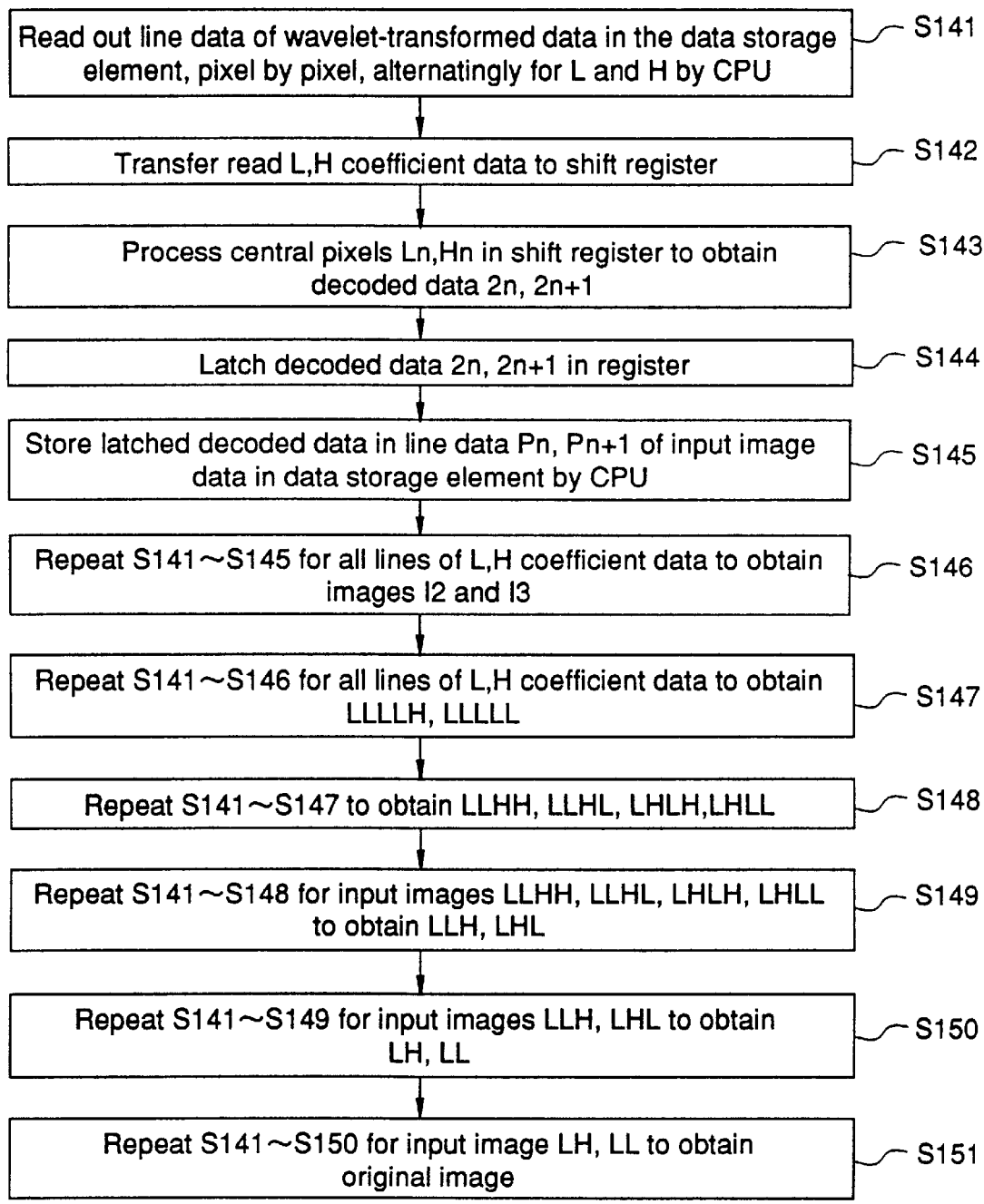

FIG. 32 is a flowchart illustrating the operation of the wavelet reverse transform apparatus according to the eleventh embodiment of the invention.

Figure 33:
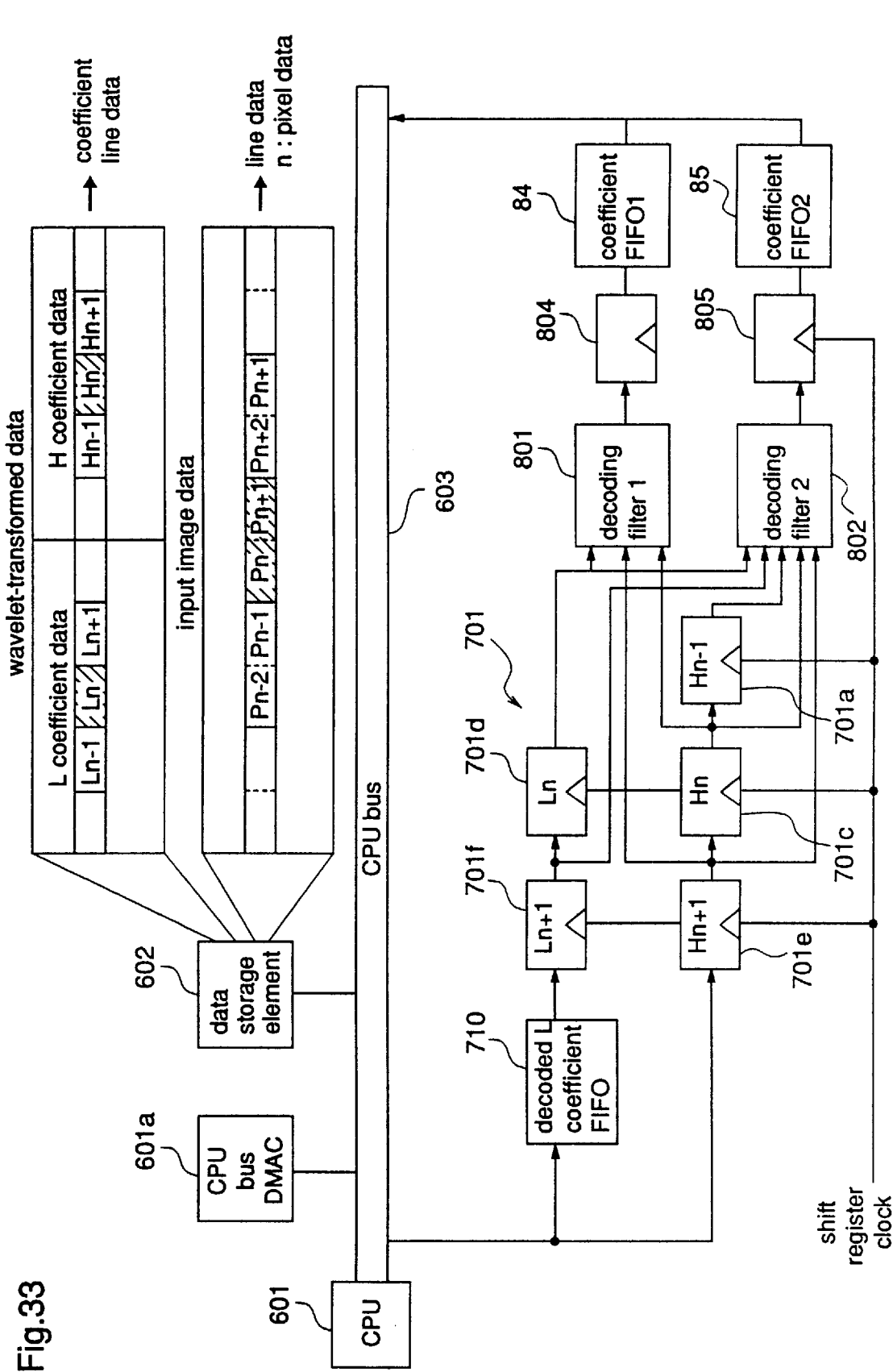

FIG. 33 is a block diagram illustrating a wavelet reverse transform apparatus according to a twelfth embodiment of the invention.

Figure 34:
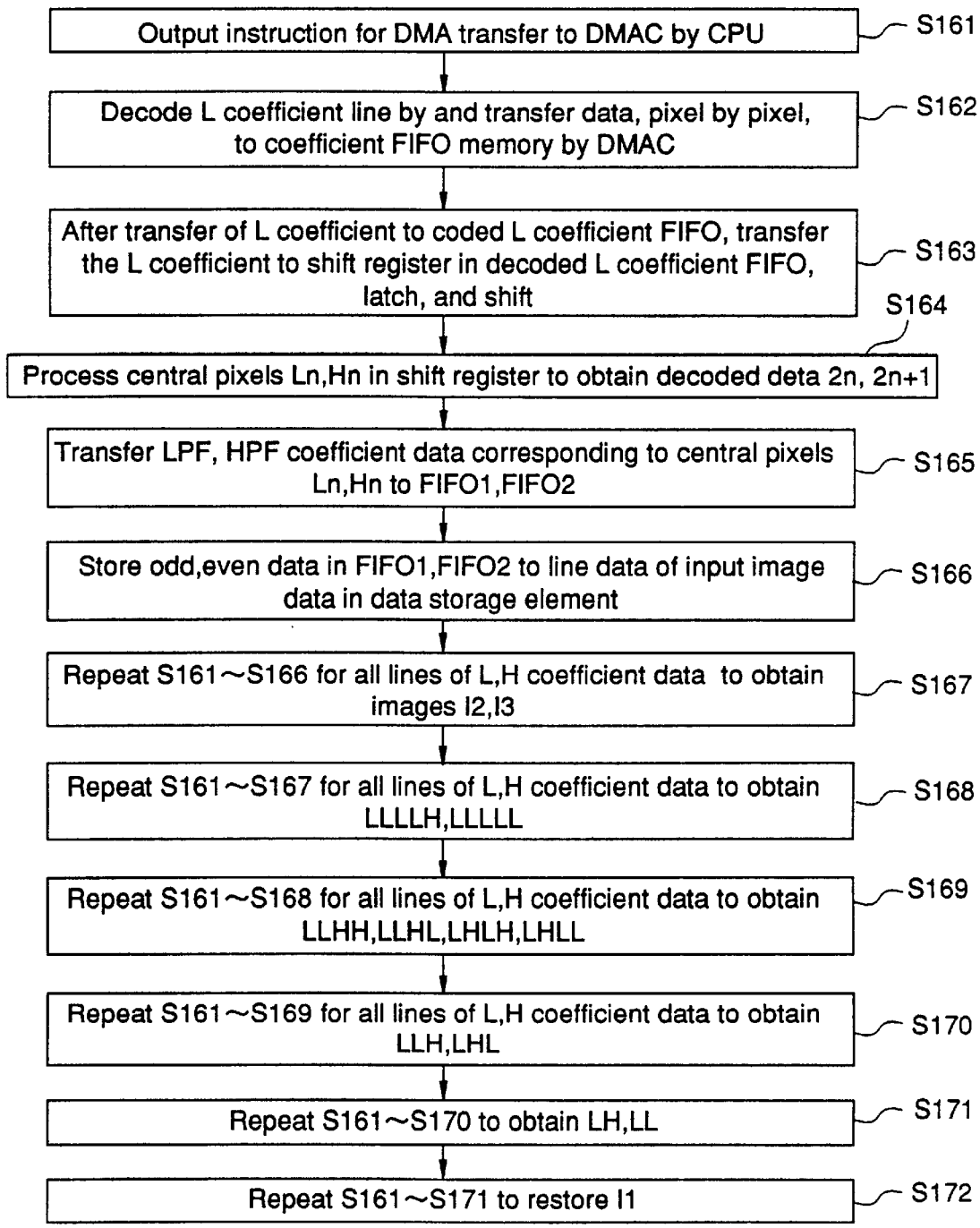

FIG. 34 is a flowchart illustrating the operation of the wavelet reverse transform apparatus according to the twelfth embodiment of the invention.

Figure 35:
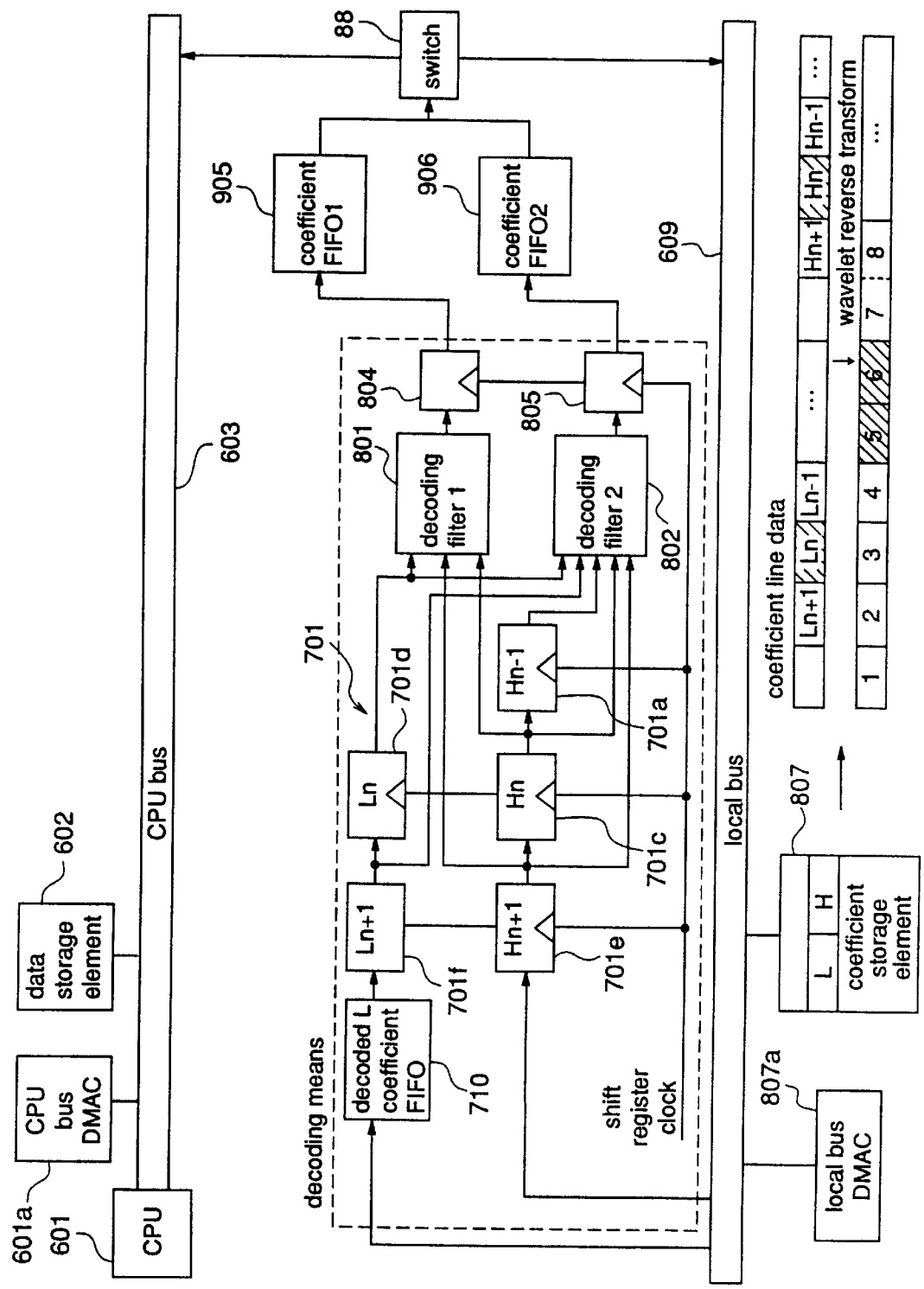

FIG. 35 is a block diagram illustrating a wavelet reverse transform apparatus according to a thirteenth embodiment of the invention.

Figure 36:
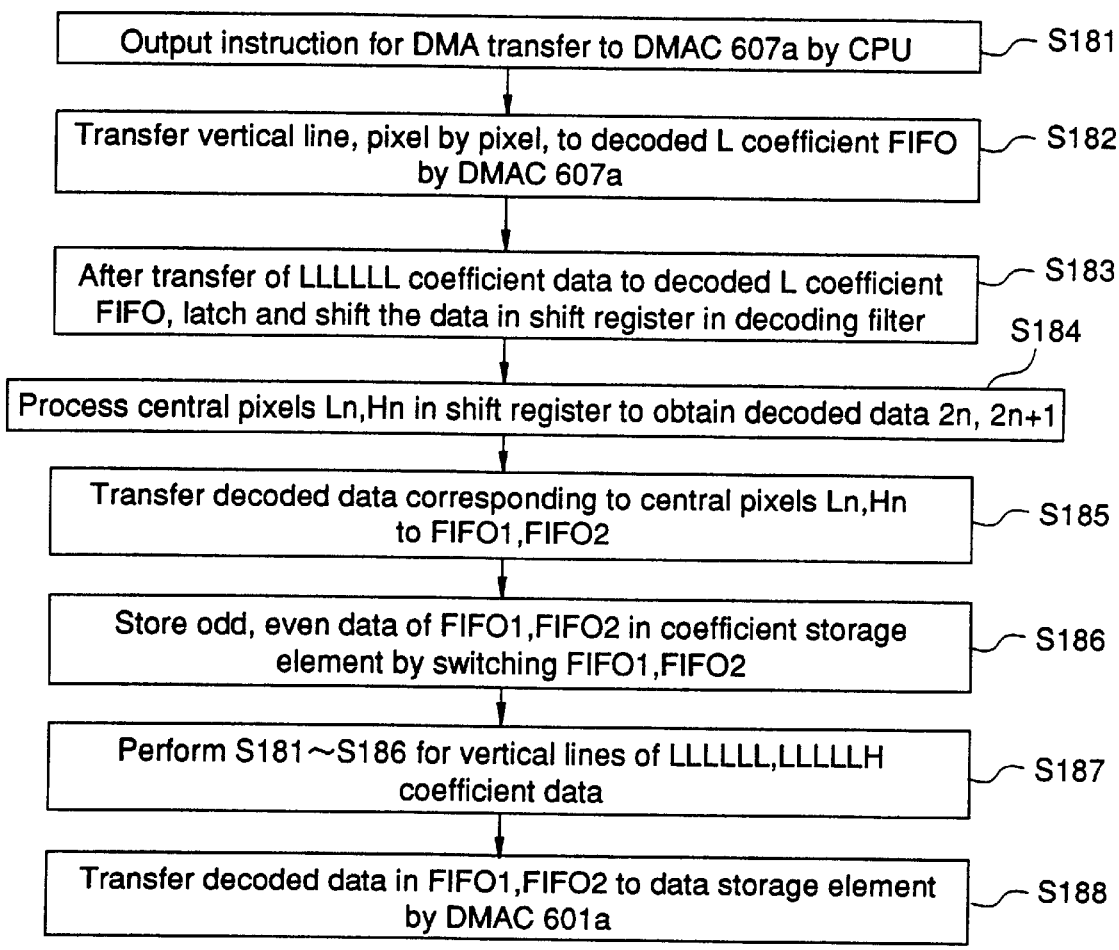

FIG. 36 is a flowchart illustrating the operation of the wavelet reverse transform apparatus according to the thirteenth embodiment of the invention.

Figure 37:
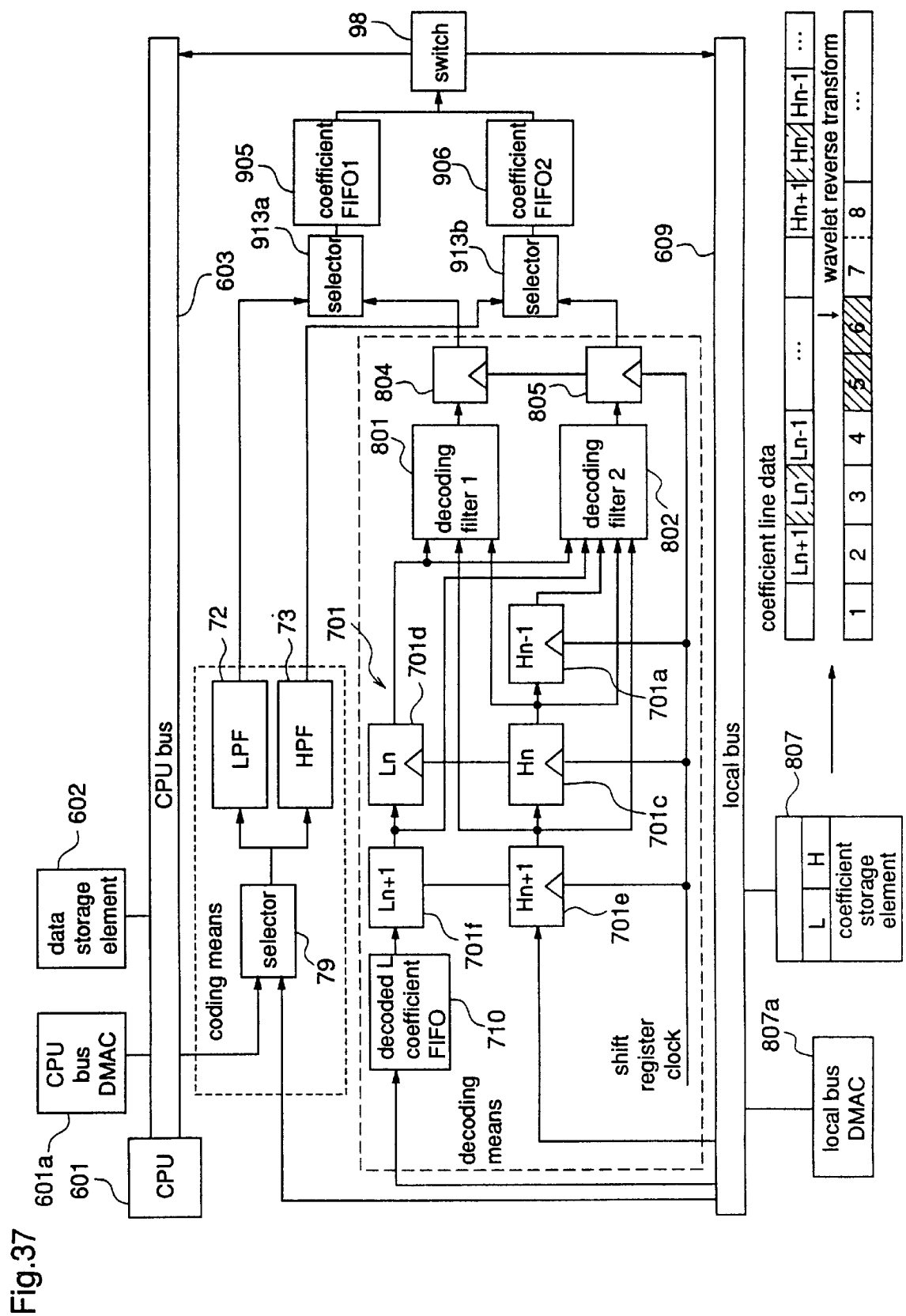

FIG. 37 is a block diagram illustrating a wavelet reverse transform apparatus according to a fourteenth embodiment of the invention.

Figure 38:
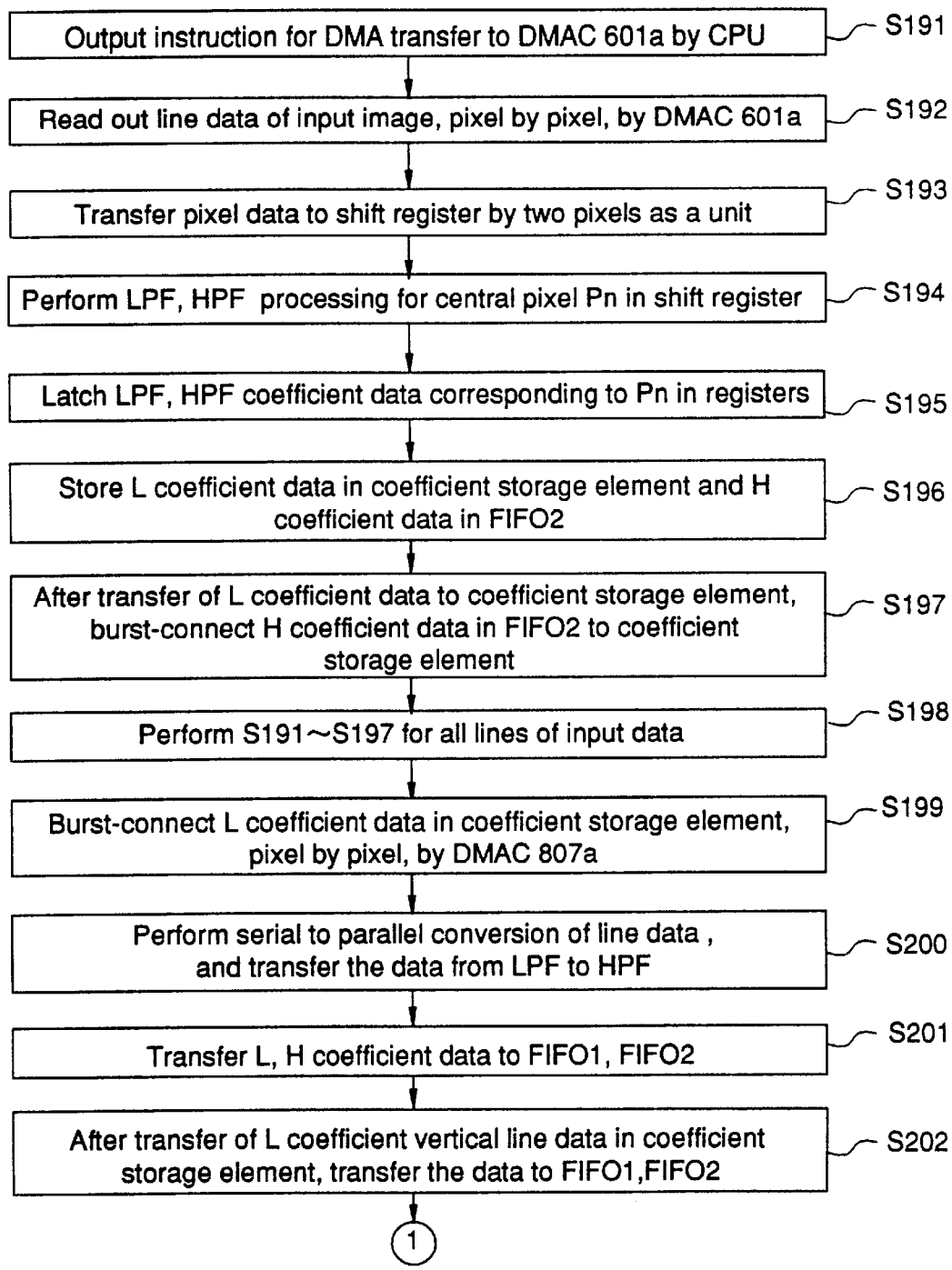
Figure 38:
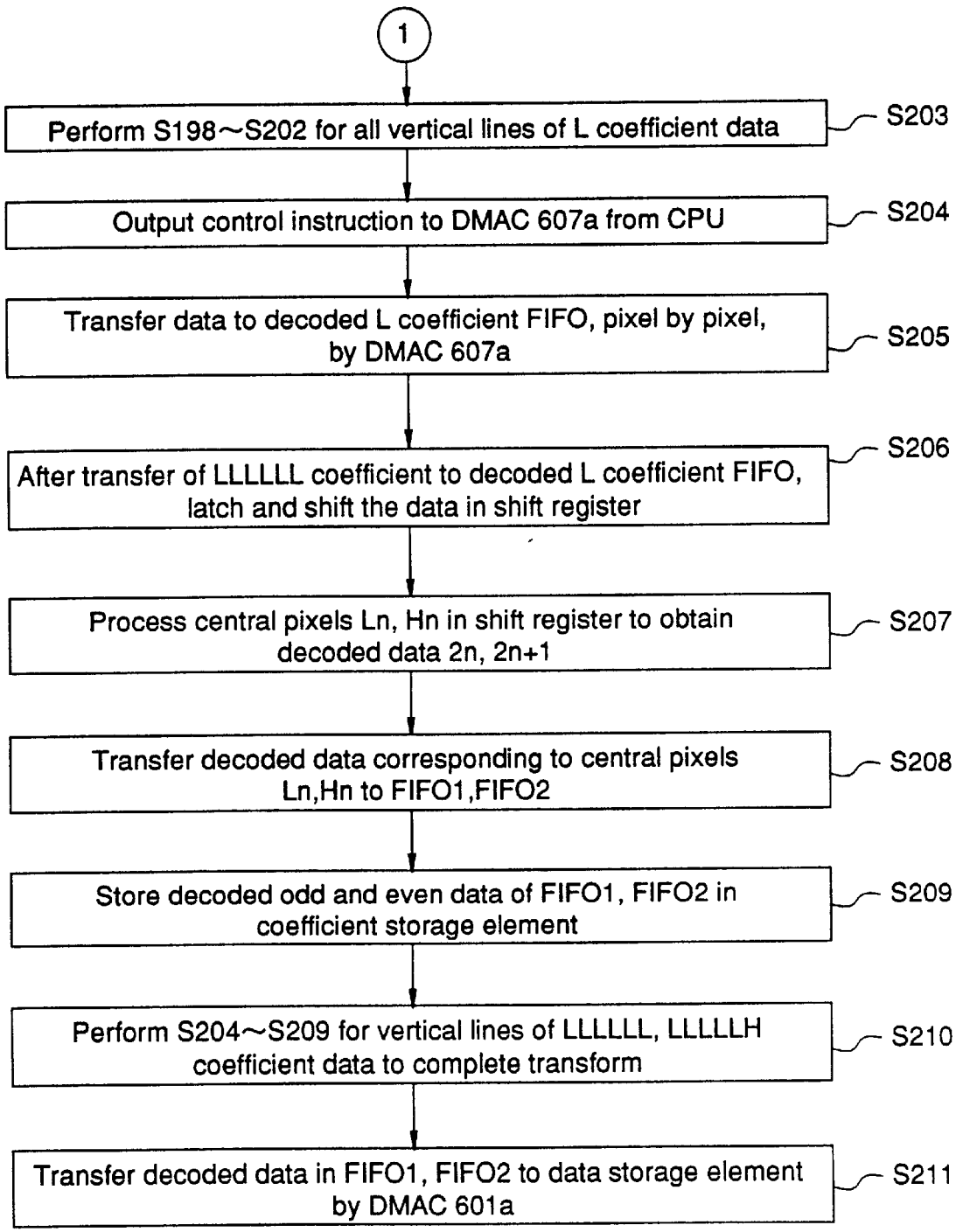
Figure 39:
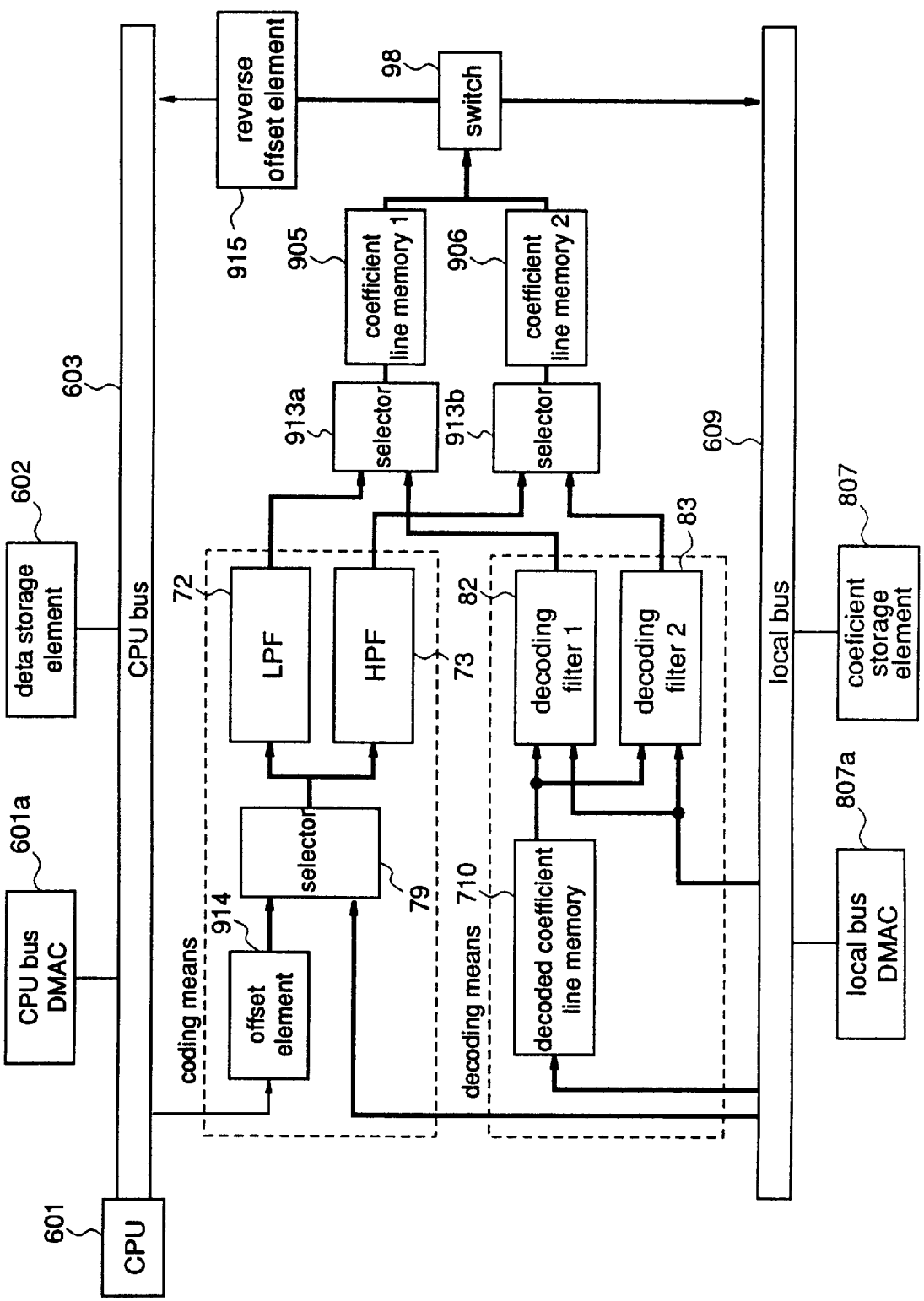

FIGS. 38(a) and 38(b) show a flowchart illustrating the operation of the wavelet reverse transform apparatus according to the fourteenth embodiment of the invention FIG. 39 is a block diagram illustrating a wavelet transform apparatus according to a fifteenth embodiment of the invention.

Figure 40:
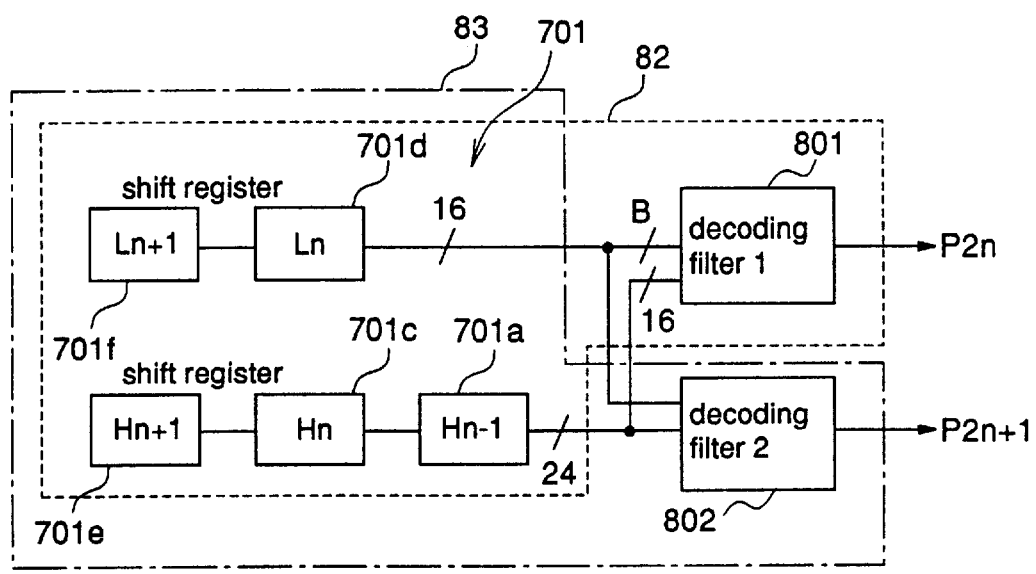

FIG. 40 is a block diagram illustrating a decoding filter included in the apparatus shown in FIG. 39.

FIGS. 41(a) and 41(b) are diagrams for explaining extension of bit width of data.

FIGS. 42(a)–42(c) are diagram for explaining assignment of upper extension bit and low extension bit.

FIGS. 43(a) and 43(b) are diagrams for explaining a process of restoring data with extended bit width to data with original bit width.

FIGS. 44(a) and 44(b) are block diagrams illustrating a wavelet transform apparatus and a wavelet reverse transform apparatus, respectively, according to a sixteenth embodiment of the invention.

Figure 45:
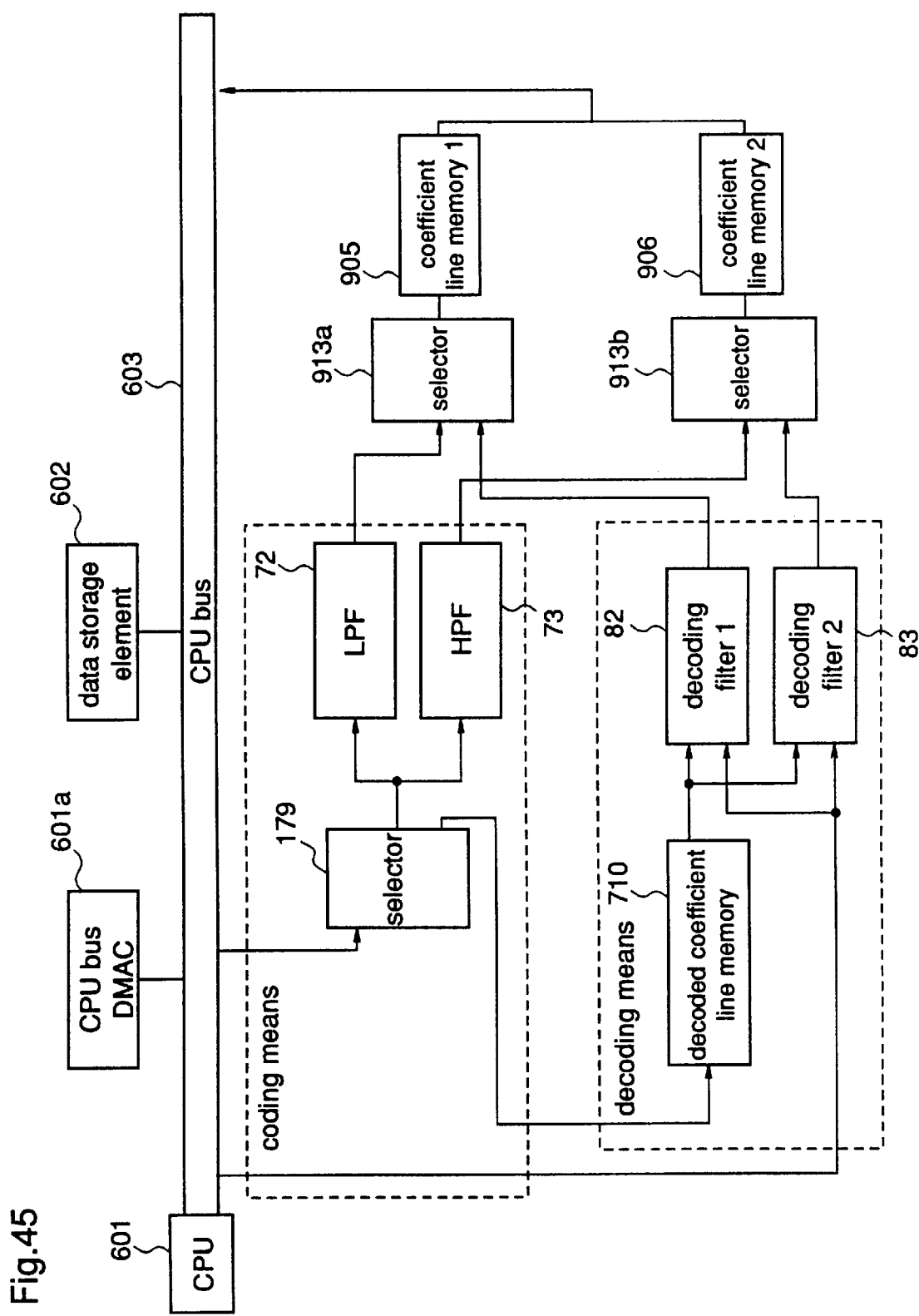

FIG. 45 is a block diagram illustrating a wavelet transform apparatus according to a seventeenth embodiment of the invention.

Figure 46:
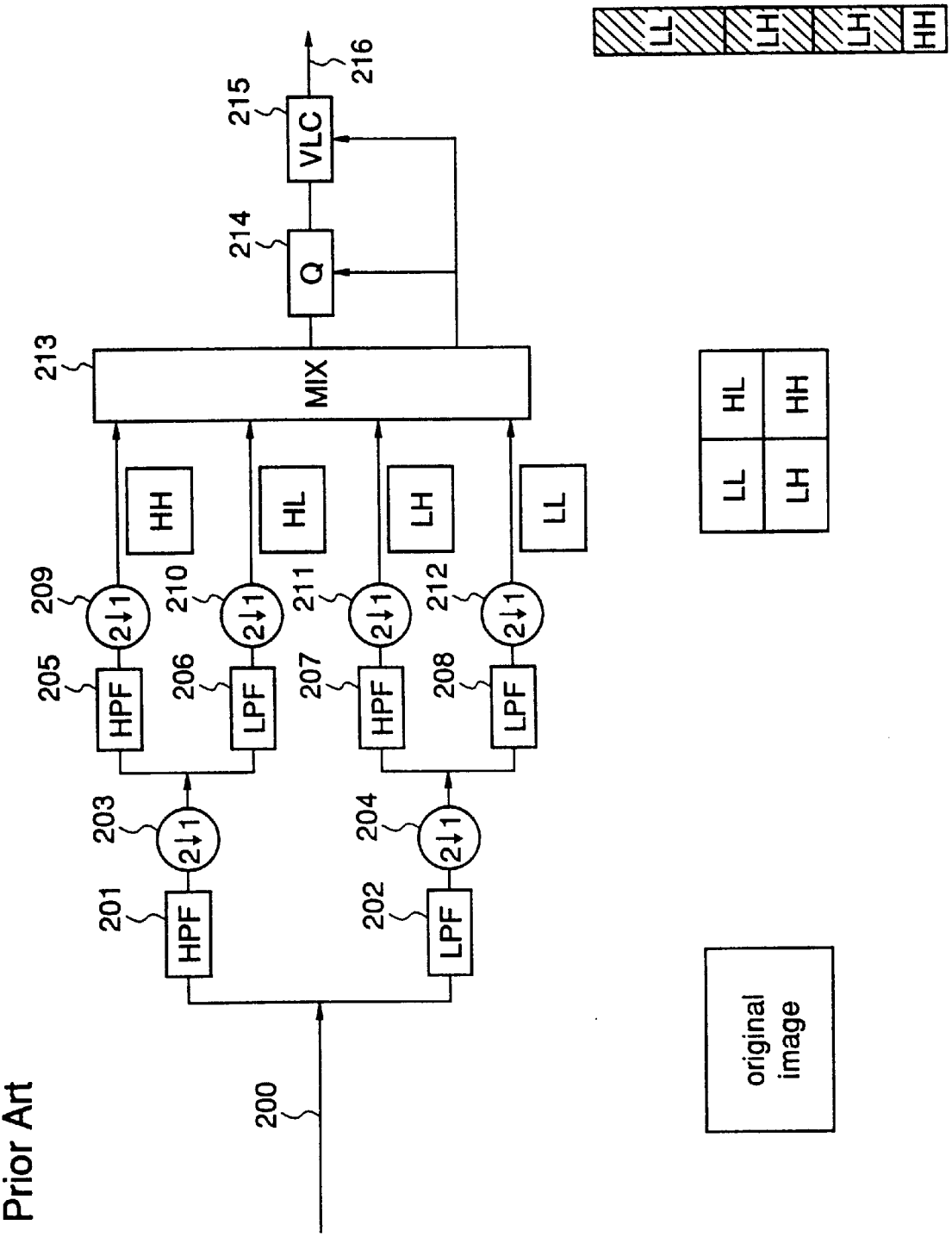

FIG. 46 is a block diagram illustrating a conventional subband coding system.

Figure 47:
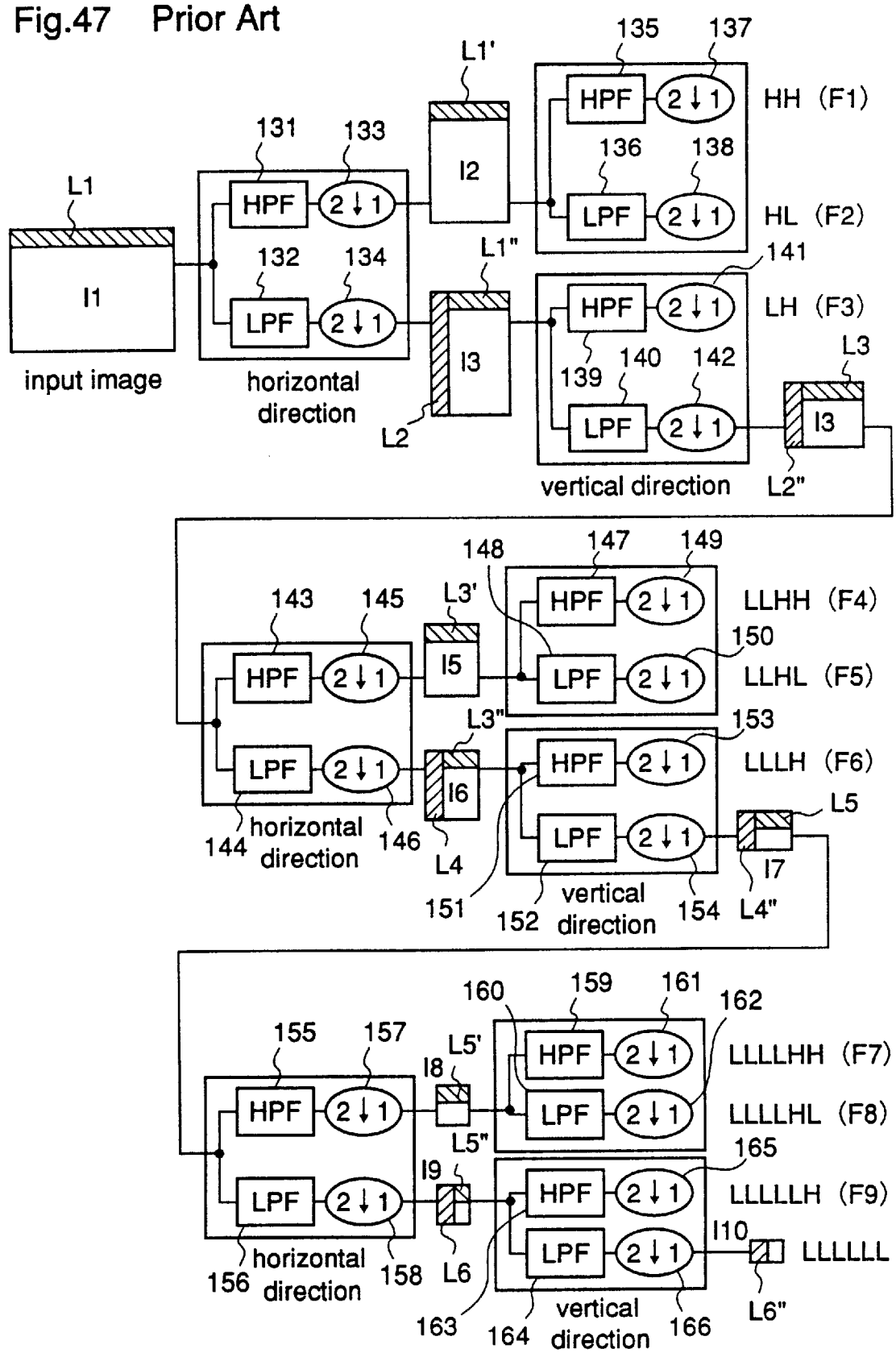

FIG. 47 is a block diagram for explaining frequency division in wavelet transform.

Figure 48:
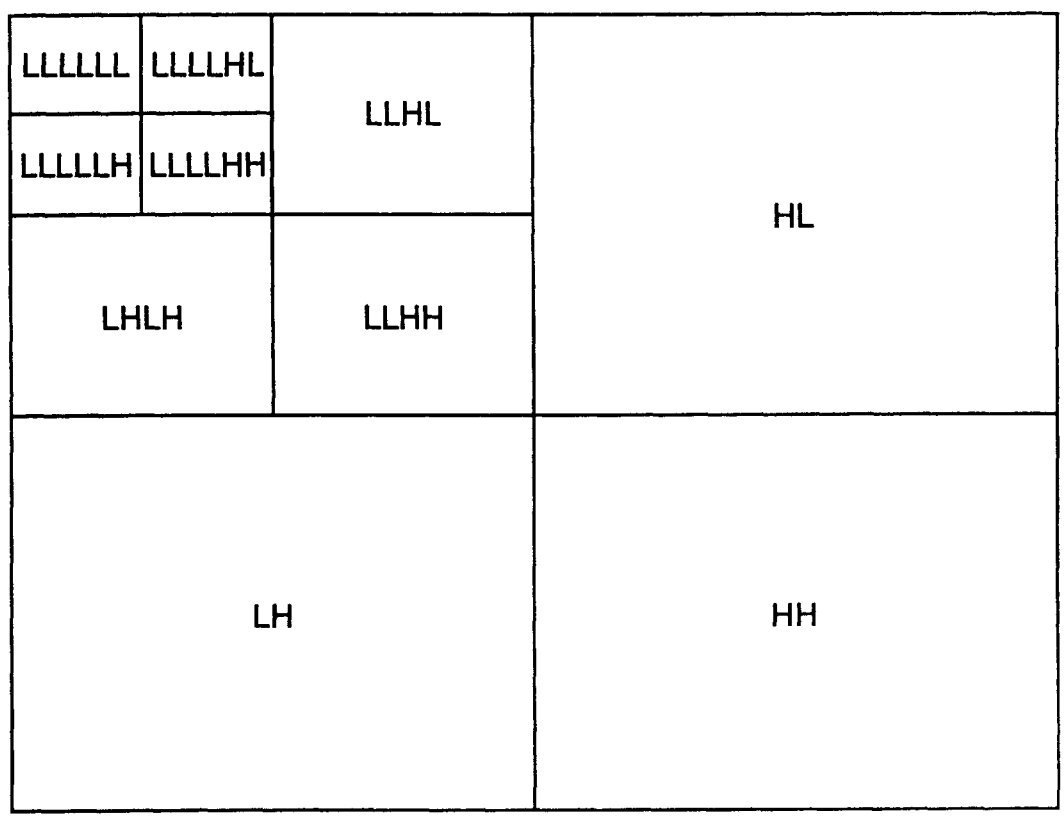

FIG. 48 is a diagram illustrating an image signal divided into a plurality of frequency subbands by wavelet transform.

DETAILED DESCRIPTION OF THE PREFERRED EMBODIMENTS

[Embodiment 1]

Figure 1:
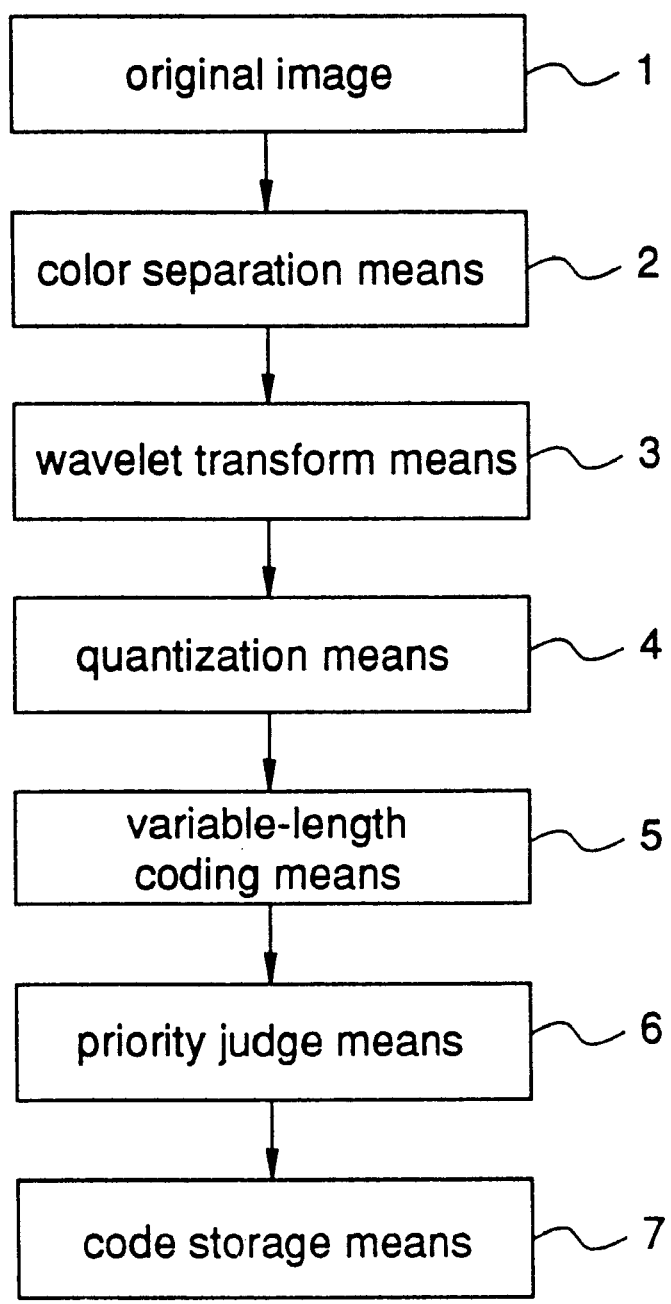
FIG. 1 is a diagram for explaining a image data coding process according to a first embodiment of the invention.

FIG. 1 is a flowchart for explaining an image data coding process in a coding method according to a first embodiment of the present invention. In FIG. 1, reference numeral 1 designates an original image, numeral 2 designates a color separation means for separating the original image into a plurality of color components, numeral 3 designates a wavelet transform means for wavelet-transforming the color-separated image data, numeral 4 designates a quantization means for quantizing the transformed data, numeral 5 designates a variable-length coding means for variable-length coding of the quantized data, numeral 6 designates a priority judge means for deciding the priority for storage of the variable-length codes, and numeral 7 designates a code storage means for storing the variable-length codes according to the priority.

Figure 2:
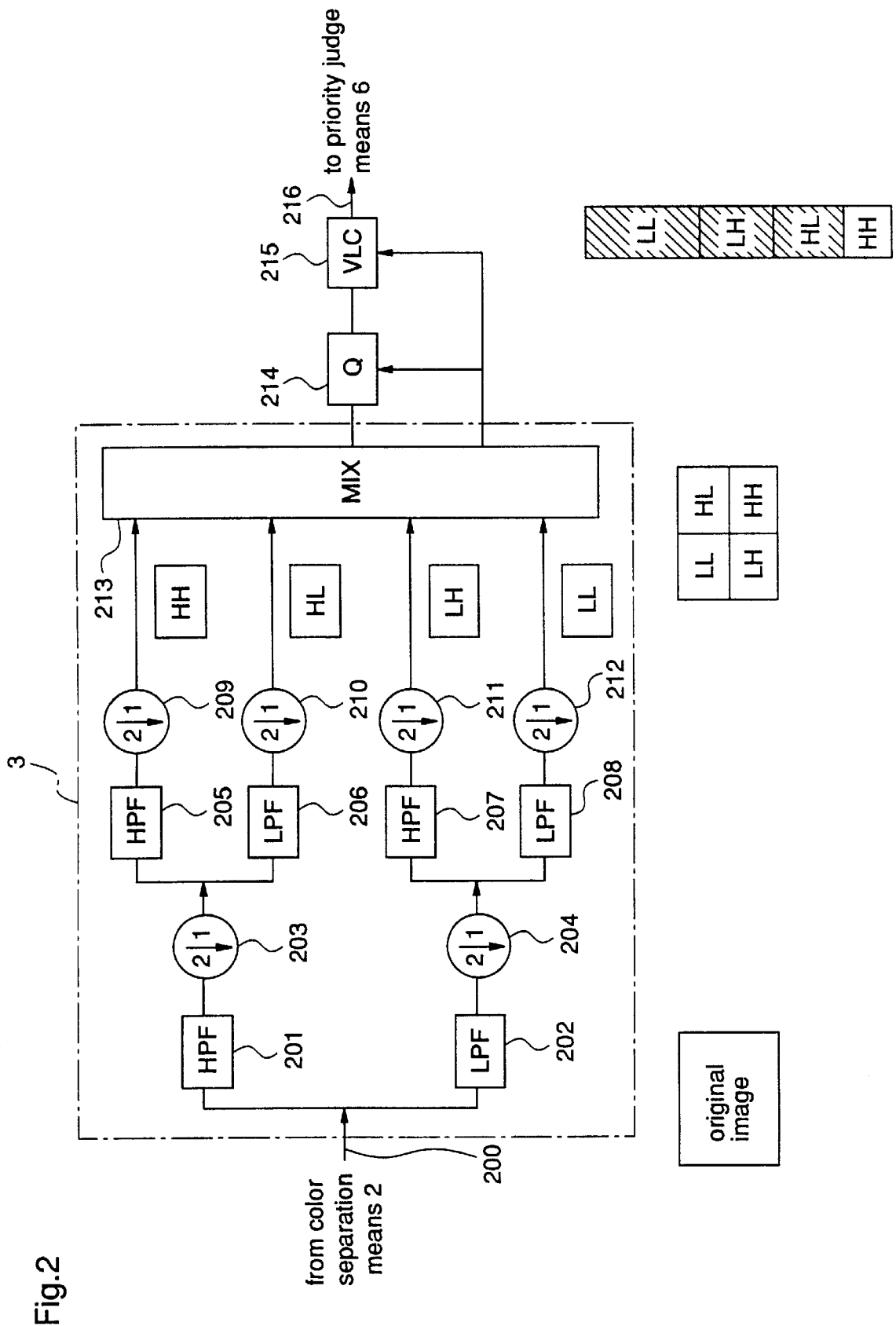
FIG. 2 is a block diagram showing a location of a position where a priority judge means according to the first embodiment of the invention.

FIG. 2 is a block diagram showing the detail of a Y coding means, a U coding means, or a V coding means in a subband coding system, and a position where the priority judge means 6 shown in FIG. 1 is applied. In the figure, reference numeral 3 designates a wavelet transform means corresponding to the wavelet transform means 3 shown in FIG. 1, and the wavelet transform means 3 comprises HPFs 201, 205, and 207, LPFs 202, 206, and 208, and DSFs 203, 204, 209, 210, 211, and 212. Reference numeral 214 designates a quantization means corresponding to the quantization means 4 shown in FIG. 1, and numeral 215 designates a VLC corresponding to the variable-length coding means 5 shown in FIG. 1. The priority judge means 6 is connected to an output node of the VLC 215.

FIGS. 3(a) and 3(b) are diagrams illustrating the structures of the priority judge means and the coding means, respectively. In FIG. 3(a), reference numeral 101 designates a CPU (Central Processing Unit) for giving priority to the variable-length codes, reference numeral 102 designates a data storage means for storing variable-length codes coded by the variable-length coding means, numeral 101 designates a CPU (Central Processing Unit) for deciding the priority of the variable-length codes, numeral 102 designates a data storage means wherein the variable-length codes are written according to the priority decided by the CPU 101, and numeral 103 designates a CPU bus connecting the CPU 101 to the data storage means 102.

In FIG. 3(b), reference numeral 301 designates a CPU performing hierarchical coding and generating two or more code sequences, numeral 302 designates a data storage means in which the two or more code sequences generated by the CPU 301 are written, and numeral 303 designates a CPU bus connecting the CPU 301 with the data storage means 302.

FIG. 4 is a block diagram illustrating a structure of a coding apparatus for the coding method according to this first embodiment of the invention. In FIG. 4, reference numeral 400 designates a sampling means for sampling an RGB (Red Green Blue) signal of the original image, numeral 401 designates a field storage means for storing the data sampled by the sampling means 400, numeral 402 designates a color separation means for separating the data from the field storage means 401 into Y, U, V components, numeral 2 designates a color-separation block comprising the sampling means 400, the field storage means 401, and the color-separation means 402. This color-separation block 2 corresponds to the color-separation means 2 shown in FIG. 1.

Further, reference numerals 403, 404, and 405 designate a Y coding means, a U coding means, and a V coding means, respectively, performing wavelet-transform, quantization, and variable-length coding of a Y signal component, a U signal component, and a V signal component, which are output from the color-separation means 402. Reference numeral 406 designates a UV combining means for combining output codes from the U coding means 404 and the V coding means 405 to generate C component codes. The Y coding means 403, the U coding means 404, the V coding means 405, and the UV combining means correspond to the wavelet transform means 3, the quantization means 4, and the variable-length coding means 5 shown in FIG. 1.

Reference numeral 407 designates a priority judge means corresponding to the priority judge means 6 shown in FIG. 1, and numeral 408 designates a code storage means corresponding to the code storage means 7 shown in FIG. 1.

FIG. 5 is a flowchart for explaining the coding method according to the first embodiment of the invention. In FIG. 5, S1 is a step of coding a subband wherein Y has the highest priority at present, S2 is a step of judging whether there is a capacity for storage in the code storage means or not, 53 is a step of storing the coded subband in the code storage means, S4 is a step of coding a subband wherein C has the highest priority at present, S5 is a step of storing the coded subband in the code storage means, and S6 is a step of judging whether there is a capacity for storage in the code storage means.

FIG. 6 is a schematic diagram illustrating data stored in the storage region of the code storage means when the coding is finished.

Initially, the coding method will be explained with reference to FIG. 1.

The image data 1 representing the original image is subjected to color separation by the color separation means 2, whereby the image data 1 is separated into a plurality of color components. Then, each color component is divided into a plurality of layers of frequency components (subbands) by the wavelet transform means 3, and each layer (subband) is quantized by the quantization means 4 and coded by the variable-length coding means 5, whereby code data for each color and each layer is obtained. The code data is stored in the code storage means 7 according to the priority decided by the priority judge means 6.

FIG. 6 shows the code data stored in the code storage means 7. In FIG. 6, since the total amount of the code data generated by the variable-length coding means 5 is larger than the amount or data that can be stored in the storage region of the storage means 408, some layers are not stored in the storage region.

Hereinafter, the first embodiment of the invention will be described in more detail.

In FIG. 4, an image signal comprising RGB elements is sampled and A/D converted, for each pixel, by the sampling means 400, and stored in the field storage means 401. Then, the RGB signal stored in the field storage means 401 is converted to a YUV signal by the color separation means 402 and, at this time, U and V components are subjected to ½ down-sampling in the horizontal direction (4:2:2 subsampling). For example, when an input signal is sampled for 320×240 pixels, since 320×240×3 data is stored in the field storage means 401, the 4:2:2 subsampling result in 320×240 data for the Y component and 160×240 data for each of the U and V components.

Next, the Y component is subjected to wavelet transform, quantization, and variable-length coding by the Y coding means 403. The Y coding means has the same structure as that shown in FIG. 2. The structure of the Y coding means and the operation of each element are already described with respect to FIG. 2.

The original image input to the input node 200 of the Y coding means 403 has 320×240 pixels, and each of the layers LL, LH, HL, and HH after the wavelet transform of the original image has the size of 160×120 pixels. Then, these layers LL, LH, HL, and HH are subjected to quantization and variable-length coding, individually, to obtain codes Y-LL, Y-LH, Y-HL, and Y-HH for the respective layers.

The U coding means 404 and the V coding means 405 have the same structure as that shown in FIG. 2. The original image input to the input node 200 of the U (V) coding means 404 (405) has 320×240 pixels, and each of the layers LL, LH, HL, and HH after the wavelet transform has the size of 80×120 pixels. Then, these layers are individually subjected to quantization and variable-length coding. The UV combining means 406 combines a code of the U component in the LL layer (U-LL) with a Code of the V component in the LL layer (V-LL) to produce a code C-LL. This processing is performed for each layer to produce color component codes C-LL, C-LH, C-HL, and C-HH.

A description is now given of the operation of the priority judge means 407.

The priority judge means 407 is composed of the CPU 101, the data storage means 102, and the CPU bus 103 as shown in FIG. 3(a). The highest priority is given to the LL layer, followed by LH, HL, HH in this order. In each layer, the Y component has the priority over the C component. The respective codes, Y-LL to C-HH, have the code amounts shown in table 1. The size of the storage region in the code storage means 408 is 11000 bytes.

TABLE 1

| color-layer | size |
| --- | --- |
| Y-LL | 3500 |
| Y-LH | 2000 |
| Y-HL | 2000 |
| Y-HH | 1000 |
| C-LL | 2000 |
| C-LH | 1000 |
| C-HL | 1000 |
| C-HH | 500 |

Initially, the Y coding means 403, the U coding means 404, the V coding means 404, and the UV combining means 406, as a hierarchical coding means, perform hierarchical coding to generate Y-LL, Y-LH, Y-HL, and Y-HH as a first code sequence, and C-LL, C-LH, C-HL, and C-HH as a second code sequence.

Next, the priority judge means 407 as a storage control means decides the priority of these codes Y-LL to C-HH, and the first code sequence and the second code sequence are stored from opposed ends, i.e., the head and the bottom, of the code storage means 408, respectively, according to the priority given to the respective codes. That is, the Y-LL code having the highest priority among the codes in the first and second code sequences is stored in the storage region of the code storage means 408 (hereinafter referred to simply as code storage means 408) from the head of the code storage means 408. Linear addresses are given to the storage region. At this time, the priority judge means 407 stores the following information: that is, the head address of the Y-LL code stored region in the code storage means 408, the size of the Y-LL code stored region, and the fact that the stored code is Y-LL.

Next, the C-LL code having the second priority is stored from the bottom of the code storage means 408. At this time, the priority judge means 407 stores the head address of the C-LL code stared region in the code storage means 408, the size of this region, and the fact that the stored code is C-LL.

Next, the Y-LH code having the third priority is stored, next to the Y-LL code, in the code storage means 408. At this time, the priority judge means 407 calculates the tail address of the Y-LL code stored region to obtain the head address of the Y-LH code stored region in the code storage means 408, and the priority judge means 407 stores the head address of the Y-LH code stored region, the size of this region, and the fact that the stored code is Y-LH.

Thereafter, remaining codes are successively stored according to the priority, i.e., in the order of C-LH, Y-HL, C-HL, Y-HH, and C-HH, so that the Y component codes are stored from the head of the code storage means 408 and the C component codes are stored from the bottom. The priority judge means 407 stores the head address of the storage region for each code, the size of this region, and information on the stored color component codes.

As shown in FIG. 6, when storage of the Y-HL code is done, the storage region of the code memory means 408 spends 10500 bytes, so that there is no capacity for the next 1000 byte C-HL code. At this time, the priority judge means 407 judges, as a storage control means, that an overlap will occur if the C-HL code is stored, and the Y-HL layer having the highest priority at present should be stored prior to other layers. So, the following three codes, C-HL, Y-HH, and C-HH, are not stored in the storage region of the code storage means 408 but abandoned.

Although C-HL, Y-HH, and C-HH are abandoned, since these codes are high-frequency components and do not include a lot of image data, this abandonment does not much influence the image quality when the image is decoded.

Then, a narrow storage region is secured in the code storage means 408 by designating that region, and the priority judge means 407 transfers the head addresses of the Y-LL, Y-LH, Y-HL, C-LL, and C-LH code stored regions, the sizes of these regions, and information on the stored color component codes, which have been stored in the priority judge means, to the narrow storage region.

At decoding, with reference to the information, the codes are successively read out and decoded according to the priority of the stored codes, whereby image data approximately equal to the original image data can be decoded.

As described above, according to the first embodiment of the invention, when Y and C component codes, which are obtained by converting an RGB color image to a YUV color image and performing wavelet transform, quantization, and variable-length coding to the YUV color image, are stored in a storage means, the Y component codes of large code amount are successively stored from the head of the storage means while giving priority to the low-frequency components, and the C component codes are successively stored from the bottom of the storage means while giving priority to the low-frequency component. With respect to the high-frequency components which cannot be stored in the storage means, these components are abandoned. Therefore, image data can be stored in the storage means having a fixed storage capacity, at high efficiency, without losing much data, so that coding is performed at high efficiency with less memory capacity. At decoding of the coded data, the quality of the original image is hardly degraded.

While in this first embodiment of the invention, the wavelet transform is performed in the horizontal direction and the vertical direction, each for one time, to divide the image data into four layers LL, LH, HL, and HH, as shown in FIG. 2. However, the image data may be divided into more layers, for example, seven or ten layers, by repeating the wavelet transform for the LL layer of the lowest frequency. The layer for which the wavelet transform is repeated is not restricted to the LL layer. Further, it is not necessary to give the priority to the respective layers so that the Y component layer and the C Component layer having the same frequency are adjacent each other. For example, the priority may be given in the order of Y-LL, C-LL, Y-HL, Y-LH, C-HL, C-LH, Y-HH, and C-HH.

Furthermore, although the image signal is converted to the YUV signal, the representation of the color space is not restricted thereto.

Furthermore, although emphasis has been placed upon wavelet transform in this first embodiment of the invention, the coding method is not restricted thereto. For example, although it is out of the standard of MPEG, a coding method wherein an image signal is divided into a plurality of components and MPEG coding is performed for each component is also within the scope of the present invention.

[Embodiment 2]

A coding method and an coding apparatus according to a second embodiment of the invention will be described using signals 1, 2, 3, 4, 7, 8, and 9.

FIG. 7 is a block diagram obtained by simplifying the structure shown in FIG. 4. In FIG. 7, reference numeral 412 designates a color separation means corresponding to the color separation means 402 shown in FIG. 4, numeral 413 designates a coding means corresponding to the Y coding means 403. the U coding means 404, the V coding means 405, and the UV combining means 406 shown in FIG. 4, numeral 417 designates a priority judge means corresponding to the priority judge means 407 shown in FIG. 4, and numeral 418 designates a code storage means corresponding to the code storage means 408 shown in FIG. 4.

FIG. 8 is a flowchart for explaining a coding method according to this second embodiment in case where the priority judge means is constituted by a CPU. In FIG. 8, S11 is a step of coding a Y component subband having the highest priority at present, S12 is a step of judging whether there is a capacity for storage in the code storage means, S13 is a step of putting the coded subband in the code storage means, S14 is a step of judging whether coding of all the Y component subbands is finished or not, S15 is a step of omitting coding of the remaining Y component subbands, S16 is a step of coding a C component subband having the highest priority at present, S17 is a step of judging whether there is a capacity for storage in the code storage means, S18 is a step of putting the coded subband in the code storage means, S19 is a step of judging whether coding of all the C component subbands is finished or not, S20 is a step or judging whether a coded subband has priority over the lowest subband within the code storage means, S21 is a step of abandoning the lowest code of Y component in the code storage means, and S22 is a step of omitting coding of the remaining subbands of C component.

FIGS. 9(a) to 9(f) are schematic diagrams for explaining a method of storing codes in the code storage means.

A description is given of the operation. In FIG. 7, initially, an image signal comprising RGB elements is input to the sampling means 400, sampled, and stored in the field memory 401. The color separation means 412 converts the RGB signal stored in the field memory 401 to a YUV signal and outputs a Y component signal first. The Y component signal is subjected to wavelet transform, quantization, and variable-length coding by the coding means 413 shown in FIG. 7, resulting in codes for the respective layers, Y-LL, Y-LH, Y-HL, and Y-HH. The sizes of these codes are shown in table 1. The priority judge means 417 puts the codes Y-LL, Y-LH, Y-HL, and Y-HH in the first code sequence in the code storage means 418, from the head of the code storage means, according to the priority. The above-mentioned processing is achieved by repeating, for four times, a loop from step S11 to step S14 shown in FIG. 8.

In this second embodiment, as in the first embodiment, the size of the code storage means is 11000 bytes.

FIG. 9(a) shows the initial state of the code storage means 418, and FIG. 9(b) shows the code storage means 418 after the storage of the Y component codes.

Next, the color separation means 412 outputs a U component signal after 4:2:2 subsampling, and the U component signal is subjected to wavelet transform by the coding means 413 shown in FIG. 7. Next, the same processing is performed for a V signal component. Then, the YUV signal is subjected to subsampling at the ratio of 4:2:2. As a result, the data amount of the U (V) component becomes the half of the data amount of the Y component. Therefore, when the coding means 413 is composed of the CPU 301, the data storage means 302, and the CPU bus 303 as shown in FIG. 3(b), wavelet transform for the V component can be performed using the same memory as a memory required for wavelet transform of the Y component, while storing wavelet transform coefficients for the U component in the memory.

Next, the coding means 413 shown in FIG. 7 selects the LL coefficient of the U component by a selection means 213 (refer to FIG. 2) and performs quantization and variable-length coding for the LL coefficient, resulting in a U component LL layer code. Next, the coding means 413 performs quantization and variable-length coding for the LL coefficient of the V component to produce a V component LL layer code. Then, the coding means 413 combines these codes to produce a C component LL layer code (hereinafter referred to as a C-LL code). This process corresponds to step S16.

The amount or this C-LL code is 2000 bytes as shown in table 1. The priority judge means 417 puts the C-LL code in the code storage means 418 from the bottom of the code storage means. This process corresponds to steps S17, S18, and S19, and FIG. 9(c) shows the code storage means 418 when the C-LL code is stored.

Next, in step S16, a C component LH layer code (hereinafter referred to as a C-LH code) is produced. The amount of this C-LH code is 1000 bytes as shown in table 1.

Assuming that the priority of the respective layers is the same as that given for the first embodiment, since the C-LH code has priority over the Y-HH code and there is a space for 1500 bytes between the Y-HL code and the C-LL code, the priority judge means 417 puts the C-LH code in the storage means 418 after the C-LL code. The C-LH code is written on a portion of the Y-HH code, and the other portion of the Y-HH code is destroyed. In this way, the priority judge means 417 performs layer-level rewriting. This process is achieved by performing a loop of steps S17, S20, and S21 for one time and then proceeding to step S8. FIG. 9(d) shows the state of the code storage means 418 just before the storage of the C-LH code, and FIG. 9(e) shows the state where the Y-HH code is eliminated (step S21) and the C-LH code is stored.

Next, in step S16, a C component HL layer code (hereinafter referred to as a C-HL code) is produced. The amount of this C-HL code is 1000 bytes as shown in table 1.

Since the C-HL code is lower than the Y-HL code in the priority and the remaining capacity of the code storage means 418, i.e., a space between the Y-HL code and the C-LH code, is 500 bytes (FIG. 9(f)), the C-HL code is abandoned. This process corresponds to steps S17, S20, and S22. Further, HH coefficients of the v and V components are abandoned without quantization and variable-length coding, and the coding process in this field is ended. This is performed after step S22.

The operation of the priority judge means 417 in coding process for another field will be described using FIGS. 8 and 10(a)–10(d). The respective codes after the coding process have the amounts shown in table 2.

TABLE 2

| color-layer | size |
|---|---|
| Y-LL | 4000 |
| Y-LH | 3000 |
| Y-HL | 3000 |
| Y-HH | 2000 |
| C-LL | 3000 |
| C-LH | 1500 |

TABLE 2-continued

| color-layer | size |
|---|---|
| C-HL | 1500 |
| C-HH | 1000 |

Initially, Y-LL, Y-LH, and Y-HL codes are successively stored in the code storage means 418 from the head of the code storage means as shown in FIG. 10(b). This process is achieved by repeating a loop from step S11 to step S14 for three times. At this time, the remaining capacity of the code storage means 418 is 1000 bytes. Since it is judged in step S12 that the remaining capacity of the code storage means 418 is not sufficient for the next Y-HH code, this Y-HH code is abandoned. This process corresponds to step S15. Next, as shown in FIG. 10(c), the C-LL code is stored in the code storage means 418 by deleting the Y-HL code which is lower than the C-LL code in priority. This process is achieved by executing steps S16, S17, S20, S21, S17, and S18. Since the codes after the C-LH code are lower in priority then the Y-HL code, these codes are abandoned. This process is achieved by executing steps S16, S17, S20, and S22 and the coding process is ended.

The operation of the priority judge means 417 in coding process for still another field will be described using FIGS. 8 and 11(a)–11(c). The respective codes after the coding process have the amounts shown in table 3.

TABLE 3

| color-layer | size |
|---|---|
| Y-LL | 2000 |
| Y-LH | 1500 |
| Y-HL | 1500 |
| Y-HH | 1000 |
| C-LL | 1500 |
| C-LH | 1000 |
| C-HL | 1000 |
| C-HH | 500 |

In this case, since the capacity of the code storage means 418 is larger than the total amount of the generated codes, all codes can be stored. The coding and storage are achieved by repeating a loop of steps S11 to S14 for four times and repeating a loop of steps S16 to S19 for four times. That is, the Y component codes are stored in the code storage means 418 from the head as shown in FIG. 11(b) and, thereafter, the C component codes are stored from the bottom as shown in FIG. 11(c).

According to the method mentioned above, codes in one field are stored in the code storage means having a fixed capacity.

As described above, according to the second embodiment of the invention, when Y and C component codes, which are obtained by converting an RGB color image to a YUV color image and performing wavelet transform, quantization, and variable-length coding to the YUV color image, are stored in a storage means, the Y component codes of large code amount are successively stored from the head of the storage means while giving priority to the low-frequency components, and the C component codes are successively stored from the bottom of the storage means while giving priority to the low-frequency component. With respect to the high-frequency components which cannot be stored in the storage means, these components are abandoned. Therefore, image data can be stored in the storage means having a fixed storage capacity, at high efficiency, without losing much data, so that coding is performed at high efficiency with less memory capacity. At decoding of the coded data, the quality of the original image is hardly degraded.

[Embodiment 3]

A third embodiment of the present invention relates to the priority judge means 417 and the code storage means 418 described for the second embodiment of the invention, so that description for the process steps before the priority judge step is omitted.

In FIG. 7, it is assumed that the code storage means 418 is a memory having a capacity for storing codes in more than one field.

FIGS. 12(a) to 12(e) are diagrams for explaining the manner of storing codes in the code storage means.

FIG. 13 is a flowchart showing the operation according to this third embodiment of the invention. In FIG. 13, S31 is a step of performing coding and storing generated codes in the code storage means in the same manner as described with respect to FIG. 8, S32 is a step of judging whether there is a space between a Y stored region and a C stored region in the code storage means 418, and S33 is a step of moving the C stored region in the code storage means 418 to fill the space.

A description is given of the operation. One field of an image signal is sampled and coded in the same manner as described for the second embodiment. The code storage means 418 having a region control function assigns a memory of a pre-fixed capacity to codes in one field. FIG. 12(a) shows the entire memory of the code storage means 418 and a memory A assigned to the codes in one field. According to the same process steps as described for the second embodiment, the codes are stored in the memory A (step S31). In FIG. 12(b), characters Y and C denote the Y component codes and the C component codes, respectively, stored in the memory A. The priority judge means 417, serving as a code transfer means and a region recovery means, fills a space between the Y component codes and the C component codes by transferring the C component codes to the space (steps S32 and S33). FIG. 12(c) shows the state where no space is left between Y and C.

Thereafter, next one filed of the image signal is sampled and subjected to the above-mentioned processing. The code storage means 418 assigns a memory B of the same capacity as the memory A to codes in the filed as shown in FIG. 12 (d). The codes are stored in the memory B in the same manner as mentioned for the memory A.

By repeating the above-mentioned processing, codes are stored in the successive memories in the code storage means, leaving no space.

Although the YUV signal is sampled at 4:2:2 in this third embodiment, it may be sampled at 4:1:1. In this case, the amount of the C component codes, which are produced by combining the U component codes and the V component codes, is less than the amount of the Y component codes. Therefore, when the C component codes are stored from the bottom of the code storage means to fill a space between the Y component codes and the C component codes, the amount of codes to be transferred is less than that in case where the Y component codes are stored from the bottom of the code storage means. Further, it is not necessary for the code storage means 418 to assign memories of the same capacity to all fields. That is, the capacity may be varied according to the amount of codes in each filed.

As described above, according to the third embodiment of the invention, when Y and C component codes, which are obtained by converting an RGB color image to a YUV color image and performing wavelet transform, quantization, and variable-length coding to the YUV color image, are stored in a storage means, the Y component codes of large code amount are successively stored from the head of the storage means while giving priority to the low-frequency components, and the C component codes are successively stored from the bottom of the storage means while giving priority to the low-frequency component. With respect to the high-frequency components which cannot be stored in the storage means, these components are abandoned. Therefore, image data can be stored in the storage means having a fixed storage capacity, at high efficiency, without losing much data, so that coding is performed at high efficiency with less memory capacity. At decoding of the coded data, the quality of the original image is hardly degraded. Furthermore, according to the storage region control method mentioned above, signals in successive fields are stored with high efficiency while reducing the memory capacity for each field.

[Embodiment 4]

FIG. 14 is a block diagram illustrating a coding apparatus according to the fourth embodiment of the invention. In FIG. 14, the same reference numerals as those shown in FIG. 4 designate the same or corresponding parts. Reference numeral 409 designates a temporary storage means. In this fourth embodiment, image data is divided into three code sequences.

FIGS. 15(a) to 15(c) are diagrams for explaining the manner of storing codes in the code storage means 408 and the temporary storage means 409.

FIGS. 16(a)–16(b) are a flowchart illustrating the operation according to the fourth embodiment of the invention. In FIG. 16, S41 is a step of coding a Y-LL component, and S42 is a step of putting the coded Y-LL component in the code storage means. Steps S43 to S46 are steps similar to steps S11 to S14 shown in FIG. 8. Further, S47 is a step of putting remaining Y subbands in the temporary storage means when it is judged in step S44 that the code storage means has no capacity, S48 is a step of coding a U-LL component, S49 is a step of putting the coded U-LL component in the code storage means, S50 is a step of coding a U subband having the highest priority at present, S51 is a step of judging whether the code storage means has a capacity or not, S52 is a step of putting a coded subband in the code storage means, S53 is a step of judging whether coding of all the U subbands is finished or not, S54 is a step of storing remaining U subbands in the temporary storage means, S55 is a step of coding a V-LL component, S56 is a step of putting the coded V-LL component in the code storage means, S57 is a step of coding a V subband of the highest priority at present, S58 is a step of judging whether the code storage means has a capacity or not, S59 is a step of putting a coded subband in the code storage means. S60 is a step of judging whether coding of all the V subbands is finished or not, S61 is a step of storing remaining V subbands in the temporary storage means, S62 is a step of judging whether the code storage means has a capacity or not, and S63 is a step of transferring a Y, U, or V subband having the highest priority at present from the temporary storage means to the code storage means.

A description is given of the operation of the priority judge means 407. The highest priority is given to the LL layer, followed by LH, HL, HH in this order. In each layer, the Y component has the highest priority. The respective codes, Y-LL to V-HH, have the code amounts shown in table 4. The size of the storage region 408 is 11500 bytes, and the size of the temporary storage means 409 is 12000 bytes.

TABLE 4

| color-layer | size |
|---|---|
| Y-LL | 3500 |
| Y-LH | 2000 |
| Y-HL | 2000 |
| Y-HH | 1000 |
| U-LL | 2000 |
| U-LH | 1000 |
| U-HL | 1000 |
| U-HH | 1000 |
| V-LL | 2000 |
| V-LH | 1000 |
| V-HL | 1000 |
| V-HH | 1000 |

FIG. 15(a) shows the initial states of the code storage means 408 and the temporary storage means 409.

The priority judge means 407, serving as a storage control means, puts the Y-LL code of the highest priority in the code storage means 408 and puts the Y-LH, Y-HL, and Y-HH codes in the temporary storage means 409 (steps S41 to S47 in FIG. 16). FIG. 15(b) shows the state at this stage. Next, the priority judge means 407 puts the U-LL code in the code storage means 408, next to the Y-LL code, and puts the U-LH, U-HL, and U-HH codes in the temporary storage means 409 (steps S48 to S54). FIG. 15(c) shows the state where storage of the U component codes is completed. Next, the same processing is performed for the V component codes (steps S55 to S61). FIG. 15(d) shows the state where all the color component codes are stored.

Since the code storage means 408 has a remaining capacity of 4000 bytes, the priority judge means 407, having a transfer judge function, selects the Y-LH, U-LH, and V-LH codes, code amounts of which are within 4000 bytes, from the codes stored in the temporary storage means, according to the priority, and transfers these codes to the code storage means 408 in this order (steps S62 and S63). FIG. 15(e) shows the state where the transfer is finished. At this stage, the codes remaining in the temporary storage means 409 are abandoned, completing the coding process for one field.

As described above, according to the fourth embodiment of the invention, when Y and C component codes, which are obtained by converting an RGB color image to a YUV color image and performing wavelet transform, quantization, and variable-length coding to the YUV color image, are stored in a storage means, the Y-LL code having the highest priority among the Y component codes of large code amount is stored in the code storage means while remaining Y component codes are stored in the temporary storage means. Likewise, the U-LL code having the highest priority among the U component codes and the V-LL code having the highest priority among the V component codes are stored in the code storage means so that no space is formed between the addresses, while other U and V component codes are stored in the temporary storage means. Then, among the codes stored in the temporary storage means, the Y-LH, U-LH, and V-LH codes, which have relatively high priority and can be stored in the remaining capacity of the code storage means, are transferred from the temporary storage means to the code storage means. Therefore, even when image data is divided into three components, the image data can be stored in the storage means having a fixed storage capacity, at high efficiency, without losing much data. At decoding of the coded data, the quality of the original image is hardly degraded. Furthermore, according to the storage region control method mentioned above, signals in successive fields are stored with high efficiency while reducing the memory capacity for each field.

Although three code sequences are generated in this fourth embodiment of the invention, the coding method and apparatus according to this fourth embodiment can be applied to a case where two or more code sequences are generated.

[Embodiment 5]

A fifth embodiment of the invention will be described using FIG. 17. The structure according to this fifth embodiment is fundamentally identical to the structure according to the third embodiment except that the code storage means 428 has functions of calculating the total of codes in one filed, deciding a field for the next sampling according to the code amount, and indicating the decision to the sampling means 420. Further, the sampling means 420 performs sampling of the field decided by the code storage means 428.

The operation of the coding apparatus will be described for a case where an image signal having 60 fields per second is coded, for a second, in a memory of 165000 bytes. 1/15 second is required for coding one field, end field sampling is performed at an interval of 4 fields or more.

Initially, the sampling means 420 samples one field, and coding is performed while assigning a memory of 16500 bytes for one field. The code storage means 428 is provided with the following means: that is, means for calculating the memory capacity used by the coding means, means for raising the memory capacity to a prescribed lowest limit value when the calculated memory capacity is lower than this value, means for calculating a field interval in proportion to the memory capacity calculated by the memory capacity calculating means, means for designating the calculated field interval for the sampling means, means for detecting that raising is carried out by the memory capacity raising means, and means for controlling the hierarchical coding to increase the code amount when raising is detected. When the total of the Y component codes and the C component codes is less than 12000 bytes, a field, which is four fields after the previously sampled field, is sampled. When the total is more than 1000 bytes but less than 13750 bytes, a field, which is five fields after the previously sampled field, is sampled. When the total exceeds 13750 bytes, a field, which is six fields after the previously sampled field, is sampled.

Further, when the image signal is subjected to interlace scanning, in order to prevent the upper and lower positions of the sampled field from changing, a field, which is six fields after the sampled field, may be sampled when the total of Y and C codes exceeds 11000 bytes.

The reason is as follows. That is, in case of an ordinary television signal (NTSC signal), a sampling interval of 4–6 fields is the upper limit of a sampling interval that does not make a stiff motion.

Although desired conditions are satisfied when sampling is performed at 4-field interval and a memory of 11000 bytes is fixedly assigned for each field, the resolution is significantly degraded according to the quality of the image. Likewise, although desired conditions are satisfied when sampling is performed at 6-field interval and a memory of 16500 bytes is fixedly assigned to each field, there is a case where 16500 bytes are not assigned for each field according to the quality of image. In this case, the utilization efficiency of memory is significantly degraded.

As described above, according to the fifth embodiment of the invention, fields of an image signal are sampled at a designated time interval, the sampled data is subjected to hierarchical coding and stored in the code storage means. Meanwhile, the memory capacity used for the hierarchical coding is calculated. When the calculated memory capacity is less than a prescribed lowest limit value, this memory capacity is raised to the lowest limit value. When the raising of the memory capacity is detected, the hierarchical coding is controlled to increase the code amount, and a field interval in proportion to the calculated memory capacity is calculated and designated to the sampling means. Therefore, when the code amount is large, the field sampling interval is increased. When the code amount is small, the field sampling interval is reduced. Thereby, image signals in a prescribed period of time can be stored with high efficiency in a limited memory.

The above-described coding time for one field, memory capacity, and image signal recording time are merely examples, and the present invention is not restricted thereto.

Further, when fields, each having a code amount less than 11000 bytes, continue, the quantization factor may be changed so that the quantization error is reduced in the quantization means 214.

[Embodiment 6]

A method of reproducing an image signal coded by the coding method according to any of the first to fourth embodiments of the invention will be described using FIG. 18.

In FIG. 18, a code storage means 518 stores an image signal coded by the coding method according to any of the first to fourth embodiments. The code storage means 518 is similar to the code storage means 408 and 418 and stores a sampling interval at coding. A decoding means 503 performs the reverse of the coding operation. Field storage means 501a and 501b store image signals, and an output from one of these field storage means is always represented by an image representation means 500.

A description is given of the operation. First of all, Y component codes and C component codes in the initial one field (in case of the fourth embodiments, Y, U, and V component codes) are successively taken out from the code storage means 518 and decoded by the deciding means 503 to reproduce the Y component, U component, and V component of the image signal. The reproduced color components are stored in the field storage means 501a. The decoding is performed on the assumption that the Y component layer destroyed by the C component layer at coding and the layers which are not coded are all zero. When all the color components of the image signal are completed, the image is presented to the image representation means 500 to which a YUV signal can be input as it is.

Next, codes in the second field are taken out from the code storage means 518, and the image signal is reproduced in the same manner as mentioned above and stored in the field storage means 501b. After the sampling interval for the first field, the field storage means that presents the image signal to the image representation means 500 is switched to 501b, and reproduction of the image signal for the third field is started. Thereafter, this processing is repeated as long as the next field is present in the code storage means 518.

As described above, according to the sixth embodiment of the invention, codes are read out from the storage means that stores the image signal coded by the coding method according to any of the first to fourth embodiments, and the codes are subjected to the reverse of the coding operation, i.e., decoded. The decoded image signal is written in one of the field storage means and read out from the other field storage means, and the writing and the reading are alternatingly repeated to reproduce the image signal. In this way, the image signal coded by the coding method according to any of the first to fourth embodiments is reproduced. When the field interval for switching the field storage means is fixed at a multiple of the sampling interval stored in the code storage means 518, high-speed reproduction or slow reproduction is possible.

Although in this sixth embodiment an image representation means that can represent a YUV signal is employed, an RGB signal can be input to the image representation means when means for converting the YUV signal into an RGB signal is connected before or after the field storage means.

[Embodiment 7]

A method of reproducing an image signal coded by the coding method according to the fifth embodiment of the invention will be described using FIG. 19.

In FIG. 19, a code storage means 528 stores an image signal coded by the coding method according to the fifth embodiment. The code storage means 528 is similar to the code storage means 428 according to the fifth embodiment and stores a sampling interval at coding.

A description is given of the operation. First of all, Y component codes and C component codes in the initial one field are successively taken out from the code storage means 518 and decoded by the deciding means 503 to reproduce the Y component, U component, and V component of the image signal. The reproduced color components are stored in the field storage means 501a. The decoding is performed on the assumption that the Y component layer destroyed by the C component layer at coding and the layers which are not coded are all zero. When all the color components of the image signal are completed, the image is presented to the image representation means 500 to which a YUV signal can be input as it is.

Next, codes in the second field are taken out from the code storage means 528, and the image signal is reproduced in the same manner as mentioned above and stored in the field storage means 501b. After the sampling interval for the first field, the field storage means that presents the image signal to the image representation means 500 is switched to 501b, and reproduction of the image signal in the third field is started. Thereafter, this processing is repeated as long as the next field is present in the code storage means 528.

As described above, according to the seventh embodiment of the invention, codes are read out from the storage means that stores the image signal coded by the coding method according to the fifth embodiment and the sampling interval, and the codes are subjected to the reverse of the coding operation, i.e., decoded. The decoded image signal is written in one of the field storage means and read out from the other field storage means, and the writing and the reading are alternatingly repeated to reproduce the image signal. Thereby, the image signal is reproduced at the same speed as the original image signal even though the field for sampling is not fixed. Further, when the field interval for switching the field storage means is fixed at a multiple of the sampling interval stored in the code storage means 528, high-speed reproduction or slow reproduction is possible.

Although in this seventh embodiment an image representation means that can represent a YUV signal is employed, an RGB signal can be input to the image representation means when means for converting the YUV signal into an RGB signal is connected before or after the field storage means.

[Embodiment 8]

In the first to fifth embodiments of the present invention, wavelet transform is employed for the coding method and the coding apparatus. In this eighth embodiment of the invention, in order to reduce the scale of hardware to realize the wavelet transform and to increase the wavelet transform speed, the characteristic of the wavelet transform, i.e., repeated frequency-division of image data for each frequency band, is utilized, whereby the circuit scale of hardware employed for the coding method and apparatus according to the first to fifth embodiments is further reduced.

More specifically, processing of an input image I1 by HPFs, LPFs, and subsamplers or processing of a transformed image I3 obtained by horizontal frequency division of the input image I1 by HPFs, LPFs, and subsamplers shown in FIG. 47 is realized by a memory storing a pair of image data and transformed data, HPFs, HPFs, and subsamplers.

Furthermore, in this eighth embodiment of the invention, since the transformed data obtained by frequency division of the input data is transferred so that it is over-written on the input image, no excessive memory is needed. Further, since the frequency division and the data transfer are performed by pipeline processing, time required for the wavelet transform is reduced.

FIG. 20 is a block diagram illustrating a wavelet transform apparatus according to the eighth embodiment of the invention. In FIG. 20, reference numeral 601 designates a CPU for controlling the entire system, numeral 602 designates a data storage element for storing image data and coefficient data obtained by wavelet transform of the image data, numeral 603 designates a CPU bus, numeral 701 designates a shift register unit for storing the input data for 6 pixels, by two pixels in parallel, numeral 702 designates a low-pass filter (LPF) for extracting a low-frequency component from the data from the shift register unit 701 and outputting the data as L coefficient data, and numeral 703 designates a high-pass filter (HPF) for extracting a high-frequency component from the data from the shift register unit 701 and outputting the data as H coefficient data.

The operation of the wavelet transform apparatus so constructed will be described using FIGS. 21(a)–21(f).

First of all, coding of data (wavelet transform) will be described. FIGS. 21(a)–21(f) show process steps of dividing an input image into a plurality of frequency subbands.

Image data to be subjected to wavelet transform (FIG. 21(a)) is once stored in the data storage element 602 on the CPU bus 603. The CPU 601 transfers horizontal line data 1 (FIG. 21(a)) in the image data stored in the data storage element 602, through the CPU bus, to the shift register unit 701. when Pn−2, Pn−1, Pn, Pn+1, Pn+2, Pn+3, Pn are given from the head of the line data in the image data (refer to shift register unit 701 in FIG. 20), and L coefficient data and H coefficient data are represented by Ln and Hn, respectively, an LPF is realized by $$L=(-Pn-2+2*Pn-1+6*Pn+2*Pn+1-Pn+2)/8 \quad (1)$$

and an HPF is realized by $$H=(Pn-2*Pn+1+Pn+2)/2 \quad (2)$$

These filters are called symmetric short kernel filters (SSKFs). Since the LPF and the HPF perform frequency division with five taps and three taps, respectively, these filters can be realized by small-sized hardware.

FIGS. 22(a) and 22(b) show the LPF and the HPF, respectively. In FIG. 22(a), reference numerals 702a, 702b, 702d, 702h, and 702i designate adders, numeral 702c and 702s designate multipliers multiplying an input by 2, numeral 702j designates a divider dividing an input by 8, and numerals 702f and 702g designate complementers outputting a complement of 2. In FIG. 22(b), reference numerals 703a and 703d designate adders, numeral 703b designates a complementer outputting a complement of 2, numeral 703c designates a multiplier multiplying a input by 2, and numeral 703e designates a divider dividing an input by 2.

The shift register unit 701 shown in FIG. 20 is constituted by a register array 701x comprising registers 701f, 701d, and 701b and a register array 701y comprising registers 701e, 701c, and 701a. When pixels Pn−2, Pn−1, Pn, Pn+1, Pn+2, Pn+3, Pn, . . . are input, by two pixels as a unit, to the shift register unit 701, pixels Pn−1, Pn+1, Pn+3, . . . are input to an input terminal of the register array 701x while pixels Pn−2, Pn, Pn+2, . . . are input to an input terminal of the register array 701y.

Therefore, by inputting the pixel data to the shift register unit 701 by two pixels in parallel, buffering of an input required for executing frequency division for each data unit (m−2, m, m+2, . . . ) is performed and, simultaneously, ½ subsampling wherein the pixel data is input, for alternate pixels, to the register arrays 701x and 701y is performed.

The image data transferred to the shift register unit 701 is output toward the LPF 702 end HPF 703, whereby the image data is frequency-divided into L coefficient data and H coefficient data by two pixels. Then, the L and H coefficient data are once latched in the registers 704 and 705 and transferred, by the CPU 601, to the transformed line data storage regions in the data storage element 602. Thereafter, the H and L coefficient data are transferred to the line data storage regions of the input image, whereby these coefficient data are stored in the addresses for the L coefficient data 1 and H coefficient data 1 shown in FIG. 21(b). By repeating this processing, the image data shown in FIG. 21(a) is stored as shown in FIG. 21(c), after the frequency division.

Next, vertical frequency division is performed for the coefficient data shown in FIG. 21(c). The CPU 601 transfers vertical line data 2 (FIG. 21(d)) of the L coefficient data 1 in the data storage element 602, through the CPU bus 603, to the shift register unit 701. Then, the image data transferred to the shift register unit 701 is output toward the LPF 702 and the HPF 703, whereby the image data is frequency divided into L coefficient data and H coefficient data by two pixels. Then, the H and L coefficient data are transferred, by the CPU 601, to the transformed line data storage regions in the vertical direction in the data storage element 602. Thereafter, the H and L coefficient data are transferred to the vertical line data storage regions of the input image, whereby these coefficient data are stored in the addresses for the L coefficient data 2 and the H coefficient data 2 shown in FIG. 2(e). By repeating this operation, the coefficient data shown in FIG. 21(d) are stored as shown in FIG. 21(f) after the frequency division.

The CPU 601 repeats the frequency division to transform the input image data to wavelet coefficient data which is divided into a plurality of subbands as shown in FIG. 48.

A flowchart of the above-mentioned operation is illustrated in FIG. 23.

(1) In step S101, the CPU 601 successively reads out the horizontal line data of the input image data stored in the data storage element 602, by two pixels as a unit, that is, (Pn−2, Pn−1), (Pn, Pn+1), (Pn+2, Pn+3), . . .

(2) In step S102, the read image data, for two pixels, are successively transferred to the shift register unit 701. At this time, mince the CPU bus 603 is 16 bit wide and each of the register arrays 701x and 701y has an 8 bit wide input bus, by only performing this transfer, ½ down sampling is done in the horizontal direction. Then, the register value is shifted at the timing of the writing into the register.

(3) In step S103, for the central pixel Pn in the shift register unit 701, the LPF 702 and the HPF 703 perform the following processing:

$$LPF \text{ coefficient data} = (-Pn-2+2*Pn-1+6*Pn+2*Pn+1-Pn+2)/8$$

$$HPF \text{ coefficient data} = (Pn-2*Pn+1+Pn+2)/2$$

(4) In step S104, the LPF coefficient data and the HPF coefficient data for the central pixel Pn are once latched by the registers 704 and 705, respectively.

(5) In step S105, by the CPU 601, the latched L and H coefficient data are stored as line data Ln and line data Hn of the wavelet-transformed data in the data storage element 602, respectively.

(6) In step S106, steps S101 to S105 are performed for all lines of the input image to obtain images I2 and I3 from the input image I1.

(7) In step S107, steps S101 to S106 are performed for all lines of th input image while controlling the address and the processing size in the data storage element 602, resulting in HH(F1), HL(F2), LH(F3), and LL(=I4).

(8) In step S108, for an input image I4, steps S101 to S107 are performed for lines in the vertical direction while controlling the address and the processing size in the data storage element 602, resulting in LLHH(F4), LLHL(F5), LHLH(F6), and LHLL(=I7).

(9) In step S109, for an input image I7, steps S101 to S108 are performed for lines in the vertical direction while controlling the address and the processing size in the data storage element 602, resulting in LLLLHH(F7), LLLLHL (F8), LLLLLH(F9), and LLLLLLL(=I10).

As described above, according to the eighth embodiment of the invention, the CPU 601 transfers the image data in the data storage element 602 through the shift register unit 701 to the LPF 702 and the HPF 703, whereby the simultaneous ½ subsampling and frequency division are performed recursively for each frequency subband. Therefore, a wavelet transform apparatus is realized by small-sized hardware, and the apparatus is easily controlled.

[Embodiment 9]

FIG. 24 is a block diagram illustrating the entire structure of a wavelet transform apparatus according to a ninth embodiment of the invention. In the figure, the same reference numerals as those shown in FIG. 20 designate the same or corresponding parts. The structure shown in FIG. 24 is different from the structure shown in FIG. 20 in that a coefficient line memory (coefficient FIFO) 74 (in figure, coefficient FIFO1) for storing an output from a LPF 72, a coefficient line memory (coefficient FIFO) 75 (in figure, coefficient FIFO2) for staring an output from a HPF 73, and a CPU bus DMAC (Direct Memory Access Controller) 601a for performing DMA (Direct Memory Access) transfer of data are added. The DMAC 601a may be included within the CPU 601.

FIG. 25 is a block diagram illustrating the LPF 72 and the HPF 73 in more detail. The LPF 72 comprises the shift register unit 701, the LPF 702, and the register 704 Shown in FIG. 20, and the HPF 73 comprises the shift register unit 701, HPF 703, and the register 705 shown in FIG. 20.

A description is now given of the operation of the wavelet transform apparatus.

Image data to be subjected to wavelet transform (FIG. 21(a)) is once stored in the data storage element 602 on the CPU bus 603. The CPU bus DMAC 601a transfers, by DMA transfer, horizontal line data 1 (FIG. 21(a)) in the image data stored in the data storage element 602, through the CPU bus, to the LPF 72 and the HPF 73, whereby L coefficient data and H coefficient data, which are frequency-divided by two pixels by the LPF 72 and the HPF 73, are stored in the coefficient FIFO 74 and the coefficient FIFO 75, respectively. After completing the frequency division for the line data 1, the CPU bus DMAC 601e transfers, by DMA transfer, the coefficient data stored in the coefficient line memories 74 and 75 successively to the data storage element 602. The L and H coefficient data so transferred are stored in an address for L coefficient data 1 and an address for H coefficient data 1, respectively.

The CPU bus DMAC 601a repeats the frequency division and the DMA transfer, whereby the image data is transformed to wavelet-transformed data divided into a plurality of frequency subbands as shown in FIG. 48.

A flowchart of the above-mentioned operation is illustrated in FIG. 26.

(1) In step S111, the CPU 601 designates the head address and the transfer data length of the line data of the image data stored in the data storage element 602, and outputs an instruction for DMA transfer to the CPU bus DMAC 601a.

(2) In step S112, the CPU bus DMAC 601a successively reads out the line data of the input image data stored in the data storage element 602, by two pixels as a unit, that is, (Pn–2, Pn–1), (Pn, Pn+1), (Pn+2, Pn+3), . . .

(3) In step S113, the read image data is transferred to the shift register unit 701 by two pixels as a unit. At this time, since the CPU bus is 16 bit wide and each of the register arrays 701x and 701y has an 8 bit wide input bus, by only performing this transfer, ½ down sampling is done in the horizontal direction. Then, the register value is shifted at the timing of the writing into the register.

(4) In step S114, for the central pixel Pn in the shift register unit 701, the LPF 702 and the HPF 703 perform the following processing:

$$LPF \text{ coefficient data} = (-Pn-2+2*Pn-1+6*Pn+2*Pn+1-Pn+2)/8$$

$$HPF \text{ coefficient data} = (Pn-2*Pn+1+Pn+2)/2$$

(5) In step S115, the LPF coefficient data and the HPF coefficient data for the central pixel Pn are once latched by the registers 704 and 705, respectively.

(6) In step S116, the latched L and H coefficient data are stored in the coefficient FIFO 74 and the coefficient FIFO 75, respectively.

(7) In step S117, the CPU bus DMAC 601a sends outputs from the coefficient FIFO 74 and the coefficient FIFO 75, in this order, to the wavelet-transformed data storage region in the data storage element 602. At this stage, since one pixel is 8 bits, serial to parallel conversion may be performed at a cycle twice of the DMA cycle to transfer 16 bits, whereby the transfer speed is further increased.

(8) In step S118, steps S111 to S117 are performed for all lines of the input image to obtain images I2 and I3 from the input image I1.

(9) In step S119, the CPU 601 successively reads out line data in the vertical direction, by two pixels as a unit, while controlling the address and the processing size of the image data stored in the data storage element 602.

(10) In step S120, the image data for the two pixels is successively transferred to the shift register unit 701.

(11) In step S121, for the central pixel Pn in the shift register unit 701, the LPF 702 and the HPF 703 perform the following processing:

$$LPF \text{ coefficient data} = (-Pn-2+2*Pn-1+6*Pn+2*Pn+1-Pn+2)/8$$

$$HPF \text{ coefficient data} = (Pn-2*Pn+1+Pn+2)/2$$

(12) In step S122, the LPF coefficient data and the HPF coefficient data for the central pixel Pn are once latched by the registers 704 and 705, respectively.

(13) In step S123, by the CPU 601, the latched L and H coefficient data are stored as line data Ln and line data Hn of the wavelet-transformed data in the data storage element 602, respectively.

(14) In step S124, steps S119 to S123 are performed for all vertical lines in the input image, resulting in HH(F1), HL(F2), LH(F3), and LL(=I4).

(15) In step S125, for an input image I4, steps S111 to S124 are repeated while controlling the address and the processing size in the data storage element 602, resulting in LLHH(F4), LLHL(F5), LHLH(F6), and LHLL(=I7).

(16) In step S126, for an input image I7, steps S111 to S125 are repeated while controlling the address and the processing size in the data storage element 602, resulting in LLLLHH(F7), LLLLHL(F8), LLLLLH(F9), and LLLLLLL (=I10).

If the apparatus is not provided with the coefficient FIFO 74 and the coefficient FIFO 75, when the line data in the input image data region in the data storage element is successively frequency-divided and then stored in the region where the original line data has been stored, since the processing is performed by two pixels, line data which is not read out yet is destroyed.

However, in this ninth embodiment of the invention, since the apparatus is provided with the coefficient FIFO 74 and the coefficient FIFO 75, when the line data in the input image data region in the data storage element is frequency-divided, the coefficient data is once stored in the FIFO. Therefore, it is possible to restore the line data in the region where the original line data has been stored, so that the wavelet-transformed data region is dispensed with, whereby the memory efficiency is improved.

As described above, according to the ninth embodiment of the invention, the image data stored in the data storage element 602 is transferred through the shift register unit 701 to the LPF 702 and the HPF 703, whereby the simultaneous ½ subsampling and frequency division are performed recursively for each frequency subband. Therefore, a small-sized and easily controllable wavelet transform apparatus is realized. Furthermore, since the L coefficient data and the N coefficient data are successively DMA-transferred to the data storage element, the address calculation is facilitated. When a memory capable of burst transfer in the horizontal direction, such as a DRAM (Dynamic Random Access Memory), is employed as the data storage element 602, the data transfer speed in the horizontal direction is increased. Alternatively, when a memory capable of burst transfer in both the horizontal and vertical directions, such as an SRAM (Static Random Access Memory), is employed as the data storage element 602, the data transfer speed can be increased in both the horizontal and vertical directions. As a result, a high-speed wavelet transform apparatus is realized.

[Embodiment 10]

FIG. 27 is a block diagram illustrating the entire structure of a wavelet transform apparatus according to a tenth embodiment of the invention. In the figure, the same reference numerals as those shown in FIG. 24 designate the same or corresponding parts. The apparatus shown in FIG. 27 includes, besides the CPU bus 603 having a bit width of two pixels, a local bus 609 having a bit width of one pixel. Reference numeral 607 designates a coefficient storage element for storing frequency-divided L coefficients and H coefficients, numeral 78 designates a switch for switching receivers of output data from the coefficient line memories 74 and 75, numeral 79 designates a selector for selecting data to be input to the LPF 72 and the HPF 73 from the data storage element 602 and the coefficient storage element 607, and numeral 606a designates a local bus DMAC for DMA transfer of data.

A description is now given of the operation of the wavelet transform apparatus.

Image data to be subjected to wavelet transform (FIG. 21(a)) is once stored in the data storage element 602 on the CPU bus 603. The CPU bus DMAC 601a transform, by DMA transfer, horizontal line data 1 (FIG. 21(a)) in the image data stored in the data storage element 602, through the CPU bus 603, to the LPF 72 and the HPF 73. At this stage, the selector 79 selects the CPU bus 603.

L coefficient data, which is frequency-divided by two pixels by the LPF 72 and the HPF 73, are transferred directly to the coefficient storage element 607 (FIG. 21(b)). Meanwhile, H coefficient data is stored in the coefficient line memory 75. The H coefficient data in the coefficient line memory 75 is transferred to the coefficient storage element 607 after the transfer of the L coefficient data to the coefficient storage element 607 is completed (FIG. 21(b)). At this stage, the switch 78 selects the local bus 609.

Therefore, the L and N coefficient data in the coefficient storage element 607 are stored as shown in FIG. 21(c) by repeating frequency division of the image data shown in FIG. 21(a).

Next, the coefficient data shown in FIG. 21(c) is subjected to vertical frequency division. The CPU 601 successively reads out vertical line data (FIG. 21(d)) of the L coefficient data in the coefficient storage element 607 and transfers the data to the LPF 72 and the HPF 73. At this stage, the selector 79 selects the local bus 609.

The L coefficient data, which is frequency-divided by two pixels, is stored in the coefficient line memory 74 (in figure, FIFO1), and the H coefficient data are stored in the coefficient line memory 75 (in figure, FIFO2). After the frequency division is completed, the L coefficient data in the coefficient line memory 74 is transferred to the coefficient storage element 607 (FIG. 21(e)) and, subsequently, the H coefficient data in the coefficient line memory 75 is transferred to the coefficient storage element 607 (FIG. 21(e)).

Therefore, the L and H coefficient data in the coefficient storage element 607 are stored as shown in FIG. 21(f) by repeating the frequency division of the image data shown in FIG. 21(d).

By repeating the frequency division for the L and H coefficient data stored in the coefficient storage element 607, the input image data is frequency-divided into L and H coefficient data as shown in FIG. 48, whereby wavelet transform is completed.

After the first frequency division, since the subsequent frequency division is performed using only the local bus 609, the CPU 601 can perform another processing using the CPU bus 603.

A flowchart of the above-mentioned operation is illustrated in FIG. 28.

(1) In step S121, the CPU 601 designates the head address and the transfer data length of the line data of the image data stored in the data storage element 602, and outputs an instruction for DMA transfer to the CPU bus DMAC 601a.

(2) In step S122, the CPU bus DMAC 601a successively reads out the line data of the input image data stored in the data storage element 602, by two pixels as a unit, that is, (Pn−2, Pn−1), (Pn, Pn+1), (Pn+2, Pn+3), . . .

(3) In step S123, the read image data is transferred to the shift register unit 701 by two pixels as a unit. At this time, mince the CPU bus is 16 bit wide and each of the register arrays 701x and 701y has an 8 bit wide input bus, by only performing this transfer, ½ down sampling is done in the horizontal direction. Then, the register value is shifted at the timing of the writing into the register.

(4) In step S124, for the central pixel Pn in the shift register unit 701, the LPF 702 and the HPF 703 perform the following processing:

LPF coefficient data=$(-Pn-2+2*Pn-1+6*Pn+2*Pn+1-Pn+2)/8$

HPF coefficient data=$(Pn-2*Pn+1+Pn+2)/2$ (5) In step S125, the LPF coefficient data and the HPF coefficient data for the central pixel Pn are once latched by the registers 704 and 705, respectively.

(6) In step S126, the latched L and H coefficient data are stored in the coefficient FIFO 74 and the coefficient FIFO 75, respectively.

(7) In step S127, the local bus DMAC 606a sends the L coefficient data in the coefficient FIFO 74 and the H coefficient data in the coefficient FIFO 75, in this order, to the wavelet-transformed data storage region in the data storage element 602.

(8) In step s128, steps S121 to S127 are performed for all lines of the input image to obtain images I2 and I3 from the input image I1.

(9) In step S129, the CPU 601 designates the head address and the transfer data length of the line data of the image data stored in the coefficient storage element 607, and outputs an instruction for DMA transfer to the local bus DMAC 606a.

(10) In step S130, the local bus DMAC 606a successively reads out the line data of the input image data stored in the coefficient storage element 607, by two pixels as a unit, that is, (Ln−2, Ln−1), (Ln, Ln+1), (Ln+2, Ln+3), . . .

(11) In step S131, the read image data is transferred to the shift register unit 701 by two pixels as a unit. However, since the local bus 609 has a bit width of only one pixel, it is necessary to convert the image data for two pixels by serial to parallel conversion or the like before it is transferred to the shift register unit 701. While the image data transferred by two pixels has a width of 16 bits, the input bus of each of the register arrays 701x and 701y has a width of 8 bits. So, by only performing this transfer, ½ down sampling is done in the horizontal direction. Then, the register value is shifted at the timing of the writing into the register.

(12) In step S132, for the central pixel Ln in the shift register unit 701, the LPF 702 and the HPF 703 perform the following processing:

LPF coefficient data=$(-Ln-2+2*Ln-1+6*Ln+2*Ln+1-Ln+2)/8$

HPF coefficient data=$(Ln-2*Ln+1+Ln+2)/2$

(13) In step S133, the LPF coefficient data and the HPF coefficient data for the central pixel Ln are once latched by the registers 704 and 705, respectively.

(14) In step S134, the latched L and H coefficient data are stored in the coefficient FIFO 74 and the coefficient FIFO 75, respectively.

(15) In step S135, the local bus DMAC 606a sends the L coefficient data in the coefficient FIFO 74 and the H coefficient data in the coefficient FIFO 75, in this order, to the wavelet-transformed data storage region in the coefficient storage element 607, whereby HH(F1), HL(F2), LH(F3), and LL(=I4) are obtained.

(16) In step S136, for an input image I4, steps S121 to S134 are repeated while controlling the address and the processing size in the data storage element 602, resulting in LLHH(F4), LLHL(F5), LHLH(F6), and LHLL(=I7).

(17) In step S137, for an input image I7, steps S121 to S135 are repeated while controlling the address and the processing size in the data storage element 602, resulting in LLLLHH(F7), LLLLHL(F8), LLLLLH(F9), and LLLLLLL (=I10).

As described above, according to the tenth embodiment of the present invention, for example, the CPU 601 has a DMA function, the data storage element 602 comprises a memory capable of burst transfer for memory access in the horizontal direction, such as DRAM, the coefficient storage element 607 comprises a memory capable of burst transfer for memory access in both the horizontal and vertical direction, such as SRAM, and the coefficient line memories 74 and 75 are constituted by FIFOs. In this case, the image data stored in the data storage element 602 is subjected to frequency division at the DMA cycle of the CPU 601 and stored, as coefficient data, in the coefficient line memories 74 and 75, and the coefficient data is burst-transferred to the coefficient storage element 607 by the switch 78. Further, when the coefficient data stored in the coefficient storage element 607 is selected by the selector 79, the coefficient data can also be subjected to frequency division at the DMA cycle. Since the frequency division and the data transfer are performed by pipeline processing using the above-mentioned hardware structure, high-speed frequency division of image data is possible. Further, since the horizontal and vertical frequency division of image signal is performed recursively, a wavelet transform apparatus is realized by small-sized hardware, and the apparatus is easily controlled.

Although in this tenth embodiment of the invention a local bus having a bit width of one pixel is employed, if an SRAM, input and output of which have a bit width of two pixels, can be used as the coefficient storage element, a local bus having a bit width of two pixels may be employed.

Further, in the step of frequency division using the coefficient storage element, when data are finally output from the coefficient FIFOs 74 and 75, these data may be transferred to the data storage element. In this case, since one pixel is 8 bits, serial to parallel conversion may be performed at a cycle twice of the DMA cycle to transfer 16 bits, whereby the transfer speed is further increased.

[Embodiment 11]

An eleventh embodiment of the invention relates to wavelet reverse transform (decoding) for wavelet-transformed data. FIG. 29 is a block diagram illustrating the entire structure of a wavelet reverse transform apparatus according to the eleventh embodiment of the invention. In the figure, the same reference numerals as those in FIG. 20 designate the same or corresponding parts. Reference numerals 801 and 602 designate decoding filters for decoding L coefficient data and H coefficient data stored in the data storage element 602 to the original image, and numerals 804 and 805 designate registers for latching coefficient data output from the decoding filters 801 and 802, respectively.

FIGS. 31(*a*) and 31(*b*) show the structures of the decoding filters 801 and 802, respectively. In FIG. 31(*a*), reference numerals 801*a* and 801*b* designate adders, and numeral 801*c* designates a divider dividing an input by 4. In FIG. 31(*b*), reference numerals 802*a*, 802*b*, 802*f*, 802*h*, and 802*j* designate adders, numerals 802*c* and 802*e* designate multipliers multiplying an input by 2, numeral 802*d* designates a complementer outputting a complement of 2 of an input, numeral 802*g* designates a divider dividing an input by 8, and numeral 802*i* designates a divider dividing an input by 2.

A description is given of the operation of the wavelet reverse transform apparatus.

FIGS. 30(*a*) to 30(*c*) show the process of decoding a wavelet-transformed image.

The wavelet-transformed image is stored in the data storage element 602 as shown in FIG. 30(*a*). Initially, as shown in FIG. 30(*a*), the LLLLLL coefficient data 1 is read out in the vertical direction and transferred to the shift register unit 701. After the transfer, synchronously with the timing to transfer the LLLLLH coefficient data 1 shown in FIG. 30(*a*), the L and H coefficient data are transferred, pixel by pixel, to the decoding filters 801 and 802.

FIGS. 31(*a*) and 31(*b*) show the structures of the decoding filters 801 and 802, respectively. When Ln and Ln+1 are given from the head of the L coefficient data line, Hn−1, Hn, and Hn+1 are given from the head of the H coefficient data line, P2n is given to odd-number data in the decoded coefficient line 1 (FIG. 30(*a*)), and P2n+1 is given to even-number data in the decoded coefficient line 1, the odd-number data is represented by $$P2n = Ln + (Hn-1+Hn)/4 \qquad (3)$$

and the even-number data is represented by $$P2n+1 = (Hn+Ln+1)/2 + (Hn-1-6*Hn+Hn+1)/8 \qquad (4)$$

Further, up-sampling to increase the pixel number is performed simultaneously with this processing.

The odd-number data and the even-number data, decoded by the decoding filters 801 and 802, are stored in the registers 804 and 805, respectively.

By alternatingly reading out odd data and even data from the registers 804 and 805, these data are again transferred to the data storage element 602, and stored in the address 1 shown in FIG. 30(*a*).

Therefore, by repeatedly decoding the LLLLLL coefficient data and the LLLLLH coefficient data in the data storage element 602, the LLLLL coefficient data region shown in FIG. 30(*b*) is restored.

Likewise, when the LLLLHL coefficient data 2 and the LLLLHH coefficient data 2 shown in FIG. 30(*a*) are read out in the vertical direction and decoded, the LLLH coefficient data region shown in FIG. 30(*b*) is restored.

Further, from the LLLLL coefficient data 3 and the LLLLH coefficient data 3 shown in FIG. 30(*b*), the LLLL coefficient data region shown in FIG. 30(*c*) is restored.

Subsequently, the LLLL coefficient data 4 and the LLLH coefficient data 4 in the vertical direction shown in FIG. 30(*c*) are decoded.

When the original image data is finally restored, after the decoding of the L and H coefficient data in the horizontal direction, the decoded image data are stored in the registers 804 and 805, and the CPU 601 reads out the stored image data and transfers the data through the CPU bus 603 to the data storage element 602.

Therefore, the L and H coefficient data in the data storage element 602 can be restored to the original image data and transferred to the data storage element 602.

A flowchart of the above-mentioned operation is shown in FIG. 32.

(1) In step S141, the CPU 601 reads out, pixel by pixel, the line data of the wavelet-transformed data stored in the data storage element 602, alternatingly for the L coefficient data and the H coefficient data, that is, in the order of . . . , Ln−1, Hn−1, Ln, Hn, Ln+1, Hn+1, . . .

(2) In step S142, the read L coefficient data and H coefficient data are successively transferred to the shift register unit 701. The L coefficient data and the H coefficient data shift the register values at the timing by which the CPU 601 writes these data to the registers.

(3) In step S143, for the center pixels Ln and Hn in the shift register unit 701, the following processing is performed:

decoded data $Zn$ (even)$=Ln+(Hn-1+Hn)/4$ decoded data $2n+1$ (odd)$=(Hn+Ln+1)/2+(Hn-1-6*Hn+Hn+1)/8$ (4) In step 5144, the coded data 2n and 2n+1 corresponding to the central pixels Ln and Hn are once latched in the registers 804 and 805.

(5) In step S145, by the CPU 601, the latched coded data are successively stored in the line data Pn and Pn+1 of the input image data in the data storage element 602.

By the pipeline processing for the coefficient data transfer and the decoding using the hardware structure mentioned above, decoding of the coefficient data is performed at high speed. Further, by decoding the image recursively in both the horizontal direction and the vertical direction, wavelet reverse transform is realized.

(6) In step S146, step S141 to S145 are performed for all the L and H coefficient data lines, whereby images I2 and I3 is obtained from the L coefficient data and the H coefficient data, respectively.

(7) Thereafter, in step S147, steps S141 to S146 are performed, by each pixel, for all the L and H coefficient data lines while controlling the address and the processing size in the data storage element 602, whereby LLLLH and LLLLL (=I4) are obtained.

(8) In step S148, steps S141 to S147 are performed for input images LLLLH and LLLLL while controlling the address and the processing size in the data storage element 602, whereby LLHH, LLHL, LHLH, and LHLL are obtained.

(9) In step S149, steps S141 to S148 are performed for input images LLHH, LLHL, LHLH, and LHLL while controlling the address and the processing size in the data storage element 602, whereby LLH and LHL are obtained.

(10) In step S150, steps S141 to S149 are performed for input images LLH and LHL while controlling the address and the processing size in the data storage element 602, whereby LH and LL are obtained.

(11) Further, in step S111, steps S141 to S150 are performed for input images LH and LL while controlling the address and the processing size in the data storage element 602, whereby the original input image I1 is restored.

As described above, according to the eleventh embodiment of the invention, the CPU 601 transfers the coefficient data stored in the data storage element 602 to the decoding filters 801 and 802, whereby wavelet reverse transform and up-sampling are simultaneously performed, and this processing is performed recursively for each frequency subband. Therefore, a wavelet reverse transform apparatus is realized with small-sized hardware, and the apparatus is easily controlled.

[Embodiment 12]

FIG. 33 shows the entire structure of a wavelet reverse transform apparatus according to a twelfth embodiment of the invention. In FIG. 33, the same reference numerals as those shown in FIG. 29 designate the same or corresponding parts. Reference numeral 84 designates a coefficient line memory (in figure, FIFO1) for storing an output from the decoding filter 801, numeral 85 designates a coefficient line memory (in figure, FIFO2) for storing an output from the decoding filter 802, numeral 710 designates a coded L coefficient line memory, and numeral 601*a* designates a CPU bus DMAC for DMA transfer of data. The DMAC 601*a* may be included in the CPU 601.

A description is given of the operation of the wavelet reverse transform apparatus.

FIGS. 30(*a*) to 30(*c*) show the process of decoding a wavelet-transformed image.

The wavelet-transformed image is stored in the data storage element 602 as shown in FIG. 30(*a*). Initially, as shown in FIG. 30(*a*), the CPU bus DMAC 601*a* reads out the LLLLLL coefficient data 1 in the vertical direction and transfers the data to the decoding line memory 710. After the transfer, synchronously with the timing to transfer the LLLLLH coefficient data 1 shown in FIG. 30(*a*), the L and H coefficient data are transferred, pixel by pixel, to the decoding filters 801 and 802.

FIGS. 31(*a*) and 31(*b*) show the structures of the decoding filters 801 and 802, respectively. When Ln and Ln+1 are given from the head of the L coefficient data line, Hn−1, Hn, and Hn+1 are given from the head of the H coefficient data line, P2n is given to odd-number data in the decoded coefficient line 1 (FIG. 30(*a*)), and P2n+1 is given to even-number data in the decoded coefficient line 1, the odd-number data is represented by $$P2n = Ln + (Hn-1+Hn)/4 \qquad (3)$$

and the even-number data is represented by $$P2n+1 = (Hn+Ln+1)/2 + (Hn-1-6*Hn+Hn+1)/8 \qquad (4)$$

Further, up-sampling to increase the pixel number is performed simultaneously with this processing.

The odd-number data and the even-number data, decoded by the decoding filters 801 and 802, are stored in the registers 804 and 805, respectively.

By alternatingly reading out odd data and even data from the registers 804 and 805, these data are again transferred to the data storage element 602 and stored in the address 1 shown in FIG. 30(*a*).

Therefore, by repeatedly decoding the LLLLLL coefficient data and the LLLLLH coefficient data in the data storage element 602, the LLLLL coefficient data region shown in FIG. 30(*b*) is restored.

Likewise, when the LLLLHL coefficient data 2 and the LLLLHH coefficient data 2 shown in FIG. 30(*a*) are read out in the vertical direction and decoded, the LLLLH coefficient data region shown in FIG. 30(*b*) is restored.

Further, from the LLLLL coefficient data 3 and the LLLLH coefficient data 3 shown in FIG. 30(*b*), the LLLL coefficient data region shown in FIG. 30(*c*) is restored.

Subsequently, the LLLL coefficient data 4 and the LLLH coefficient data 4 in the vertical direction shown in FIG. 30(*c*) are decoded.

When the original image data is finally restored, after the decoding of the L and H coefficient data in the horizontal direction, the decoded image data are stored in the registers 804 and 805, and the CPU bus DMAC 601*a* reads out the stored image data and transfers the data through the CPU bus 603 to the data storage element 602.

Therefore, the L and H coefficient data in the data storage element 602 can be restored to the original image data and transferred to the data storage element 602.

A flowchart of the above-mentioned operation is shown in FIG. 34.

(1) In step S161, the CPU 601 designate the head addresses and the transfer data lengths of the L coefficient line data and the H coefficient line data of the wavelet-transformed data stored in the data storage element 602, and outputs an instruction for DMA transfer to the CPU bus DMAC 601*a*.

(2) In step S162, the CPU bus DMAC 601*a* successively decodes the L coefficient line d ate and transfer the data, pixel by pixel, to the coefficient FIFO memory 710, in the order of . . . , Ln−1, Ln, Ln+1, . . .

(3) In step S163, after the transfer of the L coefficient line data to the decoded L coefficient FIFO memory 710, synchronously with the timing to write the H coefficient line data ( . . . , Hn−1, Hn, Hn+1, . . . ) into the H coefficient shift register, the content of the coded L coefficient FIFO memory 710 is transferred to the L coefficient shift register array 701*x*, wherein the data is latched and shifted.

(4) In step S164, for the center pixels Ln and Hn in the shift register unit 701, the following processing is performed:

decoded data 2n (even)=Ln+(Hn−1+Hn)/4 decoded data 2n+1 (odd)=(Hn+Ln+1)/2+(Hn−1−6*Hn+Hn+1)/8

(5) In step S165, the coded data 2n and 2n+1 corresponding to the central pixels Ln and Hn are once latched in the registers and transferred to the coefficient FIFO 84 and the coefficient FIFO 85, respectively.

(6) In step S166, after the transfer is completed, the decoded odd and even data in the coefficient FIFO 84 and the coefficient FIFO 85 are stored in the line data of the input image data stored in the data storage element 602 by switching the FIFOs. At this stage, in order to increase the memory efficiency, the wavelet-transformed data and the input image data may be stored in the same storage region. Further, when data are transferred from the coefficient FIFOs 84 and 85 to the data storage element, since one pixel is 8 bits, serial to parallel conversion may be performed at a cycle twice of the DMA cycle to transfer 16 bits, whereby the transfer speed is further increased.

(7) in step S167, steps S161 to S166 are performed for all the L and H coefficient data lines, whereby images I2 and I3 is obtained from the L coefficient data and the H coefficient data, respectively.

(8) Thereafter, in step S168, steps S161 to S167 are performed, by each pixel, for all the L and H coefficient data lines while controlling the address and the processing size in the data storage element 602, whereby LLLLH and LLLLL (=I4) are obtained.

(9) In step S169, steps S161 to S168 are repeated in similar manner while controlling the address and the processing size in the data storage element 602, whereby LLHH, LLHL, LHLH, and LHLL are obtained.

(10) In step S170, steps S161 to S169 are repeated in similar manner while controlling the address and the processing size in the data storage element 602, whereby LLLH and LHL are obtained.

(11) In step S171, steps S161 to S170 are repeated in similar manner while controlling the address and the processing size in the data storage element 602, whereby LH and LL are obtained.

(12) Further, in step S172, steps S161 to S171 are performed in similar manner while controlling the address and the processing in the data storage element 602, whereby the original input image I1 is restored.

As described above, according to the twelfth embodiment of the invention, the image data stored in the data storage element 602 is transferred through the shift register unit 701 to the decoding filters 801 and 802, whereby wavelet reverse transform and up-sampling are simultaneously performed, and this processing is performed recursively for each frequency subband. Therefore, a wavelet reverse transform apparatus is realized with small-sized hardware, and the apparatus is easily controlled. Further, since the L coefficient data and the H coefficient data are successively DMA-transferred to the data storage element, the address calculation is simplified. When a memory capable of burst transfer in the horizontal direction, such as a DRAM, is employed as the data storage element 602, the data transfer speed in the horizontal direction is increased. Alternatively, when a memory capable of burst transfer in both the horizontal and vertical directions, such as an SRAM, is employed as the data storage element 602, the data transfer speed can be increased in both the horizontal and vertical directions. As a result, a high-speed wavelet transform apparatus is realized.

[Embodiment 13]

FIG. 35 is a block diagram illustrating a wavelet reverse transform apparatus according to a thirteenth embodiment of the invention. In FIG. 35, the same reference numerals as those shown in FIG. 29 designate the same or corresponding parts. Reference numeral 609 designates a local bus, numeral 807 designates a coefficient storage element 607 for storing frequency-divided L coefficients and H coefficients, numeral 88 designates a switch for switching receivers of output data from the coefficient line memories 85 and 86, and numeral 807a designates a local bus DMAC for DMA transfer of data.

A description is given of the operation of the wavelet reverse transform apparatus.

FIGS. 30(a) to 30(c) show the process of decoding a wavelet-transformed image.

The wavelet-transformed image is stored in the coefficient storage element 807 as shown in FIG. 30(a). Initially, an shown in FIG. 30(a), the local bus DMAC 807a reads out the LLLLLL coefficient data 1 in the vertical direction and transfers the data to the decoding line memory 710. After the transfer, synchronously with the timing to transfer the LLLLLH coefficient data 1 shown in FIG. 30(a), the L and H coefficient data are transferred, pixel by pixel, to the decoding filters 801 and 802.

FIGS. 31(a) and 31(b) show the structures of the decoding filters 801 and 802, respectively. When Ln and Ln+1 are given from the head of the L coefficient data line, Hn−1, Hn, and Hn+1 are given from the head of the H coefficient data line, P2n is given to odd-number data in the decoded coefficient line 1 (FIG. 30(a)), and P2n+1 is given to even-number data in the decoded coefficient line 1, the odd-number data is represented by $$P2n - Ln + (Hn-1+Hn)/4 \quad (3)$$

and the even-number data is represented by $$P2n+1 - (Hn+Ln+1)/2 + (Hn-1-6*Hn+Hn+1)/8 \quad (4)$$

Further, up-sampling to increase the pixel number is performed simultaneously with this processing.

The odd-number data and the even-number data, decoded by the decoding filters 801 and 802, are stored in the registers 804 and 805, respectively.

By alternatingly reading out odd data and even data from the registers 804 and 805, these data are again transferred to the coefficient storage element 807 and stored in the address 1 shown in FIG. 30(a).

Therefore, by repeatedly decoding the LLLLLL coefficient data and the LLLLLH coefficient data in the data storage element 602, the LLLLL coefficient data region shown in FIG. 30(b) is restored.

Likewise, when the LLLLHL coefficient data 2 and the LLLLHH coefficient data 2 shown in FIG. 30(a) are read out in the vertical direction and decoded, the LLLLH coefficient data region shown in FIG. 30(b) is restored.

Further, from the LLLLL coefficient data 3 and the LLLLH coefficient data 3 shown in FIG. 30(b), the LLLL coefficient data region shown in FIG. 30(c) is restored.

Subsequently, the LLLL coefficient data 4 and the LLLH coefficient data 4 in the vertical direction shown in FIG. 30(c) are decoded.

When the original image data is finally restored, after the decoding of the L and H coefficient data in the horizontal direction, the decoded image data are stored in the coefficient FIFO 905 and the coefficient FIFO 906, and the CPU bus DMAC 601a read out the stored image data and transfers the data through the CPU bus 603 to the data storage element 602.

Therefore, the L and H coefficient data in the data storage element 602 can be restored to the original image data and transferred to the data storage element 602.

A flowchart of the above-mentioned operation is shown in FIG. 36.

(1) in step S181, the CPU 601 designates the head addresses end the transfer data lengths of the LLLLLL and LLLLLH frequency regions 1 in the vertical direction in the coefficient storage element 807, which is frequency-divided as shown in FIG. 30(a), and outputs an instruction for DMA transfer to the local bus DMAC 807a.

(2) In step S182, the local bus DMAC 807a successively transfers the LLLLLL coefficient vertical line, pixel by pixel, to the decoded L coefficient FIFO 710, in the order of . . . , Ln+1, Ln, . . .

(3) In step S183, after the transfer of the LLLLLL coefficient data to the decoded L coefficient FIFO 710, synchronously with the timing to transfer the LLLLLH coefficient vertical line ( . . . , Hn+1, Hn, Hn−1, . . . ), the LLLLLL coefficient data is transferred to the shift register unit 701, wherein the data is latched and shifted.

(4) In step S184, for the center pixels in and Hn in the shift register unit 701, the following processing is performed:

decoded data 2n (even)=Ln+(Hn−1+Hn)/4 decoded data 2n+1 (odd)=(Hn+Ln+1)/2+(Hn−1−6*Hn+Hn+1)/8

(5) In step S185, decoded data corresponding to the central pixels Ln and Hn are transferred to the coefficient FIFO 905 and the coefficient FIFO 906, respectively.

(6) In step S186, after the transfer is completed, the decoded odd and even data in the coefficient FIFO 905 and the coefficient FIFO 906 are stored in the LLLLL and LLLLH regions in the coefficient storage element 807 by switching the FIFOs. At this stage, in order to increase the memory efficiency, the wavelet-transformed data and the input image data may have the same memory.

(7) In step S187, steps S181 to S186 are performed for all the vertical lines of LLLLLL and LLLLLH coefficient data, completing the transform of the LLLLL region shown in FIG. 30(b).

In steps S181 to S186, the data transfer is controlled by the local bus DMAC 807a.

By repeating the above-mentioned processing while controlling the address and the processing size in the coefficient storage element 807, decoded data are obtained in the coefficient FIFO 905 and the coefficient FIFO 906.

(8) When the original data is finally restored, in step S188, the decoded data (original image) in the coefficient FIFO 905 and the coefficient FIFO 906 are transferred to the data storage element 602 by the CPU bus DMAC 601a.

Since one pixel is 8 bits, serial to parallel conversion may be performed at a cycle twice of the DMA cycle to transfer 16 bits, whereby the transfer speed is further increased.

As described above, in the wavelet reverse transform apparatus according to the thirteenth embodiment, the CPU 601 has a DMA function, the data storage element 602 comprises a memory capable of burst transfer for memory access in the horizontal direction, such as DRAM, the coefficient storage element 807 comprises a memory capable of burst transfer for memory access in both the horizontal and vertical direction, such as SRAM, end the coefficient line memories 905 and 906 are constituted by FIFOs. Therefore, the coefficient data stored in the coefficient storage element 807 are decoded at the DMA cycle of the CPU 601, stored in the coefficient line memories 905 and 906, and then burst-transferred to the coefficient storage element 807.

Further, decoded image data can be transferred to the data storage element 602 in similar manner.

As described above, according to the thirteenth embodiment of the invention, for example, the CPU 601 has a DMA function, the data storage element 602 comprises a memory capable of burst transfer for memory access in the horizontal direction, such as DRAM, the coefficient storage element 807 comprises a memory capable of burst transfer for memory access in both the horizontal and vertical direction, such as SRAM, and the coefficient line memories 905 and 906 are constituted by FIFOs. In this case, image data stored in the data storage element 602 is subjected to wavelet reverse transform at the DMA cycle of the CPU 601, and stored, as coefficient data, in the coefficient line memories 905 and 906. Further, the coefficient data is burst-transferred to the coefficient storage element 807 by the switch 98. In this embodiment, since the image transfer and the frequency division are performed by pipeline processing using the above-mentioned hardware structure, high-speed wavelet reverse transform of image data is possible. Further, since the horizontal and vertical frequency division of image signal is performed recursively, a wavelet reverse transform apparatus is realized by small-sized hardware, and the apparatus is easily controlled.

[Embodiment 14]

FIG. 37 is a block diagram illustrating the entire structure of an apparatus according to a fourteenth embodiment of the invention. In FIG. 37, the same reference numerals as those shown in FIGS. 27 and 35 designate the same or corresponding parts. In this fourteenth embodiment the wavelet transform apparatus according to the tenth embodiment is combined with the wavelet reverse transform apparatus according to the thirteenth embodiment.

A flowchart of the operation of this apparatus is shown in FIG. 38.

(1) In step S191, the CPU 601 designates the head address and the transfer data length of the line data of the image data stored in the data storage element 602, and outputs an instruction for DMA transfer to the CPU bus DMAC 601*a*.

(2) In step S192, the CPU bus DMAC 601*a* successively reads out the line data of the input image data stored in the data storage element 602, by two pixels as a unit, that is, (Pn−2, Pn−1), (Pn, Pn+1), (Pn+2, Pn+3), . . .

(3) In step S193, the read image data is successively transferred to the shift register unit 701 by two pixels as a unit. At this time, since the CPU bus is 16 bit wide and each of the register arrays 701x and 701y has an 8 bit wide input bus, by only performing this transfer, ½ down sampling is done in the horizontal direction. Then, the register value is shifted at the timing of the writing into the register.

(4) In step S194, for the central pixel Pn in the shift register unit 701, the LPF 702 and the HPF 703 perform the following processing:

LPF coefficient data=$(-Pn-2+2*Pn-1+6*Pn+2*Pn+1-Pn+2)/8$

HPF coefficient data=$(Pn-2*Pn+1+Pn+2)/2$ (5) In step S195, the LPF coefficient data and the HPF coefficient data for the central pixel Pn are once latched by the registers 704 and 705, respectively.

(6) In step S196, the latched L coefficient data is transferred to the coefficient storage element 807 without passing through the coefficient FIFO 905. The H coefficient data are stored in the coefficient FIFO 906. The local bus has a bus width equivalent to one pixel.

The CPU bus DMAC 601*a* controls the data transfer in steps S192, S193, and S194, and the local bus DMAC 807*a* controls the data transfer in step S195.

(7) In step S197, after the transfer of the L coefficient data to the coefficient storage element 807 is completed, the H coefficient data in the coefficient FIFO 906 is burst-transferred to the coefficient storage element 807.

(8) In step S198, steps S191 to S197 are performed for all lines of the input image to complete the transform shown in FIG. 21(*c*).

(9) In step S199, the local bus DMAC 807*a* performs burst reading, pixel by pixel, for the vertical line data of the L coefficient data in the coefficient storage element 807.

(10) In step S200, the line data is subjected to serial to parallel conversion with two pixels as a unit, and transferred to the LPF 73 and the HPF 74.

(11) In step S201, the L coefficient data and the H coefficient data are transferred to the FIFO 905 and the FIFO 906, respectively.

(12) In step S202, after the transfer of the L coefficient vertical line data in the coefficient storage element 907 is completed, coded data are transferred to the coefficient FIFO 905 and the coefficient FIFO 906.

In steps S199 to S202, the data transfer is controlled by the local bus DMAC 807*a*.

(13) In step S203, steps S198 to S202 are performed for all the vertical lines of L coefficient data, completing the transform shown in FIG. 21(*f*).

Further, steps S198 to S202 are performed for the frequency region of the coefficient storage element 807 while controlling the address and the processing size, frequency division is performed with the apparatus shown in FIG. 37.

A description is now given of wavelet reverse transform with the apparatus shown in FIG. 37.

(14) In step S204, the CPU 601 designates the head addresses and the transfer data lengths of the LLLLLL and LLLLLH frequency regions 1 in the vertical direction in the coefficient storage element 807, which is frequency-divided as shown in FIG. 30(*a*), and outputs an instruction for DMA transfer to the local bus DMAC 807*a*.

(15) In step S205, the local bus DMAC 807*a* successively transfers the LLLLLL coefficient vertical line, pixel by pixel, to the decoded L coefficient FIFO 710, in the order of . . . , Ln+1, Ln, . . .

(16) In step S206, after the transfer of the LLLLLL coefficient data to the decoded L coefficient FIFO 710, synchronously with the timing to transfer the LLLLLH coefficient vertical line ( . . . , Hn+1, Hn, Hn−1, . . . ), the LLLLLL coefficient data is transferred to the shift register unit 701, wherein the data is latched and shifted.

(17) In step S207, for the central pixels Ln and Hn in the shift register unit 701, the following processing is performed:

decoded data 2n (even)=$Ln+(Hn-1+Hn)/4$ decoded data 2n+1 (odd)=$(Hn+Ln+1)/2+(Hn-1-6*Hn+Hn+1)/8$

(18) In step S208, decoded data corresponding to the central pixels Ln and Hn are transferred to the coefficient FIFO 905 and the coefficient FIFO 906, respectively.

(19) In step S209, after the transfer is completed, the decoded odd and even data in the coefficient FIFO 905 and the coefficient FIFO 906 are stored in the LLLLL and LLLLH regions in the coefficient storage element 807 by switching the FIFOs.

(20) In step S210, steps S204 to S209 are performed for all the vertical lines of LLLLLL and LLLLLH coefficient data, completing the transform shown in FIG. 30(*b*).

In steps S204 to S209, the data transfer is controlled by the local bus DMAC 807*a* while controlling the address and the processing size in the coefficient storage element 807.

(21) When the original data is finally restored, in step S210, decoded data (original image) in the coefficient FIFO 905 and the coefficient FIFO 906 are transferred to the data storage element 602 by the CPU bus DMAC 601*a*.

As described above, according to the fourteenth embodiment of the invention, for example, the CPU 601 has a DMA function, the data storage element 602 comprises a memory capable of burst transfer for memory access in the horizontal direction, such as DRAM, the coefficient storage element 807 comprises a memory capable of burst transfer for memory access in both the horizontal and vertical direction, such as SRAM, and the coefficient line memories 905 and 906 are constituted by FIFOs. Therefore, image data stored in the data storage element 602 is subjected to frequency division at the DMA cycle of the CPU 601, and stored, as coefficient data, in the coefficient line memories 905 and 906, and the coefficient data is burst-transferred to the coefficient storage element 807. Further, the frequency division of coefficient data stored in the coefficient storage element 807 in performed in similar manner.

Since the frequency division and the data transfer are performed by pipeline processing using the hardware structure mentioned above, high-speed frequency division of image data is possible. Further, since the horizontal and vertical frequency division of image signal is performed recursively, a wavelet transform apparatus is realized by small-sized hardware, and the apparatus is easily controlled.

Furthermore, the coefficient data stored in the coefficient storage element 807 are decoded at the DMA cycle of the CPU 601, stored in the coefficient line memories 905 and 906, and then burst-transferred to the coefficient storage element 807. Further, decoded image data can be transferred to the data storage element 602 in similar manner.

Since the coefficient transfer and the decoding are performed by pipeline processing using the above-mentioned hardware structure, high-speed wavelet reverse transform of image data is possible. Further, since the horizontal and vertical reverse transform of image signal is performed recursively, a wavelet reverse transform apparatus is realized by small-sized hardware, and the apparatus is easily controlled.

[Embodiment 15]

FIG. 39 is a block diagram illustrating the entire structure of an apparatus according to a fifteenth embodiment of the invention. In the figure, the same reference numerals as those shown in FIG. 37 designate the same or corresponding parts. The structure sown in FIG. 39 is different from the structure shown in FIG. 37 only in that an offset element 914 and a reverse offset element 915 are added, whereby the data width of the data bus (thick line in FIG. 39) which is not directly connected to the CPU bus 603 is increased to improve the operation accuracy.

FIG. 40 is a block diagram illustrating the structures of the decoding filters 82 and 83 shown in FIG. 39. As shown in FIG. 40, the decoding filter 82 comprises a shift register unit 701 and a decoding filter 801, and the decoding filter 83 comprises the shift register unit 701 and a decoder filter 802.

A description is given of the operation.

When the CPU 601 transfers image data stored in the data storage element 602 through the CPU bus 603 to the LPF 72 and the HPF 73, 8-bit image data is extended to 12-bit image data by the offset element 914. In case of Y data, the pixel value ranges from 0 to 255. In case of UV data, the pixel value ranges from −128 to 127.

Figure 41:
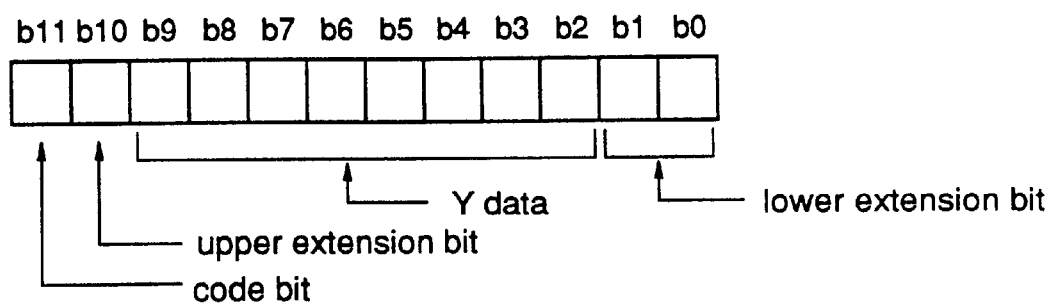
Figure 41:
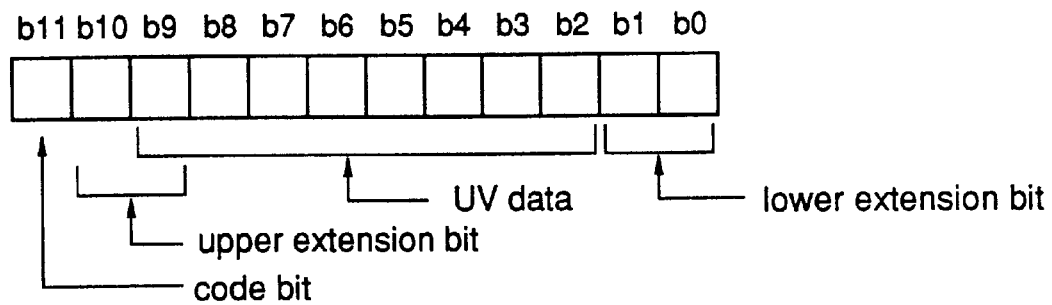

FIG. 41(*a*) shows a case where Y data is extended, and FIG. 41(*b*) shows a cae where UV data is extended. In case of Y data, besides the original 8-bit Y data, in order to calculate figures below the decimal point, 2 bits are given for lower extension, 1 bit is given for upper extension, and 1 bit is given as a code bit. In case of UV data, since the original 8-bit UV data includes a code bit, 2 bits are given for upper extension and 2 bits are given for lower extension to make the data with equal to the data width of Y data.

Figure 42:
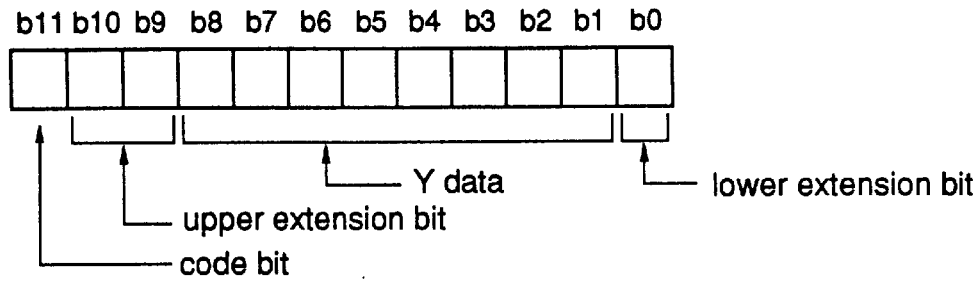
Figure 42:
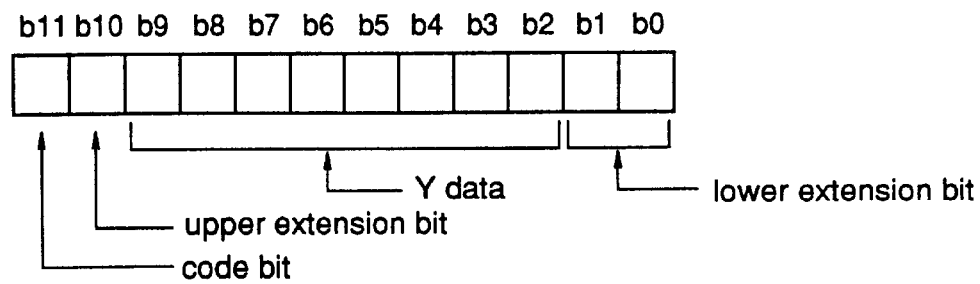
Figure 42:
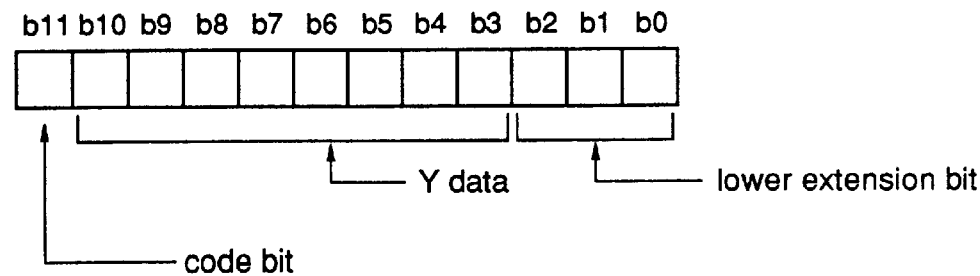

FIGS. 42(*a*) to 42(*c*) show the assignment of the upper extension bits and the lower extension bits.

When the bit number of the integer part is increased by adding two upper extension bits (FIG. 42(*a*)), although the representable range increases, the operation accuracy for the figures below the decimal point is degraded. On the other hand, when three lower extension bits are given (FIG. 42(*b*)), although the operation accuracy for the figures below the decimal point is improved, since no upper extension bit is added, the representable range decreases as compared to the case of FIG. 42(*a*), whereby the risk of the filter operation overflowing significantly increases. As a result, the accuracy of the filter operation including the integer part is degraded.

When an image is wavelet-transformed using a SSKF (Symmetric Short Kernel Filter) according to this fifteenth embodiment, although the frequency of operation wherein the integer part of the operated value exceeds 8 bits is high, the frequency of operation where it exceeds 9 bits is very low.

Therefore, when the data pixel value is extended to 12-bit width, by giving one bit for the upper extension and two bits for the operation accuracy of the figures below the decimal point, an accurate operation is possible.

Figure 43:
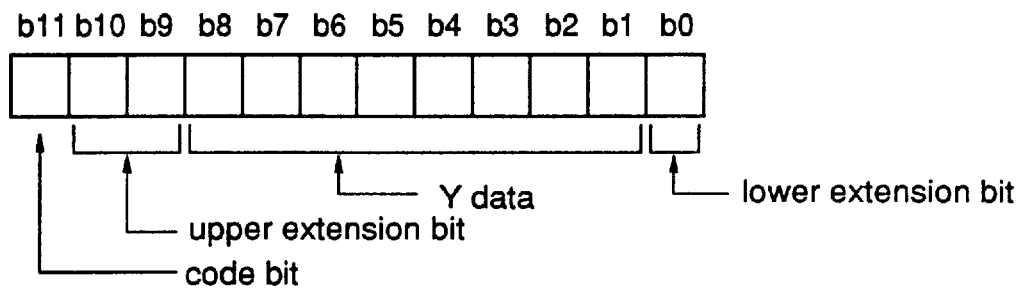
Figure 43:
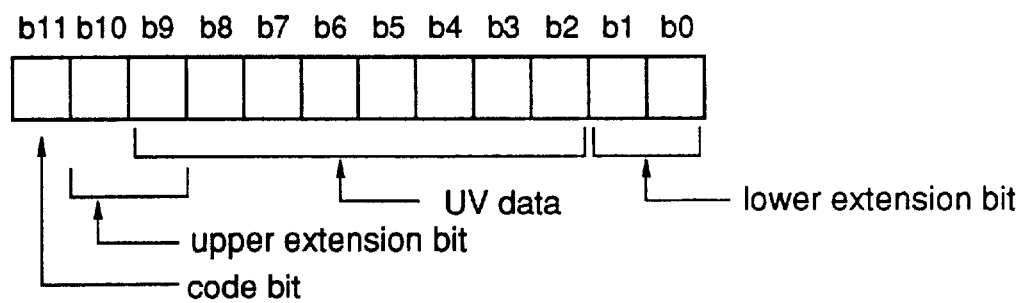

After the 8-bit to 12-bit extension in the offset element 914, frequency division is performed. After wavelet transform, when the image data is transferred to the data storage element 602, the 12-bit image data is converted to 8-bit image data by the reverse offset element 915. FIGS. 43(*a*) and 43(*b*) show the conversion process.

FIG. 43(*a*) shows the conversion of Y data. The lower extension bit is omitted. With respect to the upper extension bit and the code bit, a combination of (b11,b10) shown in FIG. 43(*a*) is employed. When the code bit is '1', since the Y data takes only a positive value, 0 is output. When the code bit is '0' and the upper extension bit is '1', the maximum value 255 is output. In other cases, b9–b2 are output.

FIG. 43(*b*) shows the conversion of UV data. The lower extension bit is omitted. With respect to the upper extension bit and the code bit, a combination (b11,b10,b9) shown in FIG. 43(*b*) is employed. When the code bit is '1', −128 is output. When the code bit is '0' and at least one of the upper extension bits is '1', the maximum value 127 is output. However, when (b11,b10,b9) are all '1', b9–b2 are output.

As described above, according to the fifteenth embodiment of the invention, data stored in the data storage element 602 is DMA-transferred to the LPF 72 and the HPF 73, frequency-divided in these filters 72 and 73, and DMA-transferred to the coefficient storage element 807 and, thereafter, the above-mentioned frequency division is recursively performed by DMA transfer, whereby wavelet transform of data is carried out. Thus produced coefficient data is DMA-transferred to the decoding filters 82 and 83, subjected to wavelet reverse transform in the filters 82 and 83, and DMA-transferred to the coefficient storage element 807 and, thereafter, the above-mentioned wavelet reverse transform is recursively performed by DMA transfer. In the apparatus operating as mentioned above, when image data is transferred from the data storage 602 to the LPF 72 and the HPF 73, since the upper 1 bit is extended, the accuracy of the filter operation when the frequency division is performed is improved, whereby the quality of image data decoded from the wavelet-transformed data is improved.

[Embodiment 16]

Figure 44:
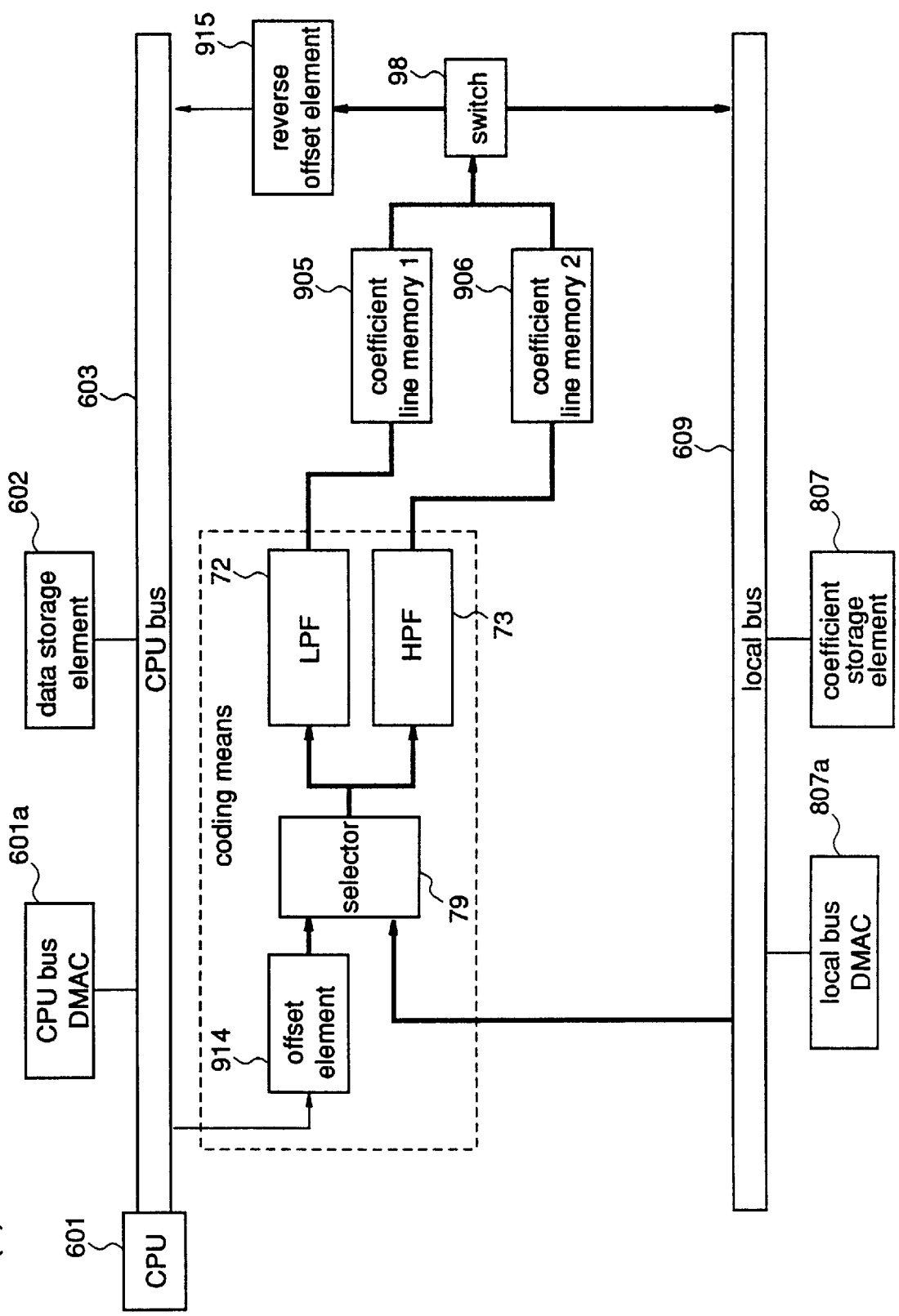
Figure 44:
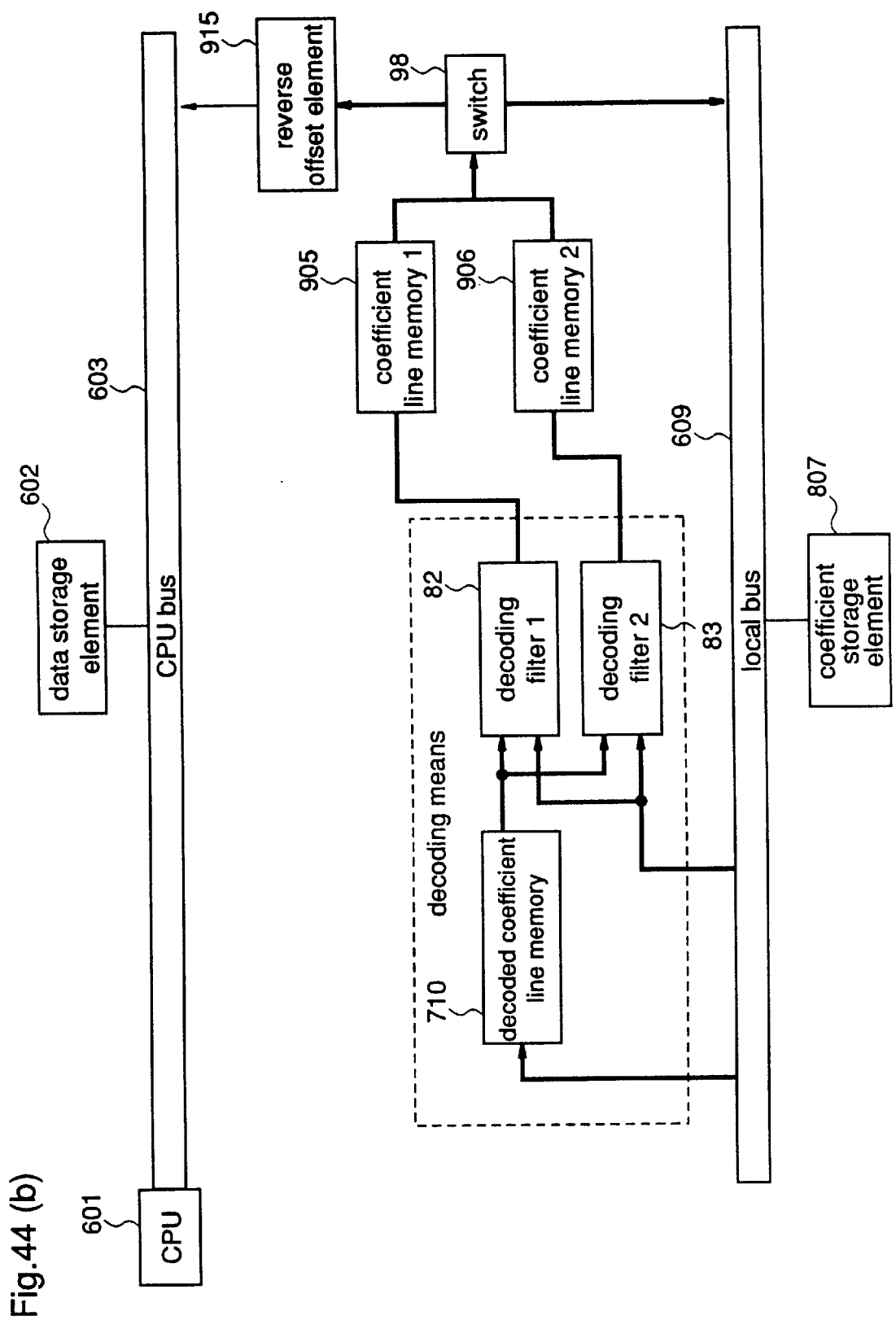

FIG. 44(*a*) and 44(*b*) are block diagrams illustrating structures according to a sixteenth embodiment of the invention. In these figures, the same reference numerals as those shown in FIG. 39 designate the same or corresponding parts. The structure shown in FIG. 44(*a*) is obtained by removing the selectors 913*a* and 913*b*, the decoding coefficient line memory 710, and the decoding filters 82 and 83 from the structure shown in FIG. 39, and this apparatus is used only for wavelet transform.

In the structure shown in FIG. 44(*a*), when the data pixel value is extended to 12-bit width, as shown in FIG. 42(*b*), 1 bit is given for upper extension and 2 bits are given for the operation accuracy of the figures below the decimal point, whereby accurate operation is possible.

On the other hand, the structure shown in FIG. 44(*b*) is obtained by removing the selectors 913*a* and 913*b*, the offset element 914. the selector 79, the LPF 72, and the HPF 73 from the structure shown in FIG. 39, and this apparatus is used only for wavelet reverse transform.

In the structure shown in FIG. 44(*b*), according to the method shown in FIG. 43, the data pixel value extended to 12-bit width can be restored to 8-bit width.

As described above, according to the sixteenth embodiment of the invention, data stored in the data storage element 602 is DMA-transferred to the LPF 72 and the HPF 73, frequency-divided in these filters 72 and 73, and DMA-transferred to the coefficient storage element 807 and, thereafter, the above-mentioned frequency division is recursively performed by DMA transfer, whereby wavelet transform of data is carried out. In the apparatus operating as mentioned above, when image data is transferred from the data storage 602 to the LPF 72 and the HPF 73, since the upper 1 bit is extended, the accuracy of the filter operation when the frequency division is performed is improved, whereby the quality of image data decoded from the wavelet-transformed data is improved.

Further, coefficient data obtained by the wavelet transform is DMA-transferred to the decoding filters 82 and 83, subjected to wavelet reverse transform in the filters 82 and 83, and DMA-transferred to the coefficient storage element 807 and, thereafter, the above-mentioned wavelet reveres transform is recursively performed by DMA transfer. In the apparatus operating as mentioned above, the data width is extended, by upper 1 bit, from the data width at the wavelet transform. So, the image data can be reversely transformed with the extended bit width and, after the reverse transform, the extended bit width can be restored to the original bit width, whereby the quality of image data decoded from the wavelet-transformed data is improved.

[Embodiment 17]

FIG. 45 is a block diagram illustrating a wavelet transform apparatus according to a seventeenth embodiment of the invention. This structure is obtained by combining a wavelet transform apparatus as shown in FIG. 24 with a wavelet reverse transform apparatus as shown in FIG. 33. In this structure, the CPU 601, the CPU bus DMAC 601*a*, the data storage element 602, and the CPU bus are common to the wavelet transform and the wavelet reverse transform, and selectors 179, 913*a*, and 913*b* are added. The selector 179 sends data from the CPU bus 603 to the LPF and HPF filters 72 and 73 or to the decoding filters 82 and 83. The selector 913*a* selects one of outputs from the LPF 72 and the decoding filter 82 and sands the data to the coefficient line memory 905, and the selector 913*b* selects one of outputs from the HPF 73 and the decoding filter 83 and sends the data to the coefficient line memory 906.

The apparatus according to this seventeenth embodiment operates in similar manner to the wavelet transform apparatus shown in FIG. 24 and the wavelet reverse transform apparatus shown in FIG. 33. However, this apparatus performs one the wavelet transform and the wavelet reverse transform.

As described above, according to the seventeenth embodiment of the invention, the CPU 601 has DMA function, the data storage element 602 is a DRAM capable of burst transfer for horizontal memory access, and the coefficient line memories 905 and 906 are FIFO. Therefore, image data in the data storage element 602 can be frequency-divided at a DMA cycle of the CPU 601 and stored, as coefficient data, in the coefficient line memories 905 and 906.

Since the image transfer and the frequency division are performed by pipeline processing using the above-mentioned hardware structure, high-speed frequency division and high-speed wavelet reverse transform of image data are possible, whereby wavelet transform or reverse transform is realized with small-sized hardware and high controllability.

What is claimed is:

1. A coding method comprising:

a hierarchical coding step of performing hierarchical coding of data to be coded to generate first and second code sequences, each comprising a plurality of code layers arranged in an order according to priority in a code sequence;

a storage control step of storing the first and second code sequences in a storage region of a code storage means having successive addresses, respectively from opposed ends of the storage region, according to priority given to the code layers; and a priority judge step of storing a code layer in either of the first and second code sequences, which code layer has the highest priority at present, prior to the other code sequence, when an overlap occurs in the storage control step.

2. A coding method comprising:

a hierarchical coding step of performing hierarchical coding for data to be coded to generate at least two code sequences, each comprising a plurality of code layers;

a storage control step of storing a code layer having the highest priority among the code layers in the respective code sequences in a code storage means, and storing other code layers in a temporary storage means; and a transfer judge step of transferring, according to priority, the code layers in the respective code sequences stored in the temporary storage means, from the temporary storage means to the code storage means.

3. A coding method comprising:

a sampling step of sampling fields of an image signal with a designated time interval;

a hierarchical coding step of performing hierarchical coding for the image signal data sampled in the sampling step;

raising a code quantity to a prescribed quantity when the code quantity is lower than the prescribed quantity;

controlling a sampling rate in accordance with the code quantity;

a memory capacity calculating step of calculating a memory capacity used in the hierarchical coding step;

a memory capacity raising step of raising the memory capacity to a prescribed lowest limit value when the calculated memory capacity is lower that the lowest limit value;

a field interval calculating step of calculating a field interval in proportion to the calculated memory capacity; and a step of designating the calculated field interval for the sampling step.

4. A coding method as defined in claim 3 further comprising:

a raising detection step of detecting that the memory capacity is raised in the memory capacity raising step; and a step of controlling the hierarchical coding so that the code amount is increased, when the raising detection step detects the raising of the memory capacity.

5. A coding apparatus comprising:

a hierarchical coding means for performing hierarchical coding for data to be coded to generate first and second code sequences, each comprising a plurality of code layers arranged in an order according to priority in a code sequence;

a storage control means for storing the first and second code sequences in a storage region of a code storage means having successive addresses, respectively from opposed ends of the storage region, according to priority given to the code layers; and a priority judge means for storing a code layer in either of the first and second code sequences, which code layer has the highest priority at present, prior to the other code sequence, when an overlap occurs in the storage control means.

6. A coding apparatus comprising:

a hierarchical coding means for performing hierarchical coding for data to be coded to generate at least two code sequences, each comprising a plurality of code layers;

a storage control means for storing a code layer, which has the highest priority among the code layers in the respective code sequences, in a code storage means, and storing other code layers in a temporary storage means; and a transfer judge means for transferring, according to priority, the code layers in the respective code sequences stored in the temporary storage means, from the temporary storage means to the code storage means.

7. A coding apparatus comprising:

a sampling means for sampling fields of an image signal with a designated time interval;

a hierarchical coding means for performing hierarchical coding for the image signal data sampled in the sampling steps, said hierarchical coding means raising a code quantity to a prescribed quantity when the code quantity is lower than the prescribed quantity, said sampling means controlling a sampling rate in accordance with the code quantity;

a memory capacity calculating means for calculating a memory capacity used in the hierarchical coding step;

a memory capacity raising means for raising the memory capacity to a prescribed lowest limit value when the calculated memory capacity is lower than the lowest limit value;

a field interval calculating means for calculating a field interval in proportion to the calculated memory capacity; and means for designating the calculated field interval for the sampling step.

8. A coding apparatus as defined in claim 7 further comprising:

a raising detection means for detecting that the memory capacity in raised in the memory capacity raising step; and means for controlling the hierarchical coding so that the code amount is increased, when the raising detection step detects the raising of the memory capacity.

9. A coding method, comprising:

a hierarchical coding step of performing hierarchical coding of data to be coded to generate first and second code sequences, each comprising a plurality of code layers;

a storage control step of storing the first and second code sequences in a storage region of a code storage means having successive addresses, respectively from opposed ends of the storage region, according to priority given to the code layers, the first code sequence being stored in the code storage means prior to the second code sequence; and a priority judge step of storing a code layer in either of the first and second code sequences, which code layer has the highest priority at present, prior to the other code sequence, when an overlap occurs in the storage control step, a code layer in the first code sequence which is lower in priority than a code layer in the second code sequence being judged, and when the storage region does not have a sufficient capacity for the code layer in the second code sequence, a code layer in the second code sequence is written over the judged code layer in the first code sequence.

10. A coding method, comprising:

a hierarchical coding step of performing hierarchical coding for data to be coded to generate at least two code sequences, each comprising a plurality of code layers;

a storage control step of storing a code layer having the highest priority among the code layers in the respective code sequences in a code storage means, and storing other code layers in a temporary storage means;

a transfer judge step of transferring, according to priority, the code layers in the respective code sequences stored in the temporary storage means, from the temporary storage means to the code storing means;

a region control step of assigning a storage region of a prescribed size from the successive storage regions in the code storage means;

said storage control step storing the plural code sequences in the assigned memory region;

a code transfer step of filling a vacancy in the storage region between the stored code sequences, by transferring one of the code sequences to the vacancy; and a step of recovering a region in the assigned storage region, which region is not used for the storage.

11. A coding apparatus, comprising:

a hierarchical coding means for performing hierarchical coding for data to be coded to generate first and second code sequences, each comprising a plurality of code layers;

a storage control means for storing the first and second code sequences in a storage region of a code storage means having successive addresses, respectively from opposed ends of the storage region, according to priority given to the code layers, said storage control means storing the first code sequence in the code storage means prior to the second code sequence; and a priority judge means for storing a code layer in either of the first and second code sequences, which code layer has the highest priority at present, prior to the other code sequence, when an overlap occurs in the storage control means, said priority judge means judging a code layer in the first code sequence which is lower in priority than a code layer in the second code sequence, and when the storage region does not have a sufficient capacity for storing the code layer in the second code sequence, a code layer in the second code sequence is written over the judged code layer in the first code sequence.

12. A coding apparatus, comprising:

a hierarchical coding means for performing hierarchical coding for data to be coded to generate at least two code sequences, each comprising a plurality of code layers;

a storage control means for storing a code layer, which has the highest priority among the code layers in the respective code sequences, in a code storage means, and storing other code layers in a temporary storage means;

a transfer judge means for transferring, according to priority, the code layers in the respective code sequences stored in the temporary storage means from the temporary storage means to the code storing means;

a region control means for assigning a storage region of a prescribed size from the successive storage regions in the code storage means;

said storage control means storing a plurality of code sequences in the assigned memory region;

a code transfer means for filling a vacancy in the storage region between the stored code sequences by transferring one of the code sequences to the vacancy; and a region recover means for recovering a region in the assigned storage region, which region is not used for the storage.

13. A coding method comprising:

a hierarchical coding step of performing hierarchical coding of data to be coded to generate first and second code sequences, each comprising a plurality of code layers;

a storage control step of storing the first and second code sequences in a storage region of a code storage means having successive addresses, respectively from opposed ends of the storage region, according to priority given to the code layers;

a priority judge step of storing a code layer in either of the first and second code sequences, which code layer has the highest priority at present, prior to the other code sequence, when an overlap occurs in the storage control step;

a region control step of assigning a storage region of a prescribed size from the successive storage regions in the code storage means;

said storage step storing the plural code sequences in the assigned memory region;

a code transfer step of filling a vacancy in the storage region between the stored code sequences, by transferring one of the code sequences to the vacancy; and a step of recovering a region in the assigned storage region, which region is not used for the storage.

14. A coding method comprising:

a hierarchical coding step of performing hierarchical coding of data to be coded to generate first and second code sequences, each comprising a plurality of code layers;

a storage control step of storing the first and second code sequences in a storage region of a code storage means having successive addresses, respectively from opposed ends of the storage region, according to priority given to the code layers, the first code sequence being stored in the code storage means prior to the second code sequence;

a priority judge step of storing a code layer in either of the first and second code sequences, which code layer has the highest priority at present, prior to the other code sequence, when an overlap occurs in the storage control step, a code layer in the first code sequence which is lower in priority than a code layer in the second code sequence being judged, and when the storage region does not have a sufficient capacity for the code layer in the second code sequence, a code layer in the second code sequence is written over the judged code layer in the first code sequence;

a region control step of assigning a storage region of a prescribed size from the successive storage regions in the code storage means;

said storage step of storing the plural code sequences in the assigned memory region;

a code transfer step of filling a vacancy in the storage region between the stored code sequences, by transferring one of the code sequences to the vacancy; and a step of recovering a region in the assigned storage region, which region is not used for the storage.

15. A coding apparatus comprising:

a hierarchical coding means for performing hierarchical coding of data to be coded to generate first and second code sequences, each comprising a plurality of code layers;

a storage control means for storing the first and second code sequences in a storage region of a code storage means having successive addresses, respectively from opposed ends of the storage region, according to priority given to the code layers;

a priority judge means for storing a code layer in either of the first and second code sequences, which code layer has the highest priority at present, prior to the other code sequence, when an overlap occurs in the storage control means;

a region control means for assigning a storage region of a prescribed size from the successive storage regions in the code storage means;

said storage means for storing the plurality of code sequences in the assigned memory region;

a code transfer means for filling a vacancy in the storage region between the stored code sequences, by transferring one of the code sequences to the vacancy; and a region recover means for recovering a region in the assigned storage region, which region is not used for the storage.

16. A coding apparatus comprising:

a hierarchical coding means for performing hierarchical coding of data to be coded to generate first and second code sequences, each comprising a plurality of code layers;

a storage control means for storing the first and second code sequences in a storage region of a code storage means having successive addresses, respectively from opposed ends of the storage region, according to priority given to the code layers, said storage control means storing the first code sequence in the code storage means prior to the second code sequence;

a priority judge means for storing a code layer in either of the first and second code sequences, which code layer has the highest priority at present, prior to the other code sequence, when an overlap occurs in the storage control means, said priority judge means judging a code layer in the first code sequence which is lower in priority than a code layer in the second code sequence, and when the storage region does not have a sufficient capacity for storing the code layer in the second code sequence, a code layer in the second code sequence is written over the judged code layer in the first code sequence;

a region control means for assigning a storage region of a prescribed size from the successive storage regions in the code storage means;

said storage means for storing the plural code sequences in the assigned memory region;

a code transfer means for filling a vacancy in the storage region between the stored code sequences, by transferring one of the code sequences to the vacancy; and a region recover means for recovering a region in the assigned storage region, which region is not used for the storage.

* * * * *